(12) United States Patent
Farb et al.

(10) Patent No.: US 12,348,046 B2
(45) Date of Patent: Jul. 1, 2025

(54) DUAL MODE TURBINE FOR SUPPLYING ENERGY USING A SMART INVERTER

(71) Applicant: Flower Turbines, Inc., Lawrence, NY (US)

(72) Inventors: Mark Daniel Farb, Lawrence, NY (US); Jonathan Forbes, Lauderhill, FL (US)

(73) Assignee: Flower Turbines, Inc., Lawrence, NY (US)

( * ) Notice: Subject to any disclaimer, the term of this patent is extended or adjusted under 35 U.S.C. 154(b) by 0 days.

(21) Appl. No.: 18/987,074

(22) Filed: Dec. 19, 2024

(65) Prior Publication Data
US 2025/0125624 A1   Apr. 17, 2025

Related U.S. Application Data

(63) Continuation of application No. 18/195,070, filed on May 9, 2023, now Pat. No. 12,199,437, which is a
(Continued)

(51) Int. Cl.
*H02J 3/38* (2006.01)
*F03B 15/00* (2006.01)
(Continued)

(52) U.S. Cl.
CPC .............. *H02J 3/381* (2013.01); *F03B 15/00* (2013.01); *F03D 7/048* (2013.01); *F03D 9/257* (2017.02);
(Continued)

(58) Field of Classification Search
CPC ....... H02J 3/381; H02J 2300/28; F03B 15/00; F03D 7/048; F03D 9/257; F03D 9/25;
(Continued)

(56) References Cited

U.S. PATENT DOCUMENTS

| 1,352,952 A | 9/1920 | Gracey |
| 1,581,537 A | 4/1926 | Hennigh |

(Continued)

FOREIGN PATENT DOCUMENTS

| CA | 2633244 A1 | 12/2008 |
| CA | 2800765 A1 | 12/2010 |

(Continued)

OTHER PUBLICATIONS

International Search Report and Written Opinion for International Application No. PCT/US2022/082035 dated Mar. 28, 2023 (8 pages).

(Continued)

*Primary Examiner* — Charles Cai
(74) *Attorney, Agent, or Firm* — Finnegan, Henderson, Farabow, Garrett & Dunner LLP

(57) ABSTRACT

Systems, method, and computer readable medium are provided for a controller for a generator. The system includes a rectifier for converting a first AC signal generated by the generator to a first DC signal; a first DC-DC associated with energy storage and a first mode; a second DC-DC associated with an inverter and a second mode; a switch for alternately toggling between the first DC-DC and the second DC-DC, wherein the first mode prevents output to the electrical grid, and the second mode enables inversion of the second DC signal to a second AC signal via the inverter; and a processor that uses the indicator to operate the switch to operate the generator in the first mode when a connection to the grid does not conform with a parameter, and operate the generator in the second mode when the connection to the grid conforms with the parameter.

20 Claims, 20 Drawing Sheets

Related U.S. Application Data continuation of application No. PCT/US2023/065609, filed on Apr. 11, 2023.

(60) Provisional application No. 63/329,900, filed on Apr. 12, 2022.

(51) Int. Cl.
| | |
|---|---|
| *F03D 7/04* | (2006.01) |
| *F03D 9/25* | (2016.01) |
| *G05B 19/042* | (2006.01) |
| *H02M 7/06* | (2006.01) |
| *H02P 9/02* | (2006.01) |
| *H02P 11/04* | (2006.01) |
| *H02P 101/15* | (2016.01) |
| *H02P 101/10* | (2015.01) |

(52) U.S. Cl.
CPC ............ *G05B 19/042* (2013.01); *H02M 7/06* (2013.01); *H02P 9/02* (2013.01); *H02P 11/04* (2013.01); *F03D 9/25* (2016.05); *F05B 2220/706* (2013.01); *G05B 2219/2619* (2013.01); *H02J 2300/28* (2020.01); *H02P 2101/10* (2015.01); *H02P 2101/15* (2015.01)

(58) Field of Classification Search
CPC . F03D 7/06; G05B 19/042; G05B 2219/2619; H02M 7/06; H02M 1/007; H02M 3/156; H02M 7/44; H02P 9/02; H02P 11/04; H02P 2101/10; H02P 2101/15; H02P 3/26; H02P 9/48; F05B 2220/706
See application file for complete search history.

(56) References Cited

U.S. PATENT DOCUMENTS

| | | | |
|---|---|---|---|
| 4,036,360 | A | 7/1977 | Deffeyes |
| 4,714,225 | A | 12/1987 | Skinner |
| 4,973,219 | A | 11/1990 | Brickner et al. |
| 5,044,878 | A | 9/1991 | Wilhelm |
| 5,143,170 | A | 9/1992 | Hunt et al. |
| 5,624,006 | A | 4/1997 | Richardson, Jr. |
| 5,798,631 | A | 8/1998 | Spee |
| 6,601,348 | B2 | 8/2003 | Banks et al. |
| 6,606,828 | B1 | 8/2003 | Lin |
| 6,755,608 | B2 | 6/2004 | Boughton |
| 6,784,566 | B2 | 8/2004 | Thomas |
| 6,786,018 | B2 | 9/2004 | Webb |
| 6,824,073 | B1 | 11/2004 | Haney |
| 7,084,520 | B2 | 8/2006 | Zambrano |
| 7,215,039 | B2 | 5/2007 | Zambrano |
| 7,276,809 | B2 | 10/2007 | Zambrano |
| 7,315,093 | B2 | 1/2008 | Graham |
| 7,487,618 | B2 | 2/2009 | Lin |
| 7,592,537 | B1 | 9/2009 | West |
| 7,679,207 | B2 | 3/2010 | Cory |
| 7,836,642 | B2 | 11/2010 | Lin |
| 7,891,573 | B2 | 2/2011 | Finkam et al. |
| 7,902,688 | B2 | 3/2011 | Krivcov |
| 7,944,067 | B2 | 5/2011 | Kammer |
| 7,988,413 | B2 | 6/2011 | Haar |
| RE43,014 | E | 12/2011 | Zambrano |
| 8,188,611 | B2 | 5/2012 | Farb |
| 8,207,623 | B2 | 6/2012 | Rivas |
| 8,251,638 | B2 | 8/2012 | Boyd |
| 8,257,020 | B2 | 9/2012 | Graham |
| 8,333,564 | B2 | 12/2012 | Krivcov |
| 8,364,323 | B2 | 1/2013 | Arinaga |
| 8,491,262 | B2 | 7/2013 | McGrath |
| 8,648,483 | B2 | 2/2014 | Haar |
| 8,696,313 | B2 | 4/2014 | Deeley |
| 8,840,360 | B2 | 9/2014 | Quintal |
| 8,888,438 | B2 | 11/2014 | Beane |
| 9,041,238 | B2 | 5/2015 | McMahon |
| 9,051,918 | B1 | 6/2015 | Hench |
| 9,127,646 | B2 | 9/2015 | Cory |
| 9,157,664 | B2 | 10/2015 | Place |
| 9,328,717 | B1 | 5/2016 | Walker |
| 9,371,661 | B2 | 6/2016 | Grace |
| 9,453,496 | B2 | 9/2016 | Farb |
| 9,689,372 | B2 | 6/2017 | Gonzalez |
| 9,803,799 | B1 | 10/2017 | Yang |
| 9,835,138 | B2 | 12/2017 | Westergaard |
| 10,006,438 | B2 | 6/2018 | de Boer |
| 10,095,245 | B2 | 10/2018 | Nutt |
| 10,330,086 | B2 | 6/2019 | Farb |
| 10,400,746 | B1 | 9/2019 | Shoffler |
| 10,400,747 | B2 | 9/2019 | Guignard |
| 10,605,229 | B2 | 3/2020 | Zhang |
| 10,612,519 | B2 | 4/2020 | Franke et al. |
| 10,767,630 | B1 | 9/2020 | Venkitanarayanan |
| 10,988,923 | B2 | 4/2021 | Dyson |
| 11,060,501 | B1 | 7/2021 | McMahon |
| 11,060,502 | B2 | 7/2021 | Wang |
| 11,143,162 | B2 | 10/2021 | Vail |
| 11,143,164 | B1 | 10/2021 | Landis |
| 11,208,982 | B2 | 12/2021 | Palamara |
| 11,391,262 | B1 | 7/2022 | Westergaard |
| 11,831,164 | B2 | 11/2023 | Farb |
| 11,891,980 | B2 | 2/2024 | Farb |
| 11,905,929 | B2 | 2/2024 | Farb |
| 2002/0040555 | A1 | 4/2002 | Banks et al. |
| 2002/0083666 | A1 | 7/2002 | Webb |
| 2002/0105190 | A1 | 8/2002 | Thomas |
| 2002/0114692 | A1 | 8/2002 | Boughton |
| 2002/0125880 | A1 | 9/2002 | Murai |
| 2004/0164561 | A1 | 8/2004 | Nagawa |
| 2005/0034937 | A1 | 2/2005 | Agardy |
| 2005/0143221 | A1 | 6/2005 | Kuwahara |
| 2005/0242590 | A1 | 11/2005 | Zambrano |
| 2006/0131889 | A1 | 6/2006 | Corten |
| 2006/0153682 | A1 | 7/2006 | Vanderhye |
| 2006/0170222 | A1 | 8/2006 | Zambrano |
| 2007/0152454 | A1 | 7/2007 | Zambrano |
| 2007/0176431 | A1 | 8/2007 | Graham |
| 2007/0222225 | A1 | 9/2007 | Mahoney |
| 2008/0083689 | A1 | 4/2008 | Schroeder |
| 2008/0223982 | A1 | 9/2008 | Pri-Paz |
| 2008/0284170 | A1 | 11/2008 | Cory |
| 2008/0284171 | A1 | 11/2008 | Cory |
| 2009/0040750 | A1 | 2/2009 | Myer |
| 2009/0097981 | A1 | 4/2009 | Gabrys |
| 2009/0186745 | A1 | 7/2009 | Lewiston |
| 2009/0220342 | A1 | 9/2009 | Wu et al. |
| 2009/0224556 | A1 | 9/2009 | Berenda et al. |
| 2009/0243295 | A1 | 10/2009 | Kammer |
| 2009/0267351 | A1 | 10/2009 | Buns |
| 2009/0269209 | A1 | 10/2009 | Urban |
| 2009/0278352 | A1 | 11/2009 | Rivas |
| 2009/0290972 | A1 | 11/2009 | Farb |
| 2009/0297332 | A1 | 12/2009 | Boyd |
| 2010/0140939 | A1 | 6/2010 | Scholte-Wassink |
| 2010/0252706 | A1 | 10/2010 | Hargis |
| 2011/0037269 | A1 | 2/2011 | Poon et al. |
| 2011/0089701 | A1 | 4/2011 | Blake |
| 2011/0111700 | A1 | 5/2011 | Hacket |
| 2011/0164977 | A1 | 7/2011 | Vallejo |
| 2011/0215640 | A1 | 9/2011 | Donnelly |
| 2011/0271927 | A1* | 11/2011 | Ueno .................. F02N 11/0818 123/179.4 |
| 2011/0302864 | A1 | 12/2011 | Ramsay |
| 2011/0304150 | A1 | 12/2011 | Hara |
| 2011/0311364 | A1 | 12/2011 | Conner |
| 2012/0056424 | A1 | 3/2012 | Holstein |
| 2012/0068470 | A1 | 3/2012 | Farb |
| 2012/0169052 | A1 | 7/2012 | Leipold-Buettner |
| 2012/0175879 | A1 | 7/2012 | Keech |
| 2012/0187695 | A1 | 7/2012 | Desplats |
| 2012/0189448 | A1 | 7/2012 | Jaquier |
| 2012/0217824 | A1 | 8/2012 | Gupta |
| 2012/0265356 | A1 | 10/2012 | Yasugi |
| 2013/0008242 | A1 | 1/2013 | Sakaguchi |

(56) References Cited

U.S. PATENT DOCUMENTS

| | | |
|---|---|---|
| 2013/0114312 A1 | 5/2013 | Reichard |
| 2013/0197704 A1 | 8/2013 | Pan |
| 2013/0207624 A1 | 8/2013 | Aaltonen |
| 2013/0219812 A1 | 8/2013 | Goodman et al. |
| 2013/0313827 A1 | 11/2013 | Lovmand et al. |
| 2013/0333689 A1 | 12/2013 | Umemoto |
| 2014/0010656 A1 | 1/2014 | Nies |
| 2014/0145550 A1 | 5/2014 | Hitchcock |
| 2014/0150774 A1 | 6/2014 | Chang |
| 2014/0150843 A1 | 6/2014 | Pearce |
| 2014/0150845 A1 | 6/2014 | Chang |
| 2014/0234103 A1 | 8/2014 | Obrecht |
| 2015/0076828 A1 | 3/2015 | Palethorpe |
| 2015/0108762 A1 | 4/2015 | Michaud-Lariviere |
| 2015/0123401 A1 | 5/2015 | Vigars |
| 2015/0137519 A1 | 5/2015 | Tarnowski |
| 2015/0377213 A1 | 12/2015 | Deshpande |
| 2016/0222946 A1 | 8/2016 | Krings |
| 2016/0312768 A1 | 10/2016 | Takakura |
| 2016/0378085 A1 | 12/2016 | Guo |
| 2017/0054301 A1 | 2/2017 | Fintzos |
| 2017/0058899 A1 | 3/2017 | Ichihara |
| 2017/0074249 A1 | 3/2017 | Smook |
| 2017/0114778 A1 | 4/2017 | Madson |
| 2017/0214249 A1 | 7/2017 | Seeley |
| 2017/0298902 A1 | 10/2017 | Gdovic |
| 2017/0324367 A1 | 11/2017 | Collins |
| 2018/0010576 A1 | 1/2018 | Brake et al. |
| 2018/0097360 A1 | 4/2018 | Batten |
| 2018/0110328 A1 | 4/2018 | Mayer |
| 2018/0142669 A1 | 5/2018 | Cho et al. |
| 2018/0171972 A1 | 6/2018 | Merz et al. |
| 2018/0175661 A1 | 6/2018 | Tuerk |
| 2018/0238305 A1 | 8/2018 | McMahon |
| 2018/0301906 A1 | 10/2018 | Qureshi |
| 2018/0306169 A1 | 10/2018 | Dharmadhikari et al. |
| 2018/0340515 A1 | 11/2018 | Hitachi |
| 2019/0052206 A1 | 2/2019 | Noderer |
| 2019/0093628 A1 | 3/2019 | Lin |
| 2019/0186145 A1 | 6/2019 | Farb |
| 2019/0360469 A1 | 11/2019 | De Boer |
| 2020/0106295 A1 | 4/2020 | Trzemzalski |
| 2020/0161868 A1* | 5/2020 | Park ........................ H02J 3/381 |
| 2020/0232446 A1 | 7/2020 | Hawkins |
| 2020/0280281 A1 | 9/2020 | Vaidyanathan |
| 2021/0033062 A1 | 2/2021 | Mishra |
| 2021/0075252 A1 | 3/2021 | Caamano et al. |
| 2021/0098994 A1 | 4/2021 | White |
| 2021/0126541 A1 | 4/2021 | Zhang |
| 2021/0148330 A1 | 5/2021 | Kukkonen |
| 2021/0164442 A1 | 6/2021 | Bonfiglio |
| 2021/0262441 A1 | 8/2021 | Jacobsen |
| 2021/0262443 A1 | 8/2021 | Goldblatt |
| 2021/0301784 A1 | 9/2021 | Cory |
| 2022/0060016 A1 | 2/2022 | Mitsunaga |
| 2022/0077686 A1 | 3/2022 | Ma |
| 2022/0258624 A1 | 8/2022 | Deppe |
| 2022/0263457 A1 | 8/2022 | Akhavan-Tafti |
| 2022/0299959 A1 | 9/2022 | Schirmer |
| 2022/0321052 A1 | 10/2022 | Sassi |
| 2022/0407349 A1 | 12/2022 | Owens |
| 2023/0061818 A1 | 3/2023 | Westergaard |
| 2023/0092176 A1 | 3/2023 | Ricketts |
| 2023/0141320 A1 | 5/2023 | Sepulveda Gonzalez |
| 2023/0184218 A1 | 6/2023 | Lund |
| 2023/0246584 A1 | 8/2023 | Perret |
| 2023/0250793 A1 | 8/2023 | Farb et al. |
| 2023/0250801 A1 | 8/2023 | Farb |
| 2023/0250804 A1 | 8/2023 | Farb |
| 2023/0283079 A1 | 9/2023 | Weaver |
| 2023/0294532 A1 | 9/2023 | Bernasconi |
| 2023/0323858 A1 | 10/2023 | Farb |
| 2023/0324866 A1 | 10/2023 | Farb |
| 2023/0327455 A1 | 10/2023 | Farb |
| 2023/0327456 A1 | 10/2023 | Farb |
| 2023/0340936 A1 | 10/2023 | Gaber |
| 2023/0402739 A1 | 12/2023 | Hoganson |
| 2024/0060468 A1 | 2/2024 | Abdallah |

FOREIGN PATENT DOCUMENTS

| | | |
|---|---|---|
| CN | 2409347 Y | 12/2000 |
| CN | 202012843 U | 10/2011 |
| CN | 103683622 A | 3/2014 |
| CN | 109630360 A | 4/2019 |
| CN | 107131099 B | 11/2019 |
| CN | 113272545 A | 8/2021 |
| DE | 102010024153 A1 | 12/2011 |
| DE | 202012000670 U1 | 8/2012 |
| EP | 3096004 A1 | 11/2016 |
| EP | 3023636 B1 | 4/2021 |
| EP | 3885574 B1 | 2/2024 |
| GB | 2440264 A | 1/2008 |
| JP | 2007107496 A | 4/2007 |
| KR | 20100039917 A | 4/2010 |
| KR | 20110008951 U | 9/2011 |
| KR | 101476673 B1 | 12/2014 |
| KR | 102060281 B1 | 12/2019 |
| RU | 2588914 C2 | 7/2016 |
| WO | 202012000670 A1 | 8/2012 |
| WO | 2013073930 A1 | 5/2013 |
| WO | 2013174090 A1 | 11/2013 |
| WO | 2013175035 A1 | 11/2013 |
| WO | 2018029401 A1 | 2/2019 |
| WO | 2020254161 A1 | 6/2020 |
| WO | 20200150108 A1 | 7/2020 |
| WO | 2021231485 A1 | 11/2021 |
| WO | 2023028203 A1 | 3/2023 |

OTHER PUBLICATIONS

"Outer Rotor Permanent Magnet Direct Drive Wind Turbin" dated XX, https://www.pengky.cn/zz-direct-drive-turbine/ external-rotor-generator/external-rotor-generator.html (Last accessed May 4, 2023).

PCT International Search Report and Written Opinion mailed Jul. 28, 2023, issued in corresponding International Application No. PCT/US23/62170 (6 pgs.).

Blum, Franz, et al. "Device for providing a platform on the roof of a building", May 14, 2020, EPO, DE 102018128308-A1 (Year: 2020).

Arias, Vega Fernando et al., "Mounting for Instruments on Buildings and Method for Installing Same", Oct. 15, 2012, ES- 2388388-A1 (Year: 2012).

Guetty, Richard Jean Claude, "Covering Element for Houses, Motor-Vehicles or the Like", Mar. 30, 2015, Romanian Patent Office, RO 130984A2 (Year: 2016).

International Search Report and Written Opinion, dated Aug. 14, 2024, issued in International Patent Application No. PCT/US24/23527.

Chandler, David L. (2024). "MIT engineers' new theory could improve the design and operation of wind farms," MIT News on Campus and Around the World. Retrieved from https://news.mit.edu/2024/new-theory-could-improve-design-and-operation-wind-farms-0821.

Berhanu et al., "Numerical and experimental investigation of an exhaust air energy recovery Savonius wind turbine for power production," Science Direct, (2021), https://doi.org/10.1016/j.matpr.2021.02.675.

Chong et al., "Design of an exhaust air energy recovery wind turbine generator for energy conservation in commercial buildings," Science Direct, vol. 67, pp. 252-256, (2014). https://doi.org/10.1016/j.renene.2013.11.028.

Singh et al., "Recovery of Energy From Exhaust Air of Textile Industry With the Help of Vawt," International Research Journal of Engineering and Technology (IRJET), 7(3), 4820-4828, (2020).

Ismail et al., "Study On the Potentiality of Power Generations from Exhaust Air Energy Recovery Wind Turbine: A Review," Journal of Advanced Research in Fluid Mechanics and Thermal Sciences, 87(3), 148-171, (2021), https://doi.org/10.37934/arfmts.87.3.148171.

(56) References Cited

OTHER PUBLICATIONS

Shahid, Rehan, "Generating Electricity From Exhaust Air Using Wind Turbine", Aug. 5, 2015, Retrieved from: https://www.linkedin.com/pulse/generating-electricity-using-exhaust-air-rehan-shahid. (Year: 2015).

Francisco Haces-Fernandez, Hua Li, David Ramirez, "Improving wind farm power output through deactivating selected wind turbines, Energy Conversion and Management", vol. 187, 2019, pp. 407-422, ISSN 0196-8904.

Howland, M.F., Quesada, J.B., Martinez, J.J.P et al. "Collective wind farm operation based on a predictive model increases utility-scale energy production." Nat Energy 7, 818-827 (2022).

Howland MF, Lele SK, Dabiri JO. "Wind farm power optimization through wake steering." Proc Natl Acad Sci U S A. Jul. 16, 2019;116(29):14495-14500. doi: 10.1073/pnas.1903680116. Epub Jul. 1, 2019. PMID: 31262816; PMCID: PMC6642370.

M. Pape and M. Kazerani, "Turbine Startup and Shutdown in Wind Farms Featuring Partial Power Processing Converters," in IEEE Open Access Journal of Power and Energy, vol. 7, pp. 254-264, 2020, doi: 10.1109/OAJPE.2020.3006352.

PCT International Search Report and Written Opinion mailed Nov. 23, 2023, issued in corresponding International Application No. PCT/US2023/065609 (17 pgs.).

Syahputra et al. "Performance Improvement for Small-Scale Wind Turbine System Based on Maximum Power Point Tracking Control." in: Energies 2019, 12(20), Oct. 17, 2019, [online] [retrieved on Dec. 27, 2023 (Dec. 27, 2023)] Retrieved from the Internet <URL: https://www.mdpi.com/1996-1073/12/20/3938 >, entire document.

International Search Report and Written Opinion for PCT/US2023/073016 dated Feb. 8, 2024, 9 pages.

"Each Wind Harvester Project in 2023 and 2024 will advance our commercialization objectives" Wind Harvest International, 2023, Inc. https://windharvest.com/about/projects/ (Last accessed on Feb. 17, 2023).

Chandler D.L., "A new method boosts wind farms' energy output, without new equipment," MIT News, Aug. 22, 2022.

International Search Report and Written Opinion, dated Sep. 13, 2023, issued in International Patent Application No. PCT/US2023/65612 (10 pages).

International Search Report and Written Opinion, dated Mar. 28, 2024, issued in International Patent Application No. PCT/US2023/074425 (8 pages).

Daniel, Mark Farb. 2023. Leaves on a Pole. U.S. Appl. No. 29/883,242, filed Jan. 26, 2023.

Tran et al., "The aerodynamic interference effects of a floating offshore wind turbine experiencing platform pitching and yawing motions", Jun. 2014, Journal of Mechanical Science and Technology 29 (2) (2015) 549-561. (Year: 2014).

Chen et al., "Interactions between approaching flow and hydrokinetic turbines in a staggered layout", Jun. 2023, Renewable Energy 218 (2023) 119339. (Year: 2023).

Wei et al., "An experimental study on the effects of relative rotation direction on the wake interferences among tandem wind turbines", Jan. 2014, Science China Physics, Mechanics & Astronomy, May 2014 vol. 57 No.5: 935-949. (Year: 2014).

International Search Report and Written Opinion, dated Jun. 21, 2024, issued in International Patent Application No. PCT/US2024/11337.

Kevin Sehn, "Aerodynamic Mitigation of Extreme Wind Loading on Low-rise Buildings", 2008, Iowa State University, UMI No. 1453904 (Year: 2008).

\* cited by examiner

DUAL MODE TURBINE FOR SUPPLYING ENERGY USING A SMART INVERTER

CROSS REFERENCES TO RELATED APPLICATIONS

This application is a continuation of U.S. patent application Ser. No. 18/195,070 filed May 9, 2023, which is a continuation of PCT International Application No. PCT/US2023/065609, filed Apr. 11, 2023, which claims the benefit of priority of U.S. Provisional Patent Application No. 63/329,900, filed on Apr. 12, 2022, the entire contents of all of which are incorporated herein by reference.

TECHNICAL FIELD

The present disclosure generally relates to the field of fluid turbines. More specifically, the present disclosure relates to systems, methods, and devices for operating a cluster of fluid turbines.

BACKGROUND

As challenges posed by climate change continue to increase, more attention is being devoted to green energy alternatives to fossil fuels. Some attractive alternatives to fossil fuels include turbines that harness power from a fluid flow, such as wind, ocean currents, a steam flow, or a gas flow. In some cases, due to physical constraints limiting how much energy may be generated by any single turbine, clusters of turbines may be constructed, allowing for aggregation of energy generated by multiple individual turbines. For example, aggregating energy produced by a cluster of turbines may allow scaling up green energy production sufficiently to provide a reliable supply of green energy to an electrical grid, as a replacement for fossil fuels. However, clusters of fluid turbines may require coordinated maintenance, repairs, and safety checks. In addition, in some cases, coordinating the operations of clustered turbines may improve performance, allowing them to increase green energy production with improved efficiency. Systems and methods for coordinating operations of clustered turbines may therefore be beneficial.

SUMMARY

Embodiments consistent with the present disclosure provide systems and methods generally relating to operating a cluster of geographically-associated fluid turbines. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executable by at least one processing device and perform any of the steps and/or methods described herein.

Consistent with disclosed embodiments, systems, methods, and computer readable media for controlling an energy generator are disclosed. The embodiments may include at least one processor configured to: receive a sensed indicator associated with electrical energy generated by the energy generator; compare the received indicator with a threshold associated with real-time supply of energy to an associated electrical energy sink; and control a controllable switch based on the comparison, wherein the controllable switch is configured to alternately toggle between a first mode of operation and a second mode of operation, wherein in the first mode of operation, energy generated by the energy generator during operation at a sub-threshold level insufficient for real-time supply of energy to an associated electrical energy sink is stored in at least one energy storage component, and during the second mode of operation, energy generated by the energy generator during operation above the threshold level for real-time supply of energy to the associated electrical energy sink is provided to the associated energy sink via an energy converter, and wherein alternately toggling between the first mode of operation and the second mode of operation thereby permits energy generated at the sub-threshold level to be collected and intermittently used.

Consistent with disclosed embodiments, systems, methods, and computer readable media for controlling aggregated voltage for a cluster of fluid turbines are disclosed. The embodiments may include at least one processor configured to: receive a target voltage level for the cluster of fluid turbines; receive via a plurality of rectifiers, each rectifier associated with a different fluid turbine in the cluster of fluid turbines, an indication of a DC voltage associated with each fluid turbine, wherein the DC voltage is associated with at least one of the fluid turbines in the cluster is below the target voltage level; and based on the received indications of the DC voltage signals associated with each fluid turbine in the cluster, output a control signal to each of a plurality of DC-DC converters associated with the plurality of rectifiers, wherein each control signal is configured to regulate each DC-DC converter to produce a DC output signal at the target voltage level such that combining each DC output signal in parallel produces an aggregate DC voltage conforming to the target voltage level.

Consistent with disclosed embodiments, systems, methods, and computer readable media for communicating power from a cluster of fluid turbines to an electrical grid are disclosed. The embodiments may include at least one processor configured to: confirm that a connection of the cluster of fluid turbines to an electrical grid conforms with at least one predetermined operating parameter; when conformity of an electrical grid connection with the at least one predetermined operating parameter is confirmed, enabling inversion of an aggregated DC voltage to an AC voltage compatible with the electrical grid and enabling output of the AC voltage to the electrical grid; and when conformity of the electrical grid connection with the at least one predetermined operating parameter is not confirmed, preventing output of the AC voltage to the electrical grid.

Consistent with disclosed embodiments, systems, methods, and computer readable media for dual-channel control of a fluid turbine are disclosed. The embodiments may include at least one processor configured to: receive, via an AC channel coupled to an AC output of the fluid turbine, first signals indicating fluctuations in power generated by the fluid turbine operating below a grid power supply threshold; access an MPPT protocol; determine a correspondence between the first signals and a portion of the MPPT protocol; apply the portion of the MPPT protocol to a generator of the fluid turbine to generate greater power than would be generated in an absence of application of the portion of the MPPT protocol, wherein the generated power is stored as energy in a capacitor associated with the generator; receive, via a DC channel, second signals indicating a level of energy stored in the capacitor; and use the second signals to determine when to release the stored energy.

DETAILED DESCRIPTION

Figure 1:
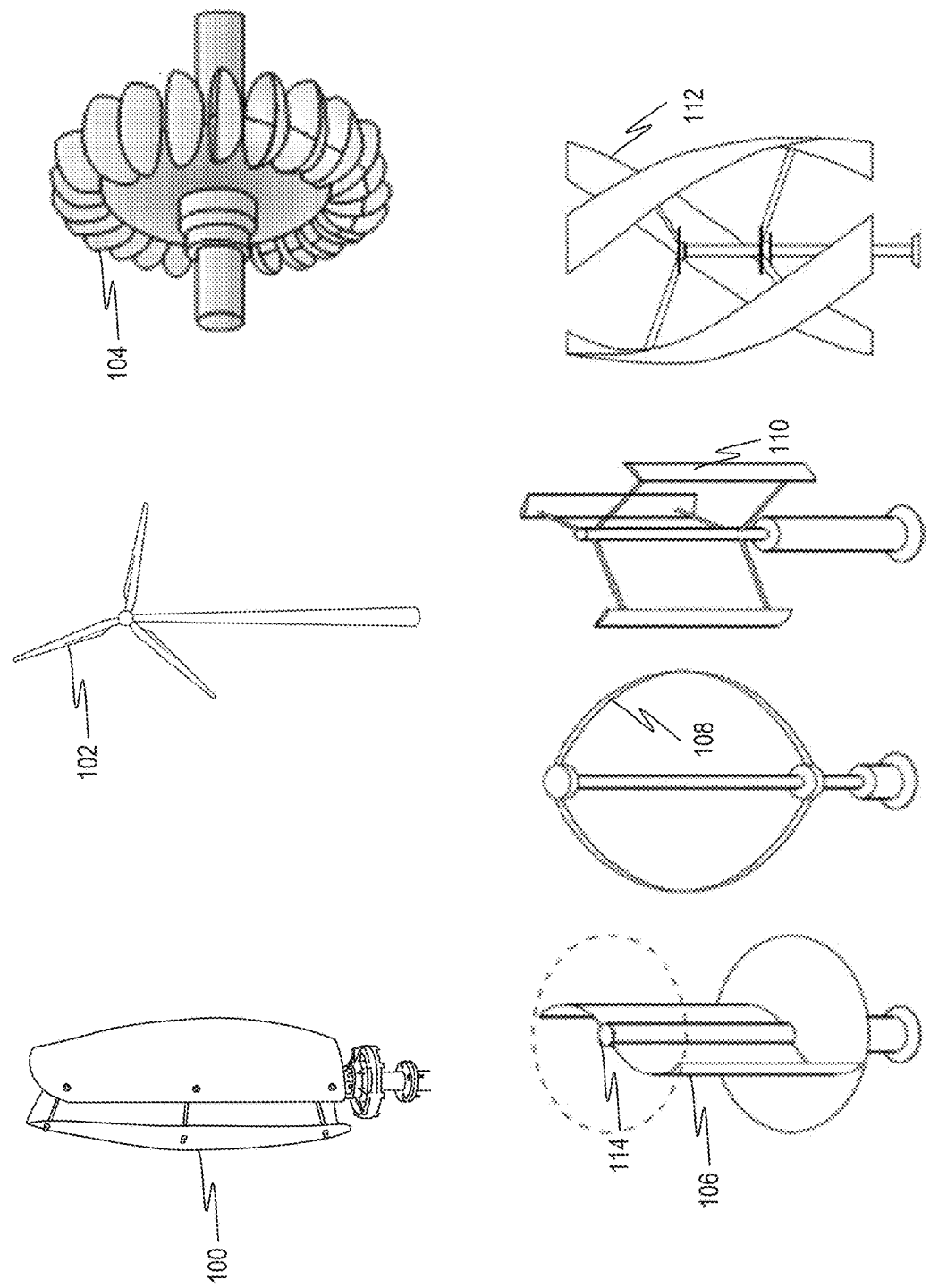
FIG. 1 illustrates an exemplary variety of fluid turbines, each of which is consistent with some embodiments of the present disclosure.

Disclosed herein are systems, methods, and non-transitory computer readable media for controlling and/or coordinating operations of one or more fluid turbines (e.g., a cluster of geographically-associated fluid turbines). The fluid turbines referred to herein may be configured to harness energy from wind, water, steam, and/or gas flow. Although some non-limiting examples are given relating to wind turbines (specifically vertical wind turbines), these examples are intended for illustrative purposes only, and do not limit this disclosure. Furthermore, in some cases the term "fluid turbine" may be understood to include an electric energy generator in an integral fluid energy conversion system.

Various terms used in this detailed description and in the claims may be defined or summarized differently when discussed in connection with differing disclosed embodiments. It is to be understood that the definitions, summaries, and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily lack that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

Aspects of the present disclosure is directed to systems, devices, methods, and non-transitory computer readable media for operating one or more fluid turbines (e.g., a cluster of fluid turbines) under variable fluid conditions. In some cases, each fluid turbine in a cluster may be exposed to substantially the same environmental factors (e.g., the same or similar wind conditions, water current, and temperature). Under low fluid conditions, energy produced by one or more fluid turbines may fail to meet one or more threshold requirements associated with supplying generated electrical energy to an electrical grid. For instance, AC voltage generated under low fluid conditions may fail to meet a threshold for an inverter and/or an electrical grid requirement. Low fluid conditions may refer to a fluid having a fluid velocity below a minimal fluid flow threshold. For example, a fluid velocity above the minimal power threshold may be necessary for a fluid turbine to generate power. Disclosed embodiments may allow harnessing energy generated under low fluid conditions to increase operational efficiency of one or more fluid turbines and facilitate compliance with one or more standards and/or regulations for supplying AC power to an electrical grid.

A flow (e.g., a fluid flow) may refer to movement or continual deformation of a fluid under an applied force. Flow may correspond to kinetic energy of particles or molecules of a fluid. For example, a temperature gradient in a fluid may cause warmer fluid to rise and cooler fluid to sink in a cyclical flow motion. Uneven heating of the Earth by the sun (e.g., combined with the Earth's rotation) may cause wind (e.g., airflow). Similarly, wind, water density differentials, gravity, and the Earth's rotation may cause ocean currents (e.g., water flow). Examples of turbines for obtaining energy from a flow may include a windmill, a waterwheel, a steam turbine, or a gas turbine.

A wind flow may refer to a fluid flow consisting of air. A water flow may refer to a fluid flow consisting of water, e.g., as an ocean or river current.

A fluid turbine may include a mechanical device configured to capture energy from a fluid flow (e.g., a flow of water, steam, gas, or wind) and convert the captured energy to a form of work (e.g., a rotary motion). A fluid turbine may include at least one moving part coupled to a plurality of blades connected to a shaft. A fluid turbine may rotate, for example, in response to an air flow incident on a plurality of blades or in response to water flow on an impeller (e.g., paddle wheel, a water wheel), or in response to steam or gas flow. The plurality of blades and shaft may be connected to a rotor of an electric energy generator for converting the mechanical rotational motion of the plurality of blades and shaft to electrical energy, as described in greater detail below. A fluid turbine may have a horizontal axis of rotation (e.g., the axis around which the fluid turbine rotates is substantially parallel to the ground or flow), or a vertical axis of rotation (e.g., the axis around which the fluid turbine rotates is at a right angle to the ground or flow). In some embodiments the axis of rotation may be neither horizontal or vertical, and in other embodiments, the axis of rotation may be variable. A fluid turbine may begin generating power when a fluid flow exceeds a lower threshold (e.g., a cut-in value).

A shaft of a fluid turbine may include a pole, a rod, a post, a support, a pylon, or any other axle or axis. In some embodiments, a shaft may be used to support one or more objects. For example, blades of a vertical fluid turbine may be connected to a shaft allowing the blades to be supported vertically by the shaft which may rotate with the blades. Connecting the shaft with the blades to a rotor may allow transferring kinetic energy of a flowing fluid to a rotary motion by the rotor to produce electrical energy. As another example, blades of an impeller may be connected to a horizontally oriented shaft that may rotate with the blades.

A blade (e.g., as part of a plurality of blades) of a turbine may refer to an object having a cross-sectional shape having a curved surface (e.g., an airfoil shape or a cupped shape typical of drag-type turbines) configured to cause a motion (e.g., a rotational motion) consistent with the fluid motion (e.g., a rotational motion) incident on the blades. A fluid turbine may include a plurality of blades mounted onto a rim of a disc. Movement of a fluid across the blades may produce a tangential force that may cause rotation of a rotor connected thereto. Moving fluid may act on the blades of a fluid turbine causing the blades to rotate and impart rotational energy to a rotor. The blades may extend from the rotor in that they protrude from the rotor or from a mounting plate mechanically connected to the rotor. Connecting a plurality of blades to a rotor (e.g., directly or indirectly) may cause the plurality of blades to extend outwards and/or upwards from the rotor.

A cluster of fluid turbines may refer to a plurality of fluid turbines positioned in relative proximity to each other, to form a group or collection of fluid turbines. A cluster of fluid turbines may include at least two fluid turbines at a location including a plurality of fluid turbines. In some embodiments, a cluster of fluid turbines may include all of the fluid turbines at a location. In some embodiments, a cluster of fluid turbines may include fewer than all of the fluid turbines at a location. Clustered fluid turbines may be positioned in an arrangement such that each fluid turbine may be exposed to substantially similar environmental conditions and fluid flow (e.g., wind conditions, temperature, precipitation, water current). In some embodiments, at least some of clustered fluid turbines may be fluidly coupled such that blade motion of a fluidly-coupled upstream fluid turbine may cause a fluid flow or turbulence that may affect or influence the blade motion of a fluidly-coupled downstream fluid turbine in the cluster. In some embodiments, each clustered fluid turbine may be fluidly coupled with at least one other fluid turbine. In some embodiments, at least one clustered fluid turbine may be independent such that blade motion of the independent clustered turbine may be indifferent to blade motion of any other clustered fluid turbine, and may not affect blade motion of any other clustered fluid turbine. In some embodiments, each fluid turbine in a cluster may be independent.

Electrical energy may refer to energy associated with electrically charged particles. Electrical energy may be supplied as current (e.g., an electron flow) through an electric potential (e.g., voltage). A fluid turbine coupled to an energy generator may convert mechanical energy (e.g., in a fluid flow) to electrical energy for supplying to an electrical energy sink, such as a capacitor, a battery, an electrical load, and/or an electrical grid.

A voltage may refer to an electrical potential difference between two points. A voltage may be associated with a tension between two points to reduce or eliminate an electrical potential difference therebetween. For example the tension may be reduced by a current flowing from one point to the other point, e.g., crossing the electrical potential difference.

Power (e.g., electric power) may refer to a rate at which electrical energy may be transferred by an electric circuit. Electric power may be measured in watts (e.g., Kilowatts, or Megawatts) and may refer to a rate of electrical energy transferred by an electric circuit. Power may be calculated from a known voltage and/or current level (e.g., watts=volts×amps). Electric power may be generated by an electric energy generator (e.g., connected to a fluid turbine). As used herein, the phrase "power generated by a fluid turbine" or "power output from a fluid turbine" may refer to power generated by an energy generator associated with the fluid turbine.

An energy generator (e.g., an alternator) may include a device configured to convert motive or mechanical power to electric power. An energy generator may include a rotor and a stator in which windings (e.g., copper wires) may be electromagnetically coupled to an alternating magnetic field for conversion of non-electrical energy (e.g. rotational or kinetic energy) to electrical energy. An energy generator may be associated with a fluid turbine (e.g., steam, water, air, and/or gas turbine). Mechanical energy as rotational motion of a fluid turbine may be transferred to a rotor of an electric generator. The rotational motion of the rotor may cause an alternating magnetic field to surround the windings, which may induce an alternating current, thereby converting mechanical energy to electrical energy. In some embodiments, the rotor may include a magnet or magnets, and the stator may include windings. In some embodiments, the rotor may include windings and the stator may include a magnet or magnets. In some embodiments, a rotor may be configured to rotate within a stator (e.g., a stator may be formed as a ring or donut surrounding a rotor.) In some embodiments, a rotor may be configured to rotate about a stator (e.g., a rotor may be formed as a ring or donut surrounding a stator). In some embodiments, a rotor of an energy generator may be connected to rotatable blades and/or a rotatable shaft of a fluid turbine, allowing the rotor to rotate in response to a fluid flow.

A rotor may refer to a rotating component of an electromagnetic system (e.g., an electric motor, electric energy generator, or an alternator). A rotor may rotate, turn, or spin to induce a torque around an axis of the rotor. A stator may refer to a stationary (e.g., non-moving) component of a rotary electromagnetic system. A rotor electromagnetically coupled to a stator may allow for interactions between an electromagnetic coil of an electric conducting wire (e.g., windings) and an alternating magnetic field. The interactions may allow conversion of electrical energy to mechanical energy as rotational motion (e.g., as in a motor) and to convert mechanical energy as rotational motion to electrical energy (e.g., as in an electric energy generator). For example, energy may flow from a rotating component to a stator, as in an energy generator where a stator may convert a rotating magnetic field to an alternating electric current.

Electronic circuitry may include any combination of electronic components (e.g., one or more of memory units, switches, transistors, diodes, gates, capacitors, inductors, resistors, transformers, converters, inverters, rectifiers, DC-DC converters, more power supplies, voltage sensors, current sensors, or other electronic componentry) connected via one or more connecting wires and/or contacts for performing one or more operations (e.g., logical operations) in response to receiving an electric signal as an input (e.g., from at least one processor operating as a controller). Circuitry may include one or more integrated circuits (ICs), including one or more processors. Circuitry may further include one or more communication channels and/or links. The communication links may couple the one or more ICs to the memory, thereby enabling the one or more ICs to receive a computing instruction and/or data stored thereon required to perform a corresponding logical operation. The communication channels coupling the one or more ICs to the memory may include wired channels, such as one or more cables, fibers, wires, buses, and any other mechanically coupled communication channel. The communication channels may include wireless channels such as short, medium, and long-wave radio communication channels (e.g., Wifi, BlueTooth, Zigbee, cellular, satellite), optical, and acoustic communication channels. The communications channels or links may include wires, cables, and/or fibers configured to transmit power (e.g., AC and/or DC power) generated by one or more fluid turbines. The communications channels or links may include communication links for transmitting electronic signals readable by at least one processor.

At least one processor may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

A processor may be configured to perform calculations and computations, such as arithmetic and/or logical operations to execute software instructions, control and run processes, and store, manipulate, and delete data from memory. An example of a processor may include a microprocessor manufactured by Intel™. A processor may include a single core or multiple core processors executing parallel processes simultaneously. It is appreciated that other types of processor arrangements could be implemented to provide the capabilities disclosed herein.

At least one processor may include a single processor or multiple processors communicatively linked to each other and capable of performing computations in a cooperative manner, such as to collectively perform a single task by dividing the task into subtasks and distributing the subtasks among the multiple processors, e.g., using a load balancer. In some embodiments, at least one processor may include multiple processors communicatively linked over a communications network (e.g., a local and/or remote communications network including wired and/or wireless communications links). The multiple linked processors may be configured to collectively perform computations in a distributed manner (e.g., as known in the art of distributed computing).

In some embodiments, at least one processor may include a plurality of processors configured to control a plurality of geographically-associated fluid turbines (e.g., a cluster of fluid turbines). In some embodiments, one or more fluid turbines in a cluster of fluid turbines may be associated with one or more specific processors, e.g., dedicated to a specific fluid turbine or a subset of specific fluid turbines in a cluster. In some embodiments, one or more processors may be configured in a central control unit to collectively control the operations of each fluid turbine in a cluster of fluid turbines. In some embodiments, at least one processor may include one or more processors dedicated to a specific fluid turbine in a cluster of fluid turbines, and one or more processors in a central control unit configured to control operations of the entire cluster of fluid turbines. In some embodiments, at least one processor may control operations of a plurality of geographically-associated fluid turbines to allow the plurality of geographically-associated fluid turbines to operate collectively as a single fluid energy conversion system.

A non-transitory computer-readable storage medium (e.g., a memory) refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located locally (e.g., in physical proximity to at least one processor and connected via a local communications link) or at a remote location (e.g., accessible to at least one processor via a communications network). Additionally, one or more computer-readable storage mediums can be utilized in implementing a computer-implemented method. Accordingly, the term computer-readable storage medium should be understood to include tangible items and exclude carrier waves and transient signals.

In some embodiments, a memory may include a plurality of memory storage devices configured to store information for controlling a plurality of geographically-associated fluid turbines (e.g., a cluster of fluid turbines). In some embodiments, one or more fluid turbines in a cluster of fluid turbines may be associated with one or more specific memory devices, e.g., dedicated to a specific fluid turbine or a subset of specific fluid turbines in a cluster. In some embodiments, one or more memory devices may be configured with a central control unit to collectively store information for controlling each fluid turbine in a cluster of fluid turbines. In some embodiments, a memory may include one or more memory devices dedicated to a specific fluid turbine in a cluster of fluid turbines, and one or more memory devices in a central control unit configured to store information for controlling the entire cluster of fluid turbines. In some embodiments, a memory may store information for controlling operations of a plurality of geographically-associated fluid turbines to allow the plurality of geographically-associated fluid turbines to operate collectively as a single fluid energy conversion system.

Consistent with the present disclosure, disclosed embodiments may involve a network. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Direct current (DC) (e.g., a DC power signal) may refer to a one-directional flow of electric charge. DC power may be used to operate a processor or controller. An example of DC power may include power produced by an electrochemical cell (e.g., a battery) or power stored in a capacitor. Electronic devices such as processors, controller, and memory devices may be operated using DC power.

Alternating current (AC) (e.g., an AC power signal) may refer to a bi-directional flow of electrical charge exhibiting a periodic change in direction. An AC current flow may change between positive and negative due to the positive or negative flow of electrons, producing a sinusoidal AC wave. An alternator may create AC power by positioning a conductive coil (e.g., copper windings) inside a fluctuating magnetic field. The fluctuating magnetic polarities may cause electric current in the conductive coil to change direction, producing an electrical waveform signal. AC power may travel farther than DC power without losing power, which may be advantageous for delivering power from power generating systems to consumers of electricity. An electric energy generator may generate AC power, and an electric power grid may supply AC power to consumers.

A three-phase voltage signal may refer to a voltage signal distributed as three voltage signals, each voltage signal at a phase shift of 120 degrees from the other voltage signals such that peaks and valleys of the three voltage signals do not align. The three voltage signals may be offset from each other by one-third of each cycle such that the waveform produced by each phase may be offset from one-third of a cycle produced by the other two phases. A three-phase voltage signal may allow for efficient stepping up and stepping down of high voltages for power transmission.

A load (e.g., an electrical load) may refer to an impedance or resistance. Such a load may be imposed on an electric energy generator (e.g., and a fluid turbine connected thereto) causing rotation of the electric energy generator and/or a fluid turbine connected thereto to slow. Generating a load may involve drawing away at least some electrical energy produced by an energy generator to an energy sink. Drawing away more electrical energy (e.g., increasing a load) may increase an impedance causing a rotational velocity of the fluid turbine to slow down. Drawing away less electrical energy (e.g., decreasing the load) may reduce an impedance cause a rotational velocity of the fluid turbine to increase.

A rectifier may refer to a device or circuitry that converts an alternating current (AC) to a direct current (DC) signal (e.g., an AC-to-DC converter). A rectifier may convert AC power (e.g., generated by an electric energy generator) to DC power (e.g., to power at least one processor). In some embodiments, each of the geographically-associated fluid turbines may be associated with a dedicated rectifier. The dedicated rectifiers for each fluid turbine may be housed in a separate housing (e.g., per fluid turbine), or in a common housing for multiple fluid turbines.

An inverter (e.g., a power inverter) may refer to a device or circuitry that converts a direct current (DC) signal to an AC signal (e.g., a DC-to-AC converter). An inverter may convert a DC signal to produce a square wave, a sine wave, a modified sine wave, a pulsed sine wave, a pulse width modulated wave (PWM) depending on the circuit design of the inverter. An inverter may convert DC power to AC power for transmitting to an electric power grid. In some embodiments, the plurality of geographically-associated fluid turbines may be associated with a single inverter for outputting collectively generated AC power to a power grid.

For instance, each AC power signal outputted by each geographically-associated fluid turbine may be converted to a DC power signal via each of the dedicated rectifiers. Circuitry (e.g., including at least one processor) may process the DC power signals to enable combining each of the DC power signals to form an aggregate DC power signal, such that converting the aggregate DC power signal via an inverter may produce an AC power signal that may be compatible for transmitting to an electric power grid.

A capacitor may refer to an electronic component configured to store electrostatic energy in an electric field by storing electric charge on two opposing surfaces (e.g., conducting plates) separated by an insulator (e.g., a dielectric medium). Applying an electric potential difference (e.g., a voltage) across the plates of a capacitor, may cause an electric field to develop across the dielectric medium, causing a net positive charge to accumulate on one plate and net negative charge to accumulate on the opposing plate, allowing for storage of electrical energy as a potential difference between the two plates. The plates of a capacitor may be connected to other circuit components (e.g., via contacts of the capacitor) allowing for integration of one or more capacitors into an electronic circuit. In some embodiments, a capacitor may function as a source of electrical energy (e.g., similar to a battery). However, a capacitor may be differentiated from a battery because a capacitor may lack a chemical reaction to receive, store and generate electrical energy. A capacitor may be manufacturable on a microelectronic scale for integration with other microelectronic components, e.g., in a photolithographic process.

A battery may refer to an electrical device configured to convert chemical energy into electrical energy or vice versa. A battery may include one or more cells, each cell containing electrodes and an electrolyte. When the electrodes are connected to an external circuit, a chemical reaction may occur in the electrolyte, creating a flow of electrons, which generates an electric current. The amount of electrical energy that can be stored in a battery may be determined by the capacity (e.g., measured in amp-hours, Ah, or milliampere-hours, mAh). Batteries may be rechargeable, or non-rechargeable.

A battery bank may include a plurality of batteries connected together in a series or parallel configuration to provide a larger capacity and/or higher voltage. A battery bank may be used to store electrical energy generated by a renewable energy source, such as a plurality of fluid turbines, e.g., for subsequent use by a consumer. In some embodiments, a battery bank may include multiple batteries connected in series to increase the voltage while maintaining a steady capacity. In some embodiments, a battery bank may include multiple batteries connected in parallel to increase capacity while maintaining a steady voltage. In some embodiments, a battery bank may include multiple batteries connected in series and in parallel to allow increasing voltage and capacity. A charge controller may be used to ensure that the batteries in a battery bank have a similar state of charge and similar electrical characteristics, e.g., to prevent overcharging, over-discharging, and/or uneven aging of one or more batteries included therein.

A DC-DC converter may include an electric power converter, for example, an electronic circuit and/or a device configured to convert a DC voltage signal from a first DC voltage level to a second voltage level. A DC-DC converter may reduce (e.g., buck) a DC voltage signal or increase (e.g., boost) a DC voltage signal. For instance, a DC-DC converter may store electrical energy temporarily and release the electrical energy at a different voltage. In some embodiments, a DC-DC converter may be designed to (e.g., substantially) maximize energy harvested from fluid turbines and/or photovoltaic cells (e.g., as a power optimizer). DC-DC converters may include electronic voltage converters (e.g., using one or more capacitors, inductors, and/or transformers), magnetic voltage converters (e.g., using an inductor and/or transformer to periodically release energy from a magnetic field stored therein), bi-directional DC-DC converters, and/or capacitive voltage converters.

A charge controller may refer to an electronic device configured to help ensure compliance of a fluid turbine with one or more regulations and/or specifications. For instance, a charge controller may prevent overcharging of a battery bank by a fluid turbine while limiting a rotational speed of the fluid turbine (e.g., when the battery bank is full and/or under high fluid speed conditions), and may allow aggregation of power from multiple fluid turbines without incurring loss due to interference. A charge controller may include an AC-to-DC converter (e.g., a rectifier), one or more of a voltage sensor switch, a voltage regulator (e.g., for regulating a DC voltage for supplying DC power to a battery bank), and/or a dump load (e.g., for diverting excess power to prevent overcharging). In some embodiments, a charge controller may include a user interface and/or features to protect against excessive voltage, current, and/or temperature. For example, the user interface may be associated one or more light emitting diodes or LEDs (e.g., to emit warning lights), speakers (e.g., to emit warning sounds), an electronic screen, and/or any other interface that may allow a user to interact with the charge controller.

A charge controller may be connected to an AC output of an electric energy generator connected to a fluid turbine. The AC-to-DC converter of the charge controller may convert the AC output to a DC signal (e.g., for aggregating with other DC signals produced by other charge controllers associated with other fluid turbines without incurring lossy interference). At least one voltage sensor switch of the charge controller may transmit the DC signal to charge the battery bank when the DC voltage level is below an upper limit for the battery bank, and may divert the DC signal (e.g., excess DC power) to the dump load when the DC voltage level exceeds the upper limit. The voltage regulator may regulate the DC voltage transmitted to the battery bank to comply with one or more specification, regulations, and/or recommendations associated with the battery bank.

An aggregate power signal may refer to a power signal produced by combining multiple electrical power signals originating from different power sources (e.g., energy generators) into a single, merged power signal. Aggregating power signals may require synchronizing the energy generators (e.g., synchronizing the frequency, the phase angle, and/or adjusting the voltage levels to reach a matched voltage level), and/or storing electrical energy of one or more power signals temporarily (e.g., in one or more capacitors and/or batteries). Once the power signals from each energy generator are synchronized and matched, the power signals may be combined using electrical devices such as power combiners or power distribution panels. The combined (e.g., aggregate) signal may be transmitted to an electrical grid or used to power a load.

An electrical grid (e.g., a power grid) may include an interconnected network delivering electric power (e.g., AC power) from a single or plurality of energy generators to a single or plurality of consumers. An electrical grid may be designed to supply electricity at a substantially steady voltage level under varying electrical power demand (e.g., by electrical energy sinks) and supply by (e.g., by energy generators). An electrical grid may use one or more tap changers or transformers to adjust a voltage and cause the voltage to remain within electrical grid specification. Attributes of power supplied to an electrical grid (e.g., frequency, phase, power level) by one or more energy generators may be required to comply with regulations or standards.

A signal may refer to information encoded for transmission via a physical medium. Examples of signals may include signals in the electromagnetic radiation spectrum (e.g., AM or FM radio, Wi-Fi, Bluetooth, radar, visible light, lidar, IR, Zigbee, Z-wave, and/or GPS signals), sound or ultrasonic signals, electrical signals (e.g., voltage, current, or electrical charge signals), electronic signals (e.g., as digital data), tactile signals (e.g., touch), and/or any other type of information encoded for transmission between two entities via a physical medium.

A detector may refer to a device that outputs an electronic signal in response to detecting, sensing, or measuring a physical phenomenon. A detector may convert a measurement of a physical phenomenon to a medium (e.g., an electronic medium) for receiving by at least one processor. A detector may include one or more of a mechanical sensor, an optical sensor, a resistive sensor, a capacitive sensor, a temperature sensor, a piezoelectric sensor, a Hall sensor, a thermocouple sensor, photoelectric sensor, a digital position sensor, a current sensor, a voltage sensor, a photoelectric encoder, a pressure sensor, a fluid (e.g., liquid) level sensors, a flow sensor, and/or any other type of sensor that may be used to detect position, linear displacement, pressure, temperature, flow, vibrations, rotational velocity, current, voltage, power, and/or any other parameter associated with, e.g., generation of electrical energy.

Tracking may include monitoring, observing, and/or recording, e.g., to observe a measured state of something over a time period. Tracking, in some instances, may additionally include adjusting, adapting, and/or updating one or more first parameters to maintain a correspondence between the one or more first parameters and a second parameter that may vary over time, e.g., in a feedback loop.

Maximum Power Point Tracking (MPPT) to one or more techniques for using the maximum power available in a fluid flow to extract maximum power from a fluid energy conversion system (e.g., a fluid turbine mechanically coupled to an energy generator). Examples of MPPT techniques include Perturb and Observe (hill climbing method), Incremental Conductance, Fractional Short Circuit Current, Fractional Open Circuit Voltage, Fuzzy Control, Neural Network, Extremum Seeking Control, and Model Predictive Control, among others. Under a given fluid flow velocity, a fluid turbine may output differing levels of power, depending on a rotational velocity of the blades and/or rotor. One such rotational velocity may correspond to a maximum power output for a fluid turbine operating under a specific fluid flow velocity. Maintaining a rotational velocity of a fluid turbine to correspond to a peak power output when operating under a particular fluid flow velocity may improve efficiency of a fluid turbine system. However, under a varying fluid flow, a rotational velocity for a fluid turbine may vary accordingly. Thus, under varying fluid flow conditions, efficiency in energy production may be improved by a controller dynamically adjusting a rotational velocity of a fluid turbine to achieve a rotational velocity corresponding to the maximum power output for a given fluid flow velocity at any given point in time. Such a technique may require a controller tracking a peak power output for a fluid turbine under varying fluid flow conditions, and continuously adjusting a rotational velocity to correspond to the peak power output at any particular point in time (e.g., using an MPPT protocol). Inaccuracy in tracking a peak power output for a fluid turbine may cause a controller to adjust a fluid turbine to rotate at a sub-optimal rotational velocity.

A controller (e.g., a charge controller) may enable maximum energy extraction by adjusting a shaft speed (e.g., corresponding to a rotational speed) of a fluid turbine in response to varying fluid speeds. The controller may adjust the shaft speed by sending an electrical signal to the copper windings of a generator rotor coupled thereto. The electrical signal may introduce an impedance (e.g., by shunting or shorting the copper windings) causing a rotational speed of the rotor to slow down, and causing a corresponding slowing of the fluid turbine coupled thereto for producing maximum power under varying fluid conditions. A charge controller may adjust a shaft speed by increasing or decreasing a load on an energy generator connected thereto. Some MPPT algorithms may require one or more inputs, such as the fluid speed, a rotational speed of the fluid turbine (e.g., rotor speed), a maximum power curve for a fluid turbine, or a mechanical power equation for a fluid turbine (e.g., obtained experimentally or via a simulation).

MPPT algorithms for fluid turbines may be based on direct and/or indirect power measurement, fluid speed measurement, and/or hybrid and/or smart algorithms (e.g., based on artificial intelligence techniques such as neural networks and fuzzy logic controllers) for tracking a maximum power point of a specific fluid turbine. Some MPPT algorithms for fluid turbines may employ one or more fluid speed sensors (e.g., anemometers, ultrasonic fluid sensors), such as a Tip Speed Ratio (TSR) algorithm, or a power signal feedback (PSF) algorithm, described in greater detail below. Some MPPT algorithms for fluid turbines may avoid using fluid speed sensors, such as a perturb and observe (P&O) algorithm, an optimal relation based (ORB) algorithm, or an incremental conductance (INC) algorithm. Some MPPT techniques may combine one or more MPPT algorithms (e.g., hybrid techniques).

For example, a Tip Speed Ratio (TSR) Based MPPT Algorithm may use the ratio between a fluid speed and the rotational speed of the blade tips of a fluid turbine to regulate the rotational speed of an energy generator coupled thereto to maintain the TSR of the fluid turbine at an optimum value for extracting maximum power. In addition to the fluid speed and turbine rotational speed, a TSR algorithm may require the optimum TSR of the fluid turbine as an input.

As another example, a power signal feedback (PSF) algorithm may be used to control a fluid turbine to extract maximum power from a fluid flow. A reference power level may be generated using a recorded maximum power curve or a mechanical power equation for the fluid turbine. The curve may be tracked for varying fluid speeds to control the fluid turbine to output maximum power.

As an additional example, a Perturb and Observe (e.g., hill-climb search, or HCS) control algorithm may continuously track a power output of a fluid turbine to search for a peak power output. Applying a Perturb and Observe algorithm may involve reading a power outputted by a fluid turbine under certain conditions, increasing a load causing a rotational velocity of a fluid turbine to slow, and reading power outputted by the fluid turbine while rotating at the slower rotational velocity at the same wind speed, to thereby determine if power outputted at the slower rotational velocity is greater or less than power outputted prior to increasing the load. An HCS tracking algorithm may compute a desired optimum signal for operating a fluid turbine to generate a peak power output based on the location of the operating point and the relation between changes in power and speed.

An MPPT protocol (e.g., for a single fluid turbine) may involve transmitting signals to adjust a rotational speed of a single fluid turbine by adjusting a load, adjusting a brake (e.g., a mechanical and/or electronic brake), and/or using any other method to adjust a rotational speed of a single fluid turbine. In some embodiments, an MPPT protocol for a single fluid turbine may involve increasing a load on an energy generator connected thereto and/or sending a signal to the energy generator to output a maximum (e.g., or near-maximum) energy at a point in time.

An MPPT protocol (e.g., for a cluster of fluid turbines) may involve adjusting a rotational speed of at least some fluid turbines in a cluster of geographically-associated fluid turbines to cause the cluster to output a maximum (e.g., or near-maximum) aggregate power output at a point in time and/or under certain fluid conditions. In some embodiments, implementing an MPPT protocol for a cluster of fluid turbines may include transmitting at least some signals associated with applying an MPPT protocol (e.g., for a single fluid turbine) to at least some individual fluid turbines in the cluster, and at least some signals unassociated with applying an MPPT protocol (e.g., for a single fluid turbine) to any individual fluid turbine in the cluster. In some instances, an MPPT protocol for a cluster of fluid turbines may override one or more signals associated with an MPPT protocol for a single fluid turbine in the cluster. In some embodiments, a charge controller may include at least one processor to implement an MPPT protocol on a fluid turbine connected thereto.

A brake may refer to a device configured to adjust (e.g., slow) a rotational speed of a fluid turbine and/or an energy generator connected thereto. A brake may include a mechanical brake and/or an electronic brake. A mechanical brake may include one or more brake pads, disks, and/or drums, e.g., activated via a switch. In some embodiments, a mechanical brake may include a lock, such as a pin configured to engage and hold a brake. An electronic brake may include a switch configured to introduce and/or remove a load (e.g., a dump load) imposed on a fluid turbine.

Receiving may include retrieving, acquiring, or otherwise obtaining, e.g., data. Receiving may include reading data from memory and/or receiving data from a computing device via a (e.g., wired and/or wireless) communications channel. At least one processor may receive data via a synchronous and/or asynchronous communications protocol, for example by polling a memory buffer for data and/or by receiving data as an interrupt event.

A threshold may include a baseline, a limit (e.g., a maximum or minimum), a starting point, and/or an end point for a measurable quantity. In some embodiments, a threshold may additionally include a tolerance above and/or below a value for a threshold.

Determining may include making a measurement, comparison, estimation, and/or calculation to arrive at a conclusive outcome.

To store may include to accumulate and/or collect in reserve, e.g., for future use.

Machine learning may refer to a branch of artificial intelligence utilizing algorithms to navigate through large collections of data in an iterative manner to converge to a solution. Machine learning may include supervised learning, unsupervised learning, and reinforcement learning. Supervised learning may use annotated (e.g., tagged) data sets, whereas unsupervised learning may use unclassified (e.g., non-annotated) data sets. Reinforcement learning may occur in an absence of data, and may use trial-and-error, and environmental feedback to reach a conclusion.

In some embodiments, machine learning algorithms (also referred to as machine learning models) may be trained using training examples. Some non-limiting examples of such machine learning algorithms may include classification algorithms, data regressions algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

To smooth may include to level and/or even out (to some degree), e.g., by offsetting peaks and troughs. To smooth power delivered to an electrical grid may include augmenting lower than average power level supplied to an electrical grid with stored power and/or diverting power exceeding electrical grid requirements to cause a reduction in variability of power delivered to an electrical grid over time.

Intermittent may include periodically, occasionally, and/or in a recurring manner with periods of discontinuity.

Regulating may include monitoring, controlling, adjusting, supervising, and/or maintaining. Regulating may include receiving measurements associated with one or more operating parameters, determining, based on one or more measurements, a signal configured to adjust one or more operating parameters, and/or transmitting a signal for adjusting one or more operating parameters (e.g., as feedback in an iterative process to cause a one or more operational parameters to converge to a baseline or threshold).

Reference is made to FIG. 1 illustrating a variety of exemplary fluid turbines 100 to 112. Fluid turbine 100 may be an exemplary vertical wind turbine, fluid turbine 102 may be an exemplary horizontal wind turbine, fluid turbine 104 may be an exemplary water, gas, or steam turbine, fluid turbine 106 may be an exemplary Savonius (e.g., vertical) wind turbine, fluid turbine 108 may be an exemplary Darrieus-rotor (e.g., vertical) wind turbine, fluid turbine 110 may be an exemplary H-type lift vertical wind turbine, and fluid turbine 112 may be an exemplary Helix (e.g., vertical) wind turbine. It is to be noted that exemplary fluid turbines 100 to 112 are shown for illustrative purposes and are not intended to limit the disclosure to any particular type or implementation of a fluid turbine because inventive principles described herein may be applied to any turbine or turbine cluster, regardless of structure or arrangement. Moreover, while some non-limiting examples may refer to any one of fluid turbines 100-112, these examples are provided for conceptual purposes only and do not limit the disclosure to any particular implementation or type of fluid turbine.

Figure 2A:
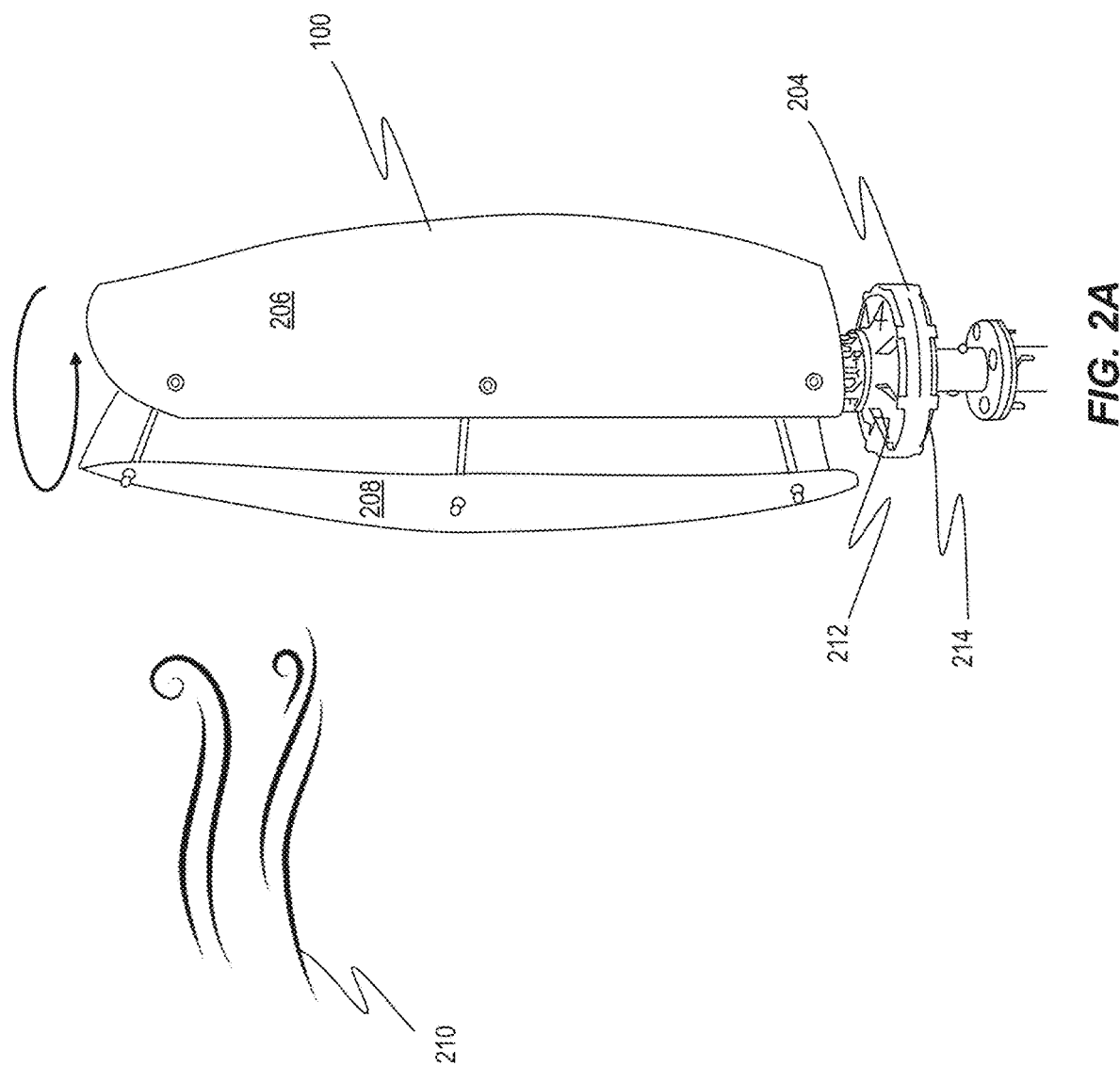
FIG. 2A is a view of a fluid energy conversion system including a fluid turbine coupled to an energy generator, consistent with some embodiments of the present disclosure.

FIG. 2 is a view of an exemplary fluid energy conversion system including a fluid turbine 100 coupled to an energy generator 204, consistent with some embodiments of the present disclosure. Fluid turbine 100 may include a plurality of blades 206 and 208 configured to spin in response to a fluid flow 210. Energy generator 204 may include a rotor 212 and a stator 214, together housing one or more permanent magnets and copper windings (e.g., the rotor may include the magnets and the stator may include the copper windings, or the reverse). Energy generator 204 may be configured to induce an alternating current (AC) when rotor 212 rotates relative to stator 214 (e.g., by generating a fluctuating magnetic field to surround the copper windings from the rotational motion). Kinetic energy contained in fluid flow 210 may exert a force on fluid turbine 100 causing blades 206 and 208 to rotate. The rotational motion of blades 206 and 208 may cause rotor 212 of energy generator 204 to spin relative to stator 214, generating an alternating current, thereby converting the kinetic energy of fluid flow 210 to electrical energy. Although fluid turbine 100 is illustrated as a vertical-axis wind turbine and fluid flow 210 is shown as air flow, this example is not intended to be limiting, and fluid turbine 100 may be a horizontal-axis wind turbine, a water turbine, a gas turbine, or a steam turbine. Similarly, fluid flow 210 may be water, gas, or steam, respectively.

Figure 2B:
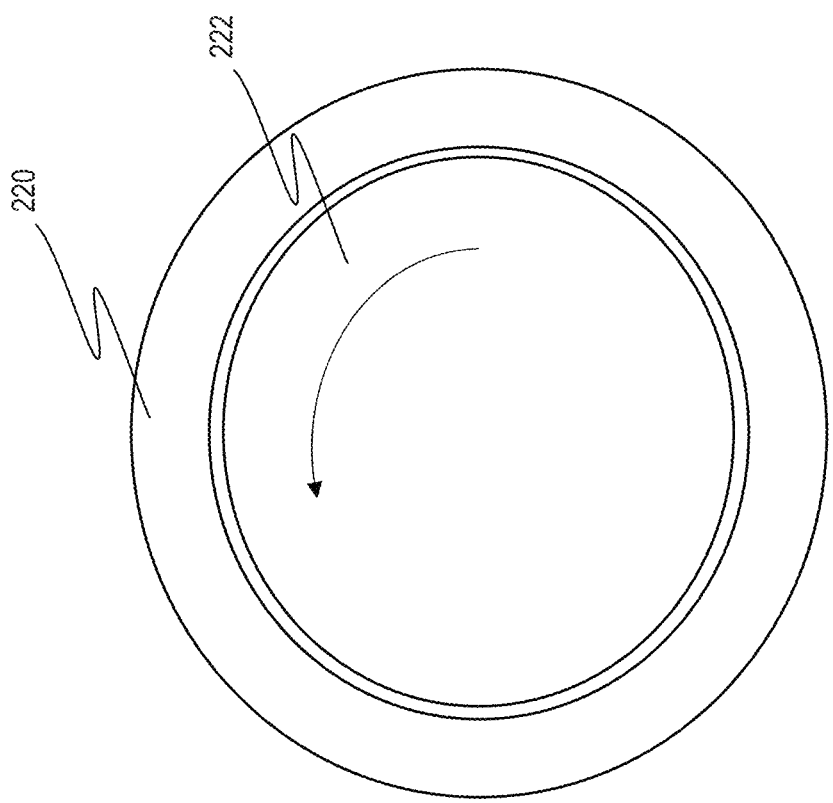
FIG. 2B is an exemplary top view of a fluid energy conversion system including an outer stator and an inner rotor, consistent with some embodiments of the present disclosure.

FIG. 2B illustrates an exemplary top view of a fluid energy conversion system including an outer stator 220 and an inner rotor 222, consistent with some embodiments of the present disclosure. Inner rotor 222 may be mechanically coupled to a rotatable shaft of a fluid turbine. Inner rotor 222 may include one or more permanent magnets and outer stator 220 may include copper windings, such that when inner rotor 222 rotates due to a rotation of a shaft of a fluid turbine connected thereto, copper windings of outer stator 220 may be exposed to a fluctuating magnetic field, thereby inducing an AC signal.

Figure 2C:
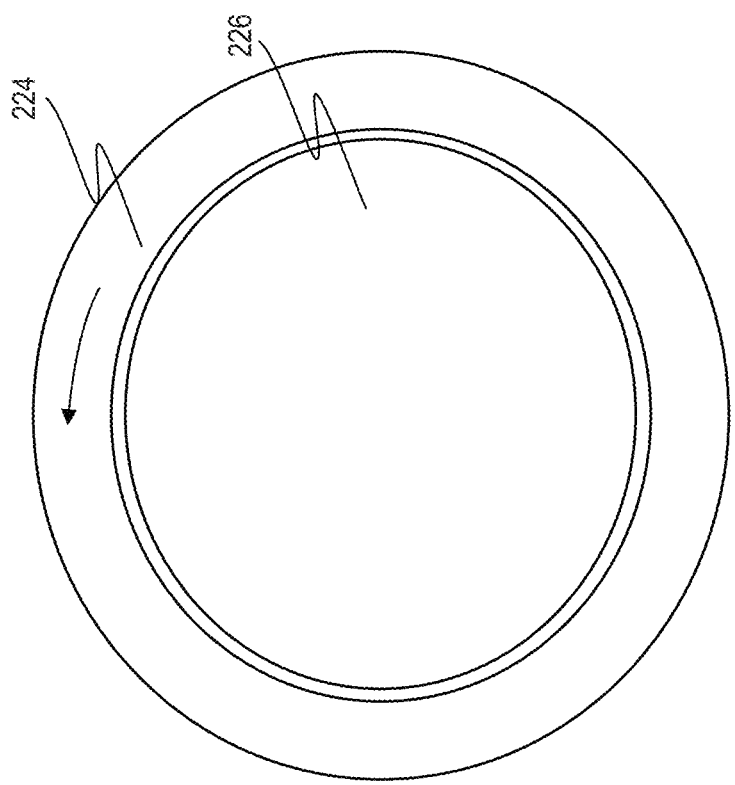
FIG. 2C exemplary top view of a fluid energy conversion system including an outer rotor and an inner stator, consistent with some embodiments of the present disclosure.

FIG. 2C illustrates an exemplary top view of a fluid energy conversion system including an outer rotor 224 and an inner stator 226, consistent with some embodiments of the present disclosure. Outer rotor 224 may be mechanically coupled to a rotatable shaft of a fluid turbine. Outer rotor 224 may include one or more permanent magnets and inner stator 226 may include copper windings, such that when outer rotor 224 rotates due to a rotation of a shaft of a fluid turbine connected thereto, copper windings of inner stator 226 may be exposed to a fluctuating magnetic field, thereby inducing an AC signal.

Figure 3:
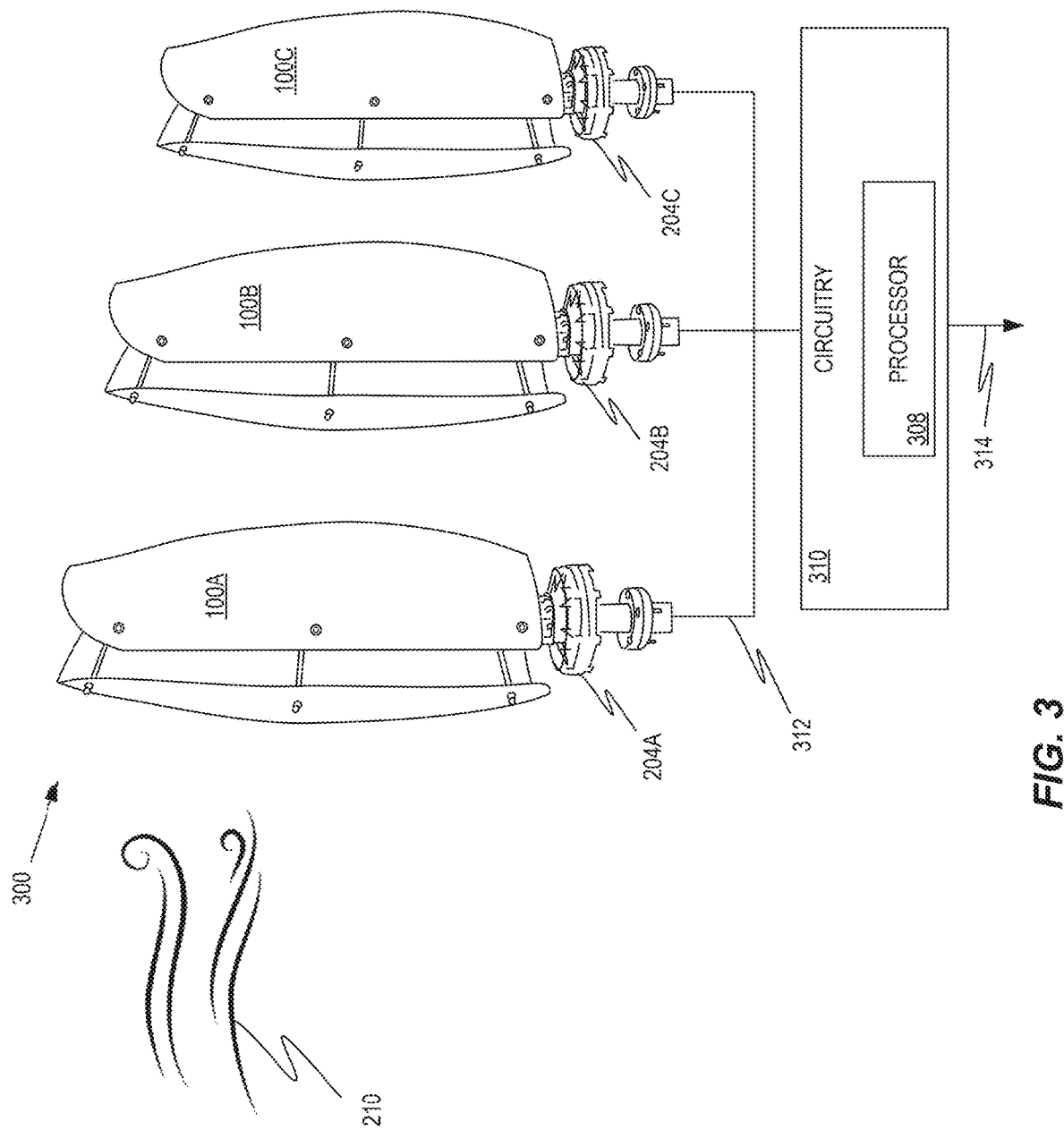
FIG. 3 is a view of an exemplary cluster of geographically associated fluid turbines, consistent with some embodiments of the present disclosure.

FIG. 3 illustrates a view of an exemplary cluster 300 of geographically associated fluid turbines 100A, 100B, and 100C, consistent with some embodiments of the present disclosure. Geographically associated fluid turbines 100A, 100B, and 100C may be connected to at least one processor 308 via circuitry 310 and one or more communication links 312. Communication links 312 may include differing types of wired communication links (e.g., wires, cables, fibers) and/or wireless communication links (e.g., WiFi, BlueTooth, Zigbee, AM, FM, PM radio transceivers, satellite or GPS transceivers, IR transceivers, ultrasound transceivers, and/or any other type of wireless communications links). Communications links may include high power communication links, e.g., for receiving electric power generated by fluid turbines 100A, 100B, and 100C, and/or for sending a load-bearing signal to fluid turbines 100A, 100B, and 100C, as well as lower power communication links, e.g., for sending and receiving data between a plurality of processors and/or sensors.

At least one processor 308 may be configured to control each of fluid turbines 100A, 100B, and 100C separately or coordinate operation of each of fluid turbines 100A, 100B, and 100. For example, at least one processor 308 may coordinate operations such as braking, slowing, stopping, locking, unlocking, and/or starting one or more of fluid turbines 100A, 100B, and 100C. As another example, at least one processor 308 may control a rotational direction and/or speed for any of fluid turbines 100A, 100B, and 100C, implement an MPPT algorithm for one or more of fluid turbines 100A, 100B, and 100C, control a relative rotational phase between any of fluid turbines 100A, 100B, and 100C, and/or perform any other procedure to coordinate operations for one or more of fluid turbines 100A, 100B, and 100C. At least one processor 308 may include one or more individual processors, each dedicated to control one of fluid turbines 100A, 100B, 100C, and/or one or more processors dedicated to control fluid turbines 100A, 100B, 100C collectively as cluster 300, operating as a single integral energy conversion system. While cluster 300 is shown having three fluid turbines, this is for illustrative purposes only, and cluster 300 may include as few as two fluid turbines, or more than three fluid turbines. Moreover, FIG. 3 shows fluid turbines 100A, 100B, and 100C as vertical wind turbines (e.g., corresponding to fluid turbine 100 of FIG. 1). However, this is for illustrative purposes only and is not intended to limit this disclosure to any specific implementation. Cluster 300 may include different types of fluid turbines, e.g., other than fluid turbine 100, such as one or more horizontal wind turbines, as well as one or more water, steam, and/or gas turbines. It bears repeating that although the discussion of FIG. 3 occurs in connection with the example turbine structures illustrated, the principles described in FIG. 3 apply to all turbines, regardless of turbine structure.

Figure 4:
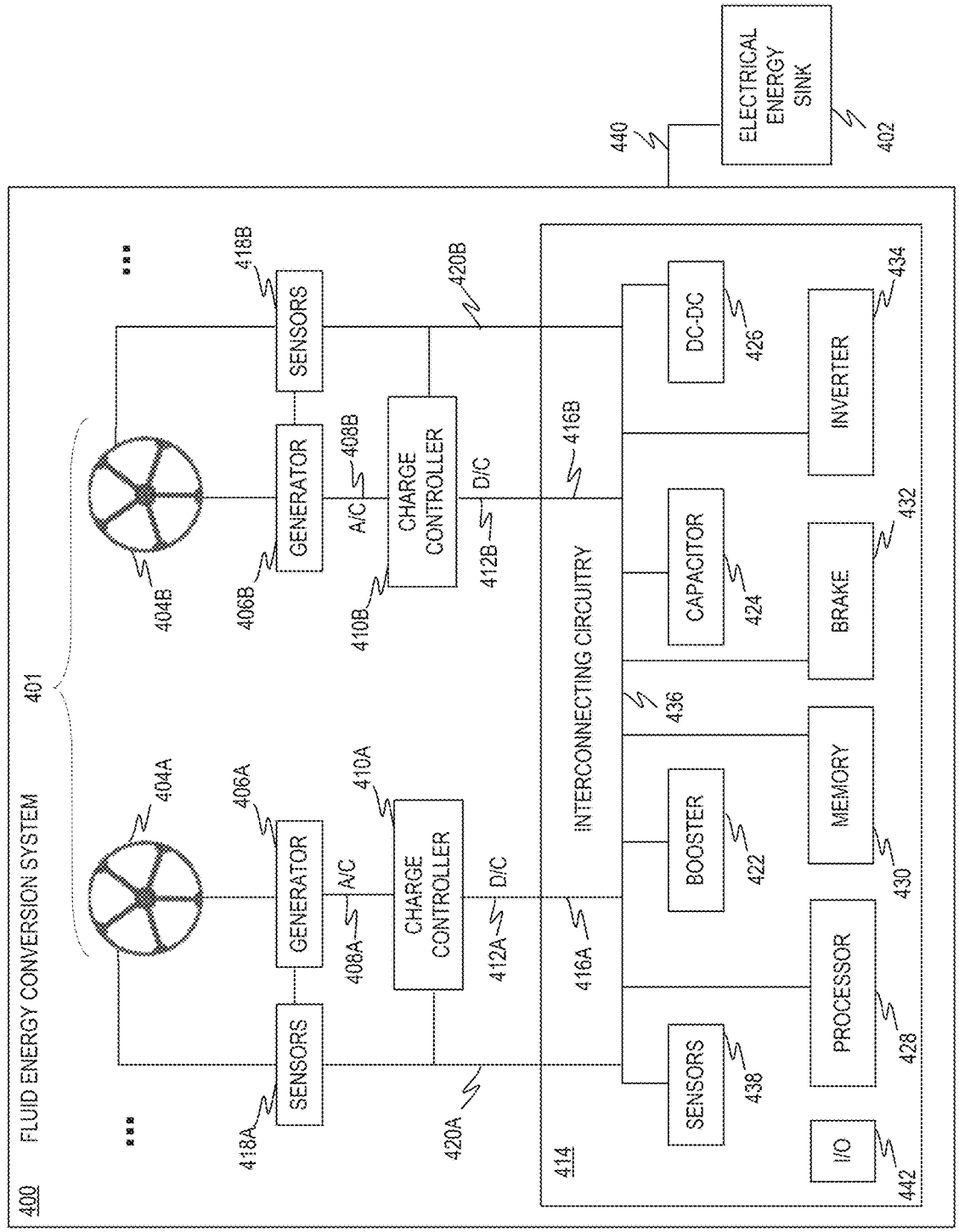
FIG. 4 is a schematic diagram of an exemplary fluid energy conversion system configured to generate electric power from a fluid flow and output the generated electric power to an energy sink, consistent with some embodiments of the present disclosure.

FIG. 4 illustrates a schematic diagram of an exemplary fluid energy conversion system 400 configured to generate electric power from a fluid flow and output the generated power to an energy sink 402, consistent with some embodiments of the present disclosure. Fluid energy conversion system 400 may include a plurality (e.g., a cluster) 401 of geographically-associated fluid turbines 404 (e.g., fluid turbines 404A and 404B). Each of fluid turbines 404A and 404B may be connected to energy generators 406 (e.g., electric energy generators 406A and 406B), respectively, for converting energy in a fluid flow (e.g., fluid flow 210 shown in FIG. 2) to electric power (e.g., a total electric power output 440) for at least one energy sink 402 (e.g., a load). Total electrical power output 440 may include a DC power output, e.g., for powering a battery bank, or an AC power output, e.g., for delivery to an electric grid. In some embodiments, a portion of total electrical power output 440 may be delivered as a DC signal to charge one or more batteries, and a portion of total electrical power output 440 may be delivered as an AC signal to an electrical grid. In some embodiments, a portion of total electrical power output 440 may be delivered as DC electrical energy to power circuitry for controlling one or more elements of fluid energy conversion system 400, such as control circuitry associated with fluid turbines 404 and/or energy generators 406. Fluid turbines 404A and 404B may be any fluid turbine, including but not limited to the various exemplary turbines illustrated in FIG. 1. Examples of an energy sink may include an electric power grid, one or more batteries, and/or any other sink for electric power. Energy generators 406A and 406B may convert mechanical rotational energy received from fluid turbines 404A and 404B to a plurality of AC power outputs 408 (e.g., AC power outputs 408A and 408B). Each of fluid turbines 404A and 404B and electric energy generators 406A and 406B may be associated with a charge controller 410 (e.g., charge controllers 410A and 410B), respectively. AC power outputs 408A and 408B may be converted to DC signals 412 (e.g., DC signals 412A and 412B) via charge controllers 410 (e.g., charge controllers 410A and 410B), respectively. Charge controller 410 may include electronic circuitry such as one or more of a rectifier (e.g., an AC-to-DC converter), a voltage sensor switch, a dump load, a braking circuit, a capacitor, and/or a voltage booster. DC signals 412A and 412B may be conveyed to interconnecting circuitry 414 via a plurality of links 416 (e.g., links 416A and 416B). Links 416A and 416B may include one or more of coaxial cables, fiber, and/or wires configured to transmit power signals.

Charge controllers 410A and 410B may transmit one or more electronic signals to interconnecting circuitry 414 via communications links 420 (e.g., communications links 420A and 420B). Communications links 420A and 420B may include one or more wired and/or wireless communication channels configured to transmit and receive electronic signals between at least one processor 428 and charge controllers 410A and 410B.

Each of fluid turbines 404A and 404B and electric energy generators 406A and 406B may be associated with at least one sensor 418 (e.g., at least one sensor 418A and 418B), described in greater detail below. Sensor 418 may connect to fluid turbine 404 and/or energy generator 406, e.g., to sense one or more operational parameters associated with fluid turbine 404 and/or energy generator 406 connected thereto. Sensor 418 may connect to charge controller 410. For example, at least one sensor 418A may connect to fluid turbine 404A and/or energy generator 406A and charge controller 410A, and at least one sensor 418B may connect to fluid turbine 404B and/or energy generator 406B and charge controller 410B.

Interconnecting circuitry 414 may include at least one sensor 438, at least one booster (e.g. voltage boosters) 422, at least one capacitor 424, at least one DC-DC converter 426, at least one processor 428, at least one memory 430, at least one brake circuit 432, and/or at least one inverter 434, interconnected via a communications link 436. In some embodiments, inverter 434 may be a single inverter configure to convert aggregated DC power produced by plurality of geographically-associated fluid turbine 404 to a grid-compatible AC signal (e.g., 110V, 120V, 220V, 240V, or any other voltage level compatible with a regional electric power grid). One non-limiting example of an inverter that may be employed is an IQ7 Plus manufactured by Enphase Energy, Inc. of Fremont California.

Figure 5:
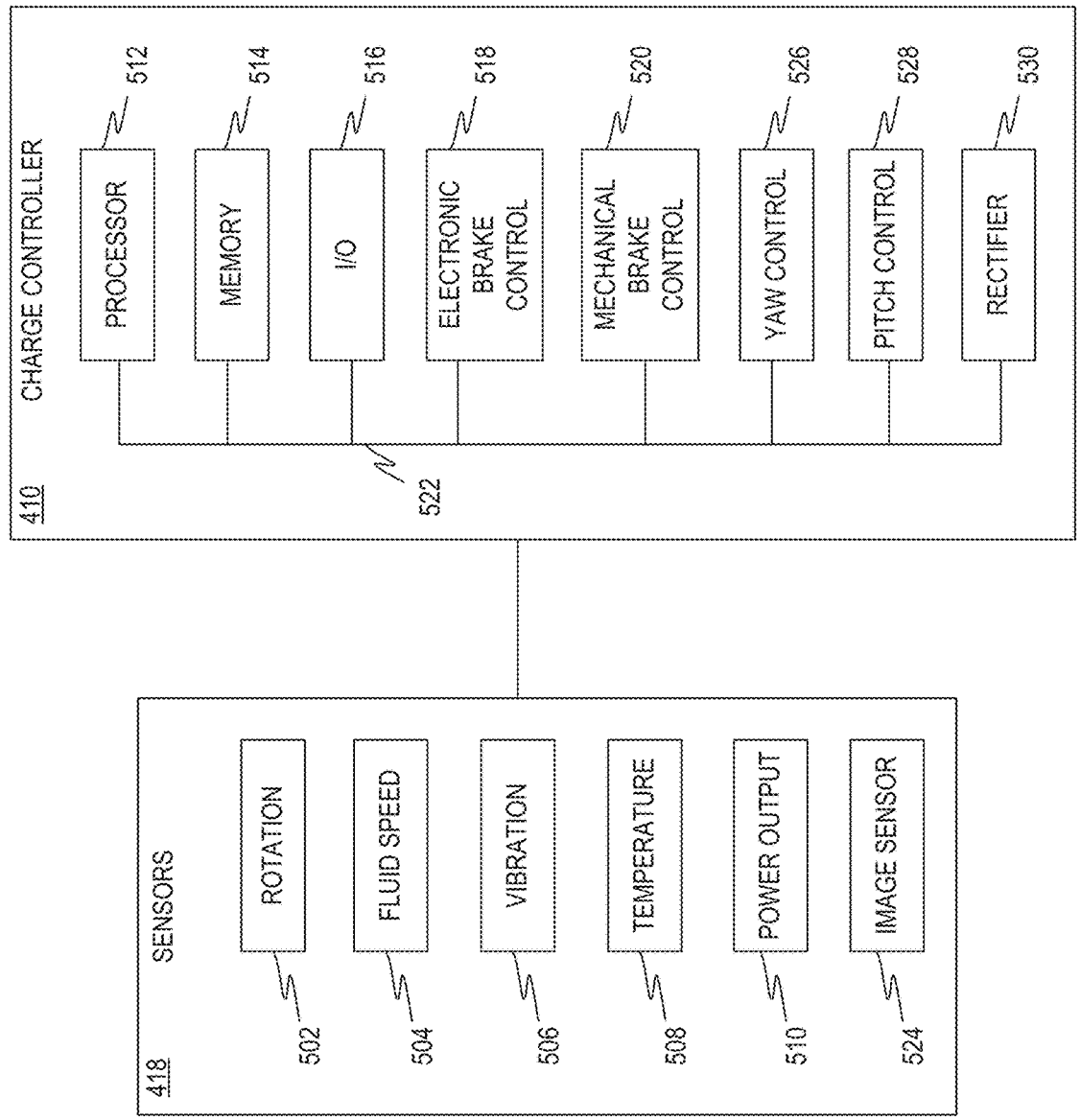
FIG. 5 is an exemplary schematic diagram of a charge controller connected to at least one sensor, consistent with some embodiments of the present disclosure.

FIG. 5 illustrates an exemplary schematic diagram of a charge controller 410 connected to at least one sensor 418, consistent with some embodiments of the present disclosure. At least one sensor 418 may include one or more rotation sensors 502, fluid speed sensors 504, vibration sensors 506, temperature sensors 508, power output sensors 510, and/or image sensors 524. The one or more rotation sensors 502 may be associated with a rotating component of fluid turbine 404 and/or energy generator 406, such as with one or more blades and/or a shaft of fluid turbine 404, and/or a rotor of energy generator 406. Fluid speed sensor 504 may be configured to sense a speed of a fluid flow affecting fluid turbine 404. Examples of fluid speed sensor 504 may include one or more of an anemometer, a water current sensor, a gas flow meter, and/or a steam flow meter for sensing. Vibration sensor 506 may include as examples one or more accelerometers, piezoelectric, piezoresistive, and/or capacitive MEMS for sensing vibrations of one or more components of fluid turbine 404 and/or energy generator 406. Temperature sensor 508 may include, for example, a thermometer, a thermostat, a thermocouple, a thermopile, an infrared thermometer, a bimetallic strip thermometer, or any other type of temperature measurement device. Power output sensor 510 may include, for example, a volt meter (e.g., a voltage sensor) and/or a current meter (e.g., a current sensor) for measuring power generated by energy generator 406. One or more image sensors 524 may include one or more cameras (e.g., a charged coupled device or CCD camera, and/or a CMOS camera for detecting visible light and/or an IR camera).

Charge controller 410 may include one or more of at least one processor 512, a memory 514, a device for input/output (I/O) 516 (e.g., for communicating with at least one processor 428 via communications link 420), an electronic brake control 518, a mechanical brake control 520, a yaw control 526, a pitch control 528, and/or a rectifier 530. At least one processor 512, memory 514, I/O 516, electronic brake control 518, mechanical brake control 520, yaw control 526, pitch control 528, and rectifier 530 may be interconnected via bus system 522. In some embodiments, a clock (e.g., of at least one processor) may be used as a sensor, e.g., to schedule a maintenance or safety procedure, and/or to synchronize operation of fluid turbine 404. In some embodiments, a clock may be used in conjunction with scheduling software to issue alerts (e.g., signals) to invoke braking, slowing, stopping, locking, and/or unlocking of a fluid turbine by at least one processor.

Electronic brake control 518 may include an inverter and a booster, e.g., to implement an electronic braking mechanism. For example, electronic braking of fluid turbine 404 may be implemented by imposing a load (e.g., impedance) on energy generator 406. In some embodiments, electronic braking may be implemented with an AC signal. At least one processor (e.g., at least one processor 428 and/or processor 512) may determine an AC signal configured to impose a specific load to achieve a desired level of braking, e.g., by causing interference with another AC signal. In some embodiments, electronic braking may be implemented with a DC signal, e.g., to cause a switch to divert a power output of a generator to a dump load. The at least one processor may transmit a DC signal to electronic brake control 518 of charge controller 410. Electronic brake control 518 may use the DC signal to produce an AC signal, and the booster of electronic brake control 518 may amplify the AC signal to a level corresponding to the AC signal suitable for imposing a specific load on energy generator 406. The amplified AC signal may be transmitted to a rotor of energy generator 406 to impose the load and thereby control (e.g., by slowing and/or stopping) fluid turbine 404. For example, the AC signal may be used to implement an MPPT protocol, engage an electronic brake, adjust a phase of fluid turbine 404 (e.g., by slowing one fluid turbine relative to another fluid turbine), adjust a rotational speed, adjust a rotational direction, and/or to perform any other controlling operation on fluid turbine 404.

Mechanical brake control 520 may include one or more electronic switches allowing at least one processor (e.g., at least one processor 428 and/or processor 512) to control one or more mechanical brakes (e.g. brake pads, disks, and/or drums) configured with one or more rotating components of fluid turbine 404 and/or energy generator 406.

In some embodiments, electronic braking of fluid turbines 404 may be implemented by charge controllers 410, e.g., by diverting power produced by energy generators 406 to a dump load.

Figure 6:
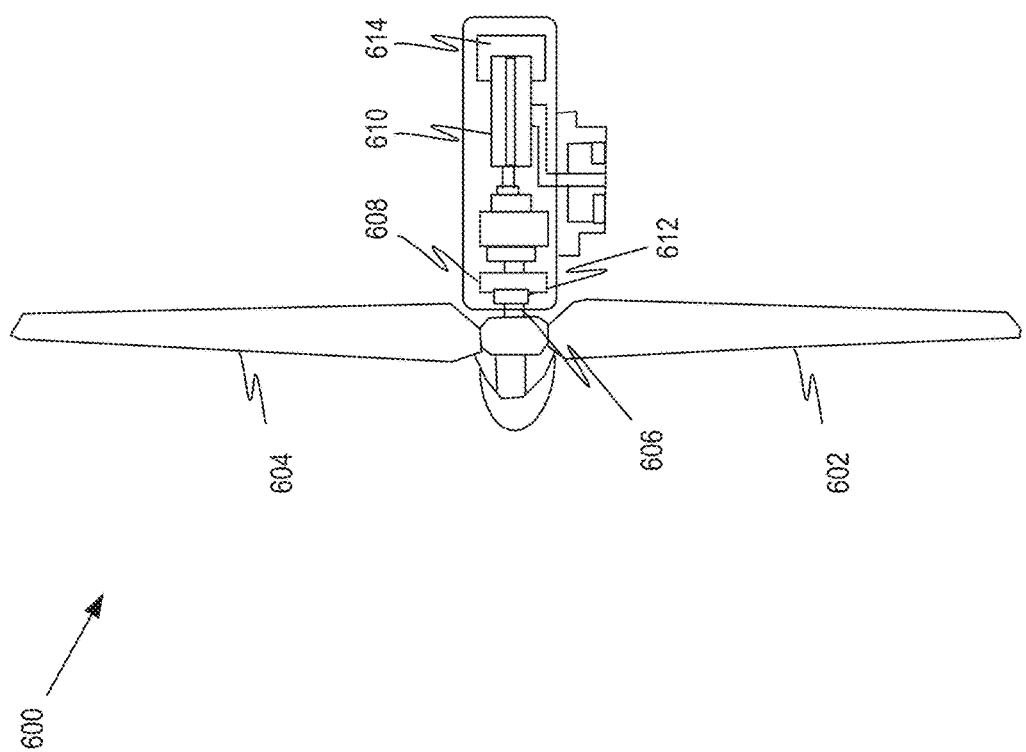
FIG. 6 is a top view of an exemplary fluid turbine configured with at least one mechanical brake, consistent with some embodiments of the present disclosure.

FIG. 6 illustrates a top view of an exemplary fluid turbine 600 configured with at least one mechanical brake, consistent with some embodiments of the present disclosure. Fluid turbine 600 may include blades 602 and 604 connected to a rotatable shaft 606, at least one mechanical brake 608, an energy generator 610, at least one lock 612, and a charge controller 614 (e.g., corresponding to charge controller 410). Energy generator 610 may be connected to rotatable shaft 606 for converting rotational mechanical energy by blades 602 and 604 to electric power. Charge controller 614 may be connected to one or more of energy generator 610, rotatable shaft 606, blades 602 and 604, at least one mechanical brake 608, and at least one lock 612. At least one mechanical brake 608 and/or at least one lock 612 may operate on any rotatable component associated with fluid turbine 600, such as rotatable shaft 606, a rotor of energy generator 610, and/or blades 602 and 604 (e.g., although at least one mechanical brake 608 and lock 612 are shown in FIG. 6 to operate on shaft 606, this is for illustrative purposes only and does not limit the disclosure to any specific implementation). At least one processor (e.g., at least one processor 512 and/or processor 428) may control a level of engagement and/or disengagement of at least one mechanical brake 608 and at least one lock 612 by sending signals to mechanical brake control 520 for controlling one or more switches configured to control a level of engagement and/or disengagement of at least one mechanical brake 608 and or at least one lock 612.

Charge controller 614 may receive signals from one or more sensors (e.g., at least one sensor 418) associated with fluid turbine 600 (e.g., including rotatable shaft 606, blades 602 and 604, at least one mechanical brake 608, and/or at least one lock 612) and/or energy generator 610. The one or more signals may be received by the at least one processor to determine operating parameters associated with fluid turbine 600. For instance, the at least one processor may use the signals to communicate with charge controller 614 to engage or disengage electronic braking and/or to communicate with at least one mechanical brake 608 to engage or disengage mechanical braking. While a braking system is described above with reference to fluid turbine 600, this is for illustrative purposes only. The braking system principles described herein are intended to apply to all fluid turbines, including but not limited to the turbines illustrated in FIG. 1.

Figure 7:
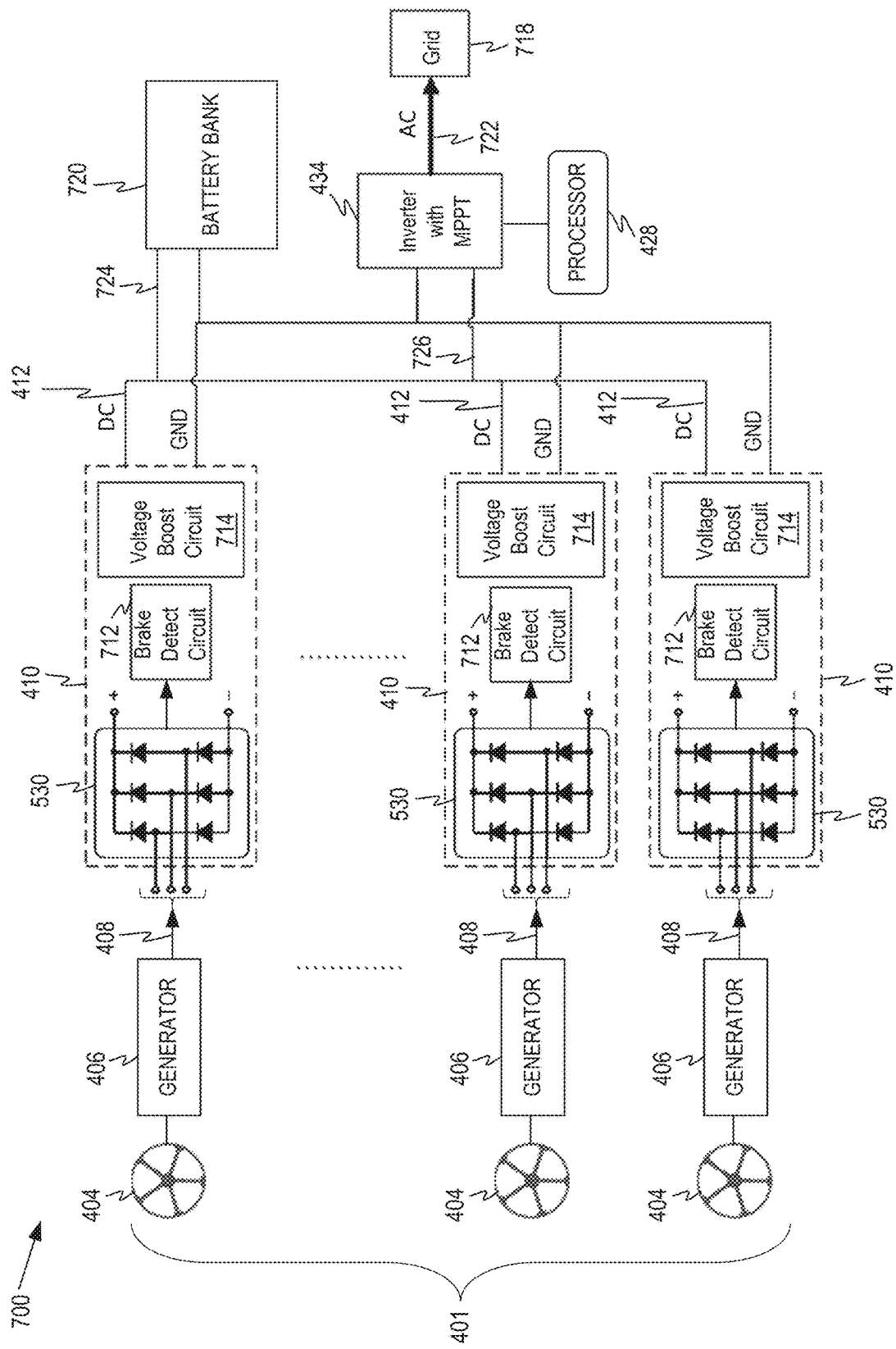
FIG. 7 is a schematic diagram of an exemplary circuit for controlling a plurality of geographically-associated fluid turbines, consistent with some embodiments of the present disclosure.

By way of a non-limiting example, FIG. 7 illustrates a schematic diagram of an exemplary circuit 700 for controlling a plurality 401 of geographically-associated fluid turbines 404, consistent with some embodiments of the present disclosure. Exemplary circuit 700 may be understood in conjunction with FIGS. 4 and 5. Fluid turbines 404 (throughout this disclosure including as described in connection with FIGS. 7-11) may be any fluid turbine, including but not limited to the various exemplary fluid turbines illustrated in FIG. 1. Fluid turbines 404 may be geographically-associated as cluster 401. Each of fluid turbines 404 may be connected to an energy generator 406 for converting energy in a fluid flow to an AC power output. Each of AC power outputs 408 may be connected to a charge controller 410. Each charge controller 410 may include at least a rectifier 530, a brake circuit 712 (e.g., including a brake detection circuit), and a voltage booster 714. Rectifier 530 may convert AC power outputs 408 to DC signals, and may transmit the DC signals to brake circuit 712 and voltage booster 714. Brake circuit 712 may be configured to perform electronic braking on fluid turbine 404 (e.g., based on information received from one or more of at least one sensor 418). In some embodiments, each charge controller 410 may be configured to implement an MPPT protocol on energy generator 406 connected thereto. Each of charge controllers 410 may be connected (e.g., in parallel) to an inverter 434, which may be connected to an electrical grid 718 (e.g., corresponding to energy sink 402). Charge controllers 410 may deliver AC power signals to inverter 434, and inverter 434 may convert an aggregate of the AC power signals to an aggregate AC power signal 722. Inverter 434 may be associated with at least one processor (e.g., at least one processor 428 of FIG. 4). In some embodiments, inverter 434 (e.g., via at least one processor configured therewith) may be configured to implement an MPPT protocol on fluid turbines 404, e.g., by manipulating a load associated with electrical grid 718. For example, increasing the load may cause rotational speeds of fluid turbines 404 to slow down, and decreasing the load may cause the rotational speeds of fluid turbines 404 to increase. Thus, in some embodiments, a single inverter 434 may be configured to implement an MPPT protocol on multiple fluid turbines 404 via multiple charge controllers 410. In some embodiments, inverter 434 and electrical grid 718 may be replaced by a battery bank 720.

Figure 8:
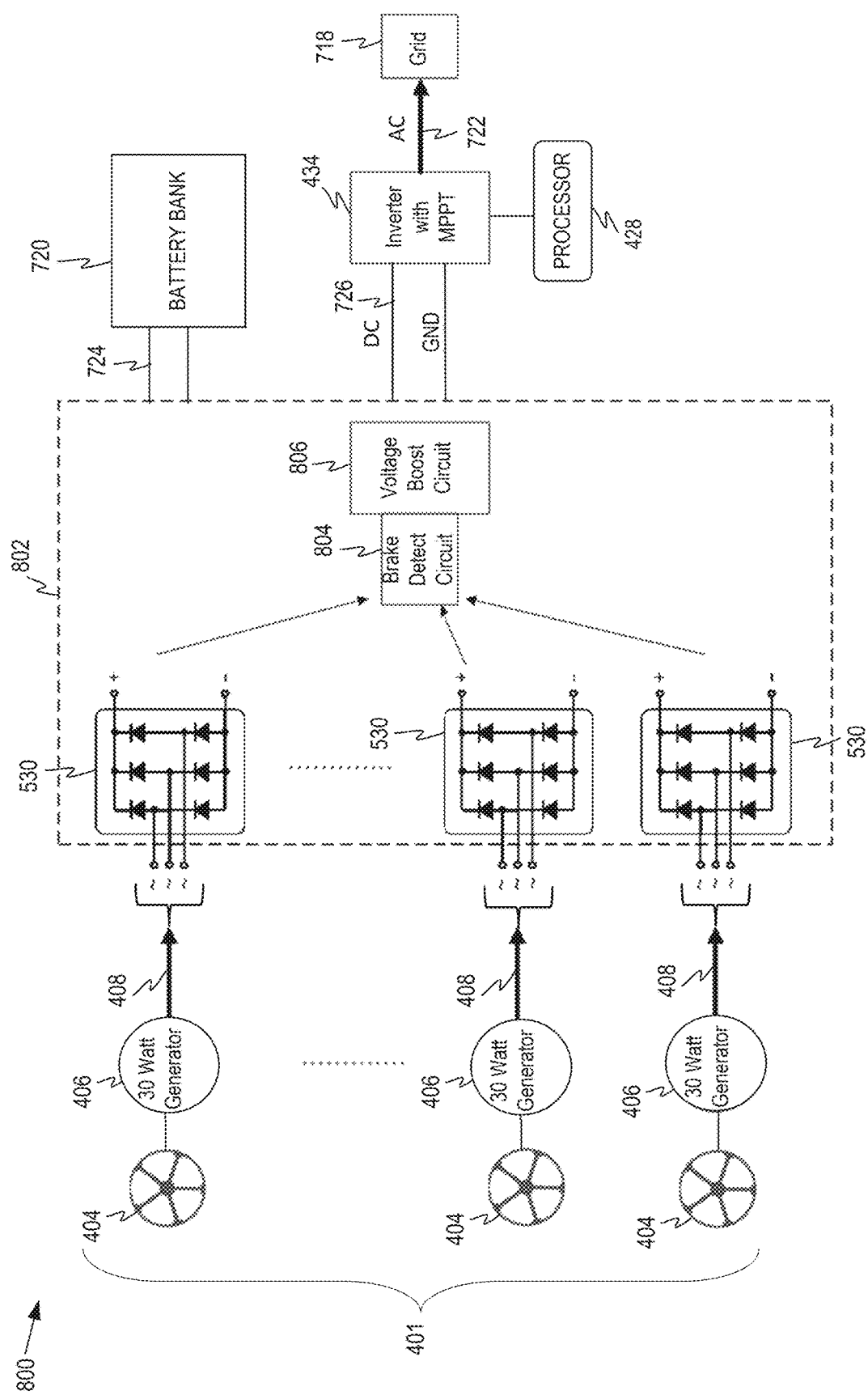
FIG. 8 is another schematic diagram of an exemplary circuit for controlling a plurality of geographically-associated fluid turbines, consistent with some embodiments of the present disclosure.

By way of another non-limiting example, FIG. 8 illustrates a schematic diagram of an exemplary circuit 800 for controlling a plurality of geographically-associated fluid turbines 404, consistent with some embodiments of the present disclosure. Circuit 800 may be substantially similar to circuit 700 (e.g., in conjunction with FIGS. 4 and 5) with the noted difference of a common (e.g., shared) charge controller 802 containing multiple rectifiers 530 for each of energy generators 406. Each of energy generators 406 may be connected to common charge controller 802 via multiple wires (e.g. three wires for each of three phases of the output AC power signal). Each of rectifiers 530 may be connected (e.g., via two wires) to a common brake circuit 804 (e.g., including at least a braking sensor). Common brake circuit 804 may be connected to a common voltage booster 806 (e.g., a single voltage booster for all of fluid turbines 404).

Charge controller 802 (e.g., common to all of fluid turbines 404) may be connected to inverter 434 for outputting AC power to electrical grid 718. Thus, a common or shared charge controller 802 may connect multiple fluid turbines 404 to a single inverter 434 via multiple rectifiers 530 (e.g., one rectifier per fluid turbine 404). In some embodiments, inverter 434 may be configured to implement an MPPT protocol on each of fluid turbines 404 via rectifiers 530. In some embodiments, a cable may connect each energy generator 406 to single charge controller 410, due to relatively low power loss of a three-phase AC output. This may be advantageous when fluid turbines 404 are spread out over a large region (e.g., when the distance between any two of fluid turbines 404 is at least greater than a blade diameter for each fluid turbine, and/or when the cluster of turbines includes many fluid turbines). Circuit 800 may lack an MPPT control, may include an individual MPPT control for each fluid turbine 404, or may include a centralized MPPT control for the plurality of geographically associated fluid turbines 404, e.g., operating as a single fluid energy conversion system.

Figure 9:
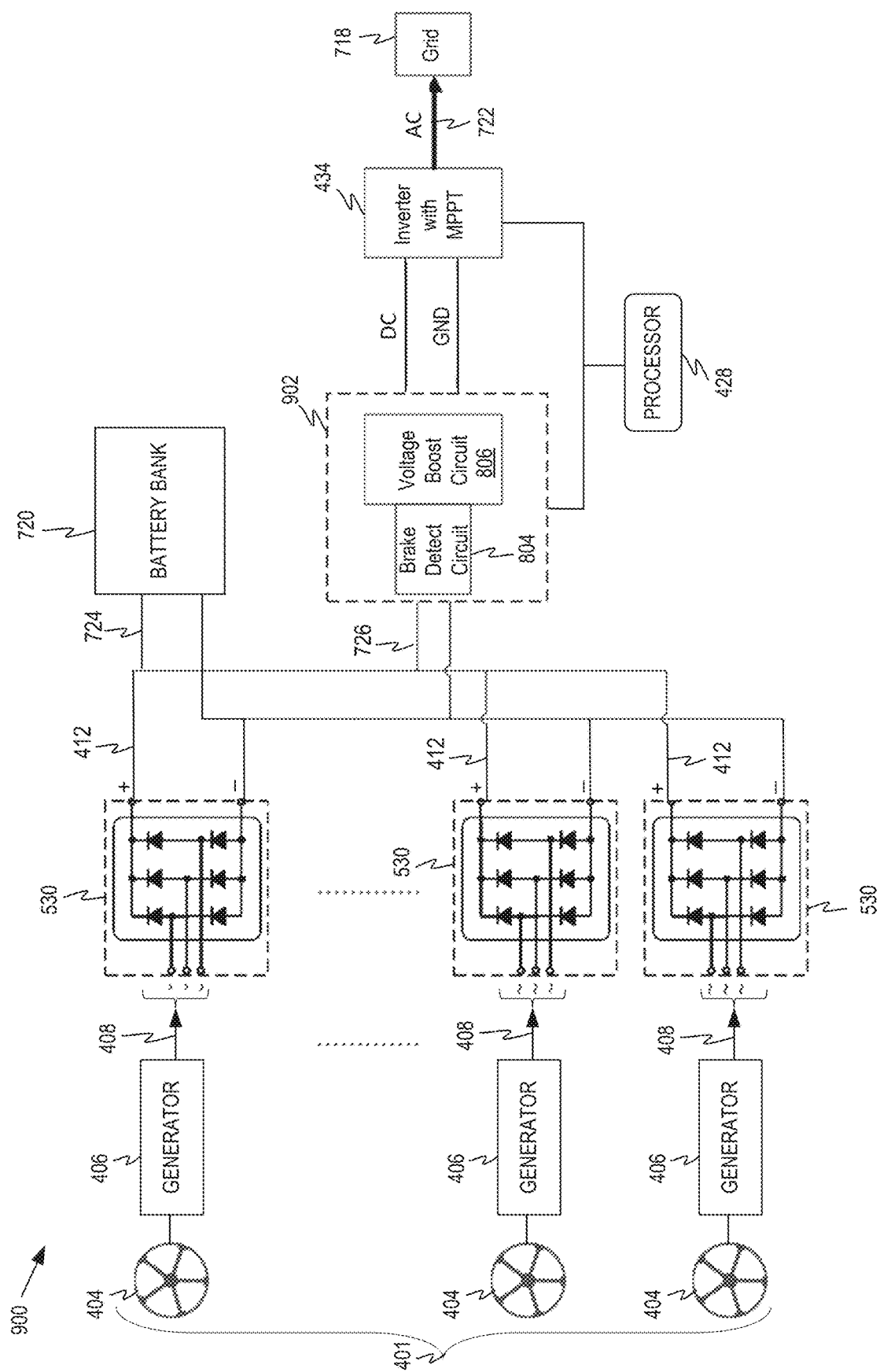
FIG. 9 is a another schematic diagram of an exemplary circuit for controlling a plurality of geographically-associated fluid turbines, consistent with some embodiments of the present disclosure.

By way of another non-limiting example, FIG. 9 illustrates a schematic diagram of an exemplary circuit 900 for controlling a plurality of geographically-associated fluid turbines 404, consistent with some embodiments of the present disclosure. Circuit 900 may be substantially similar to circuits 700 and 800 (e.g., in conjunction with FIGS. 4 and 5) with the notable difference that each of energy generators 406 may be connected to a different rectifier 530 (e.g., via three inputs for a three-phase AC signal). Each of rectifiers 530 may output a DC signal (e.g., via two wires for positive and negative) to a single (e.g., common) charge controller 902, including a common brake circuit 804 and a common voltage booster 806 for the plurality of fluid turbines 404. Rectifiers 530 may be connected to charge controller 902 in parallel.

Figure 10:
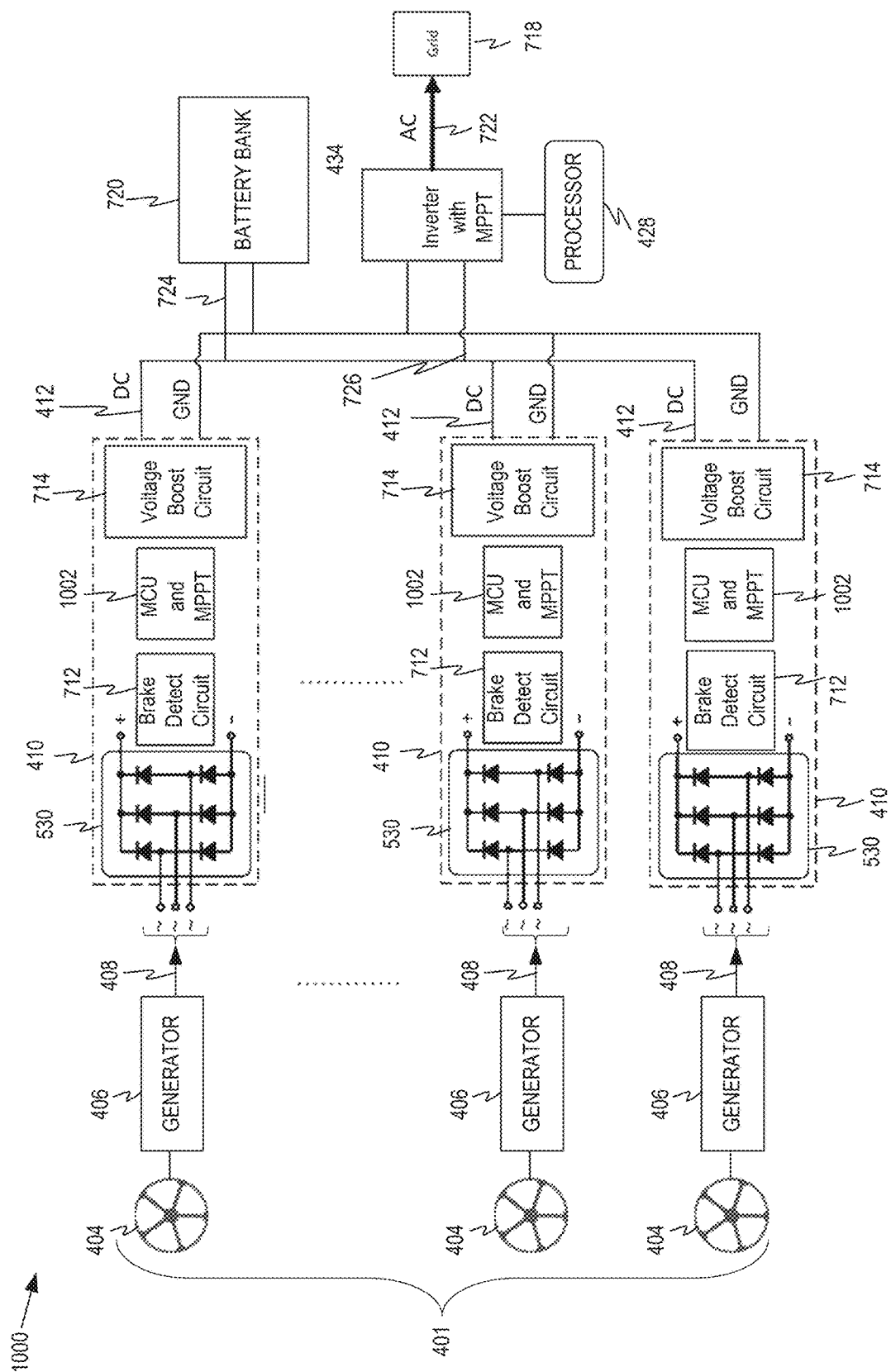
FIG. 10 is another schematic diagram of an exemplary circuit for controlling a plurality of geographically-associated fluid turbines, consistent with some embodiments of the present disclosure.

By way of another non-limiting example, FIG. 10 illustrates a schematic diagram of an exemplary circuit 1000 for controlling a plurality of geographically-associated fluid turbines 404, consistent with some embodiments of the present disclosure. Circuit 1000 may be substantially similar to circuits 700, 800, and 900 (e.g., in conjunction with FIGS. 4 and 5) with the noted difference that each energy generator 406 may be connected to a separate charge controller 410, with each charge controller 410 including at least a rectifier 530, a brake circuit 712, an MPPT control 1002, and a voltage booster 714. Each of charge controllers 410 may transmit (e.g., in parallel) DC power signals to inverter 434 for connecting to electrical grid 718, or alternatively to battery bank 720.

Figure 11:
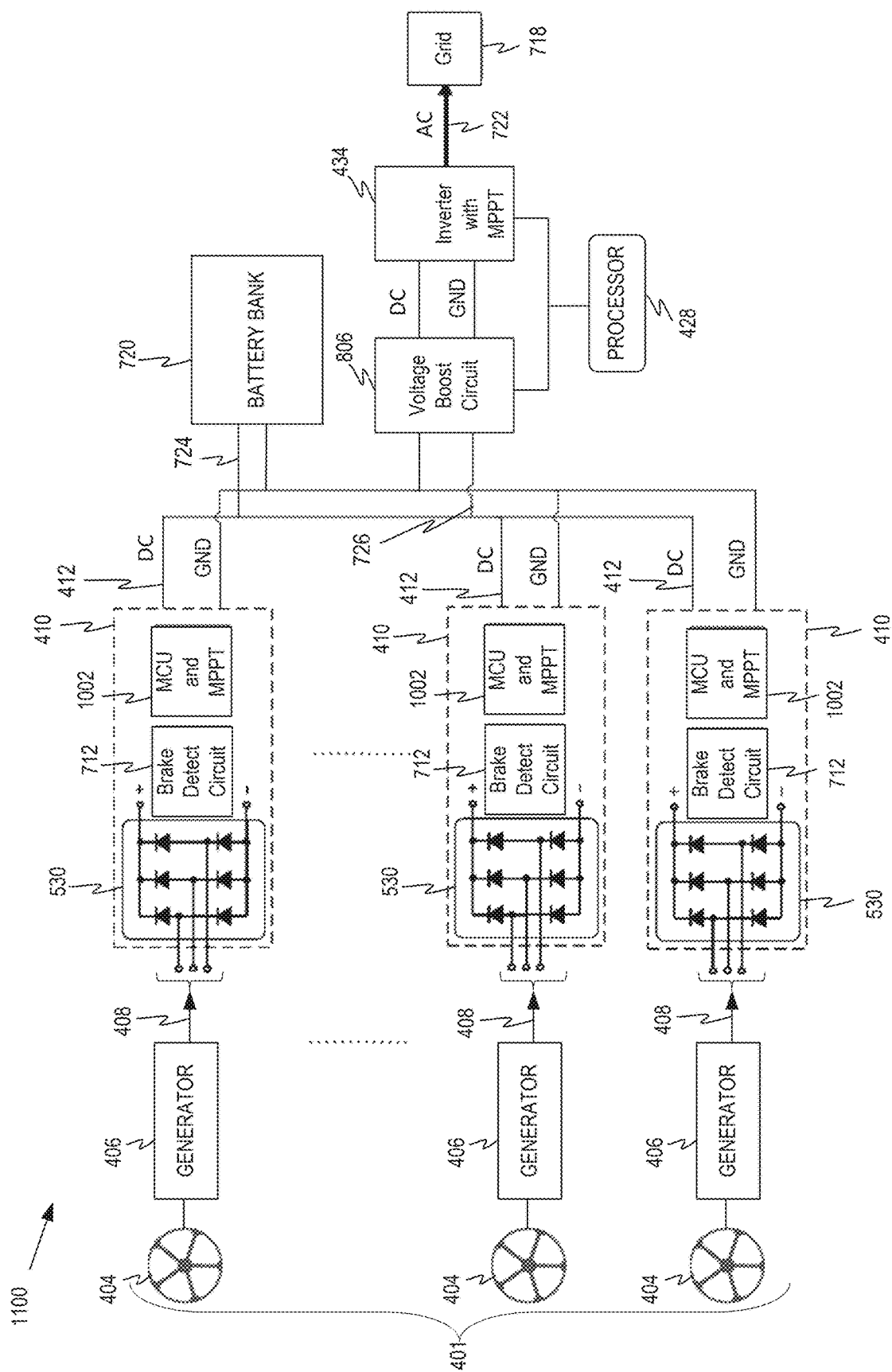
FIG. 11 is another schematic diagram of an exemplary circuit for controlling a plurality of geographically-associated fluid turbines, consistent with some embodiments of the present disclosure.

By way of another non-limiting example, FIG. 11 illustrates a schematic diagram of an exemplary circuit 1100 for controlling a plurality of geographically-associated fluid turbines 404, consistent with some embodiments of the present disclosure. Circuit 1100 may be substantially similar to circuits 700, 800, 900, and 1000 with the noted difference that each charge controller 410 may include a rectifier 530, a brake circuit 712 and an MPPT control 1002. Each charge controller 410 may output a DC signal to common voltage booster 806, which may transmit aggregated DC power to inverter and grid, or alternatively to battery bank 720.

Reference is made to exemplary Table 1 (below) comparing circuits 700 through 1100 for harnessing power from a plurality of geographically-associated fluid turbines.

TABLE 1

Comparison of differing configurations for harnessing power from a plurality of geographically-associated fluid turbines.

| Option | # rectifiers | #brakes | #controllers | #dump loads | #voltage boosters | Serial or parallel to controller? | High level MPPT |
|---|---|---|---|---|---|---|---|
| 1 | 10 | 10 | 10 | 10 | 10 | parallel | No |
| 2 | 10 | 1 | 1 | 1 | 1 | Parallel rectifiers in controller to single controller | No |
| 3 | 10 | 1 | 1 | 1 | 1 | Parallel rectifiers at generator to single controller | No |
| 4 | 10 | 10 | 10 | 10 | 10 | parallel | Yes |
| 5 | 10 | 10 | 10 | 10 | 1 | Parallel to voltage booster | yes |

Figure 12:
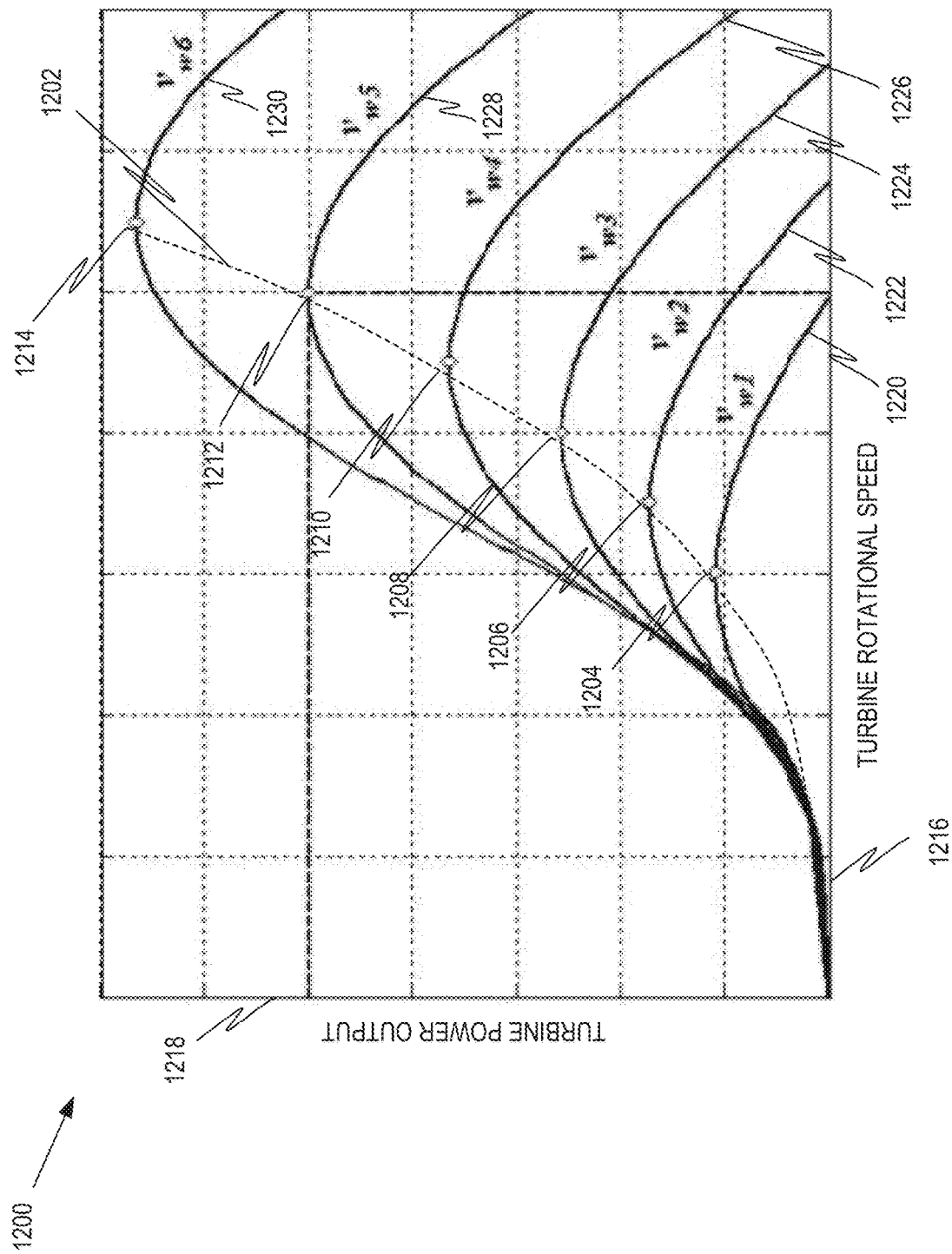
FIG. 12 is an exemplary chart showing a variation of power output versus rotational speed for a fluid turbine operating at various fluid speeds, consistent with some embodiments of the present disclosure.

FIG. 12 illustrates an exemplary chart 1200 showing a variation of power output versus rotational speed for a fluid turbine operating at various fluid speeds, consistent with some embodiments of the present disclosure. Horizontal axis 1216 (e.g., x-axis) of chart 1200 corresponds to the rotational speed of a fluid turbine (e.g., measured as revolutions per minute RPM). Vertical axis 1218 (e.g., y-axis) of chart 1200 corresponds to the power outputted by a fluid turbine for each rotational speed. Chart 1200 may include multiple curved lines (e.g., lines 1220, 1222, 1224, 1226, 1228, and 1230), each curved line corresponding to a differing fluid speed (e.g., $v_{w1}$ to $v_{w6}$). Each of the curved lines of chart 1200 may include a different peak (e.g., peaks 1204, 1206, 1208, 1210, 1212, and 1214) indicating a rotational speed at which a fluid turbine may produce a maximum (e.g., or near-maximum) level of power for the corresponding fluid speed. For instance, peak 1204 of curved line 1220 may indicate a maximum power output for a fluid turbine when the fluid speed is $v_{w1}$, and achievable when the fluid turbine spins at the corresponding rotational speed, peak 1206 of curved line 1222 may indicate a maximum power output when the fluid speed is $v_{w2}$, and achievable when the fluid turbine spins at the corresponding rotational speed, and so on.

Line 1202 (e.g., tracing the peak power outputs 1204 to 1214 for each of fluid speeds $v_{w1}$ to $v_{w6}$) may be used to determine a target rotational speed for a fluid turbine to produce a maximum (e.g., or near-maximum) power output under each fluid speed. In some embodiments, chart 1200 may be used to implement an MPPT protocol for a specific fluid turbine. In some embodiments, at least one processor (e.g., at least one processor 428 and/or 512) may use chart 1200 to control a load on a fluid turbine via a charge controller (e.g., charge controllers 410, 802, and/or 902) to cause a fluid turbine to spin at a rotational speed corresponding to line 1202 for a particular fluid speed. In some embodiments, each fluid turbine in a plurality of geographically-associated fluid turbines may be associated with a different version of chart 1200 (e.g., depending on the design and operating parameters for each fluid turbine). In some embodiments, each fluid turbine in a plurality of geographically-associated fluid turbines may be associated with a substantially similar version of chart 1200.

Figure 13:
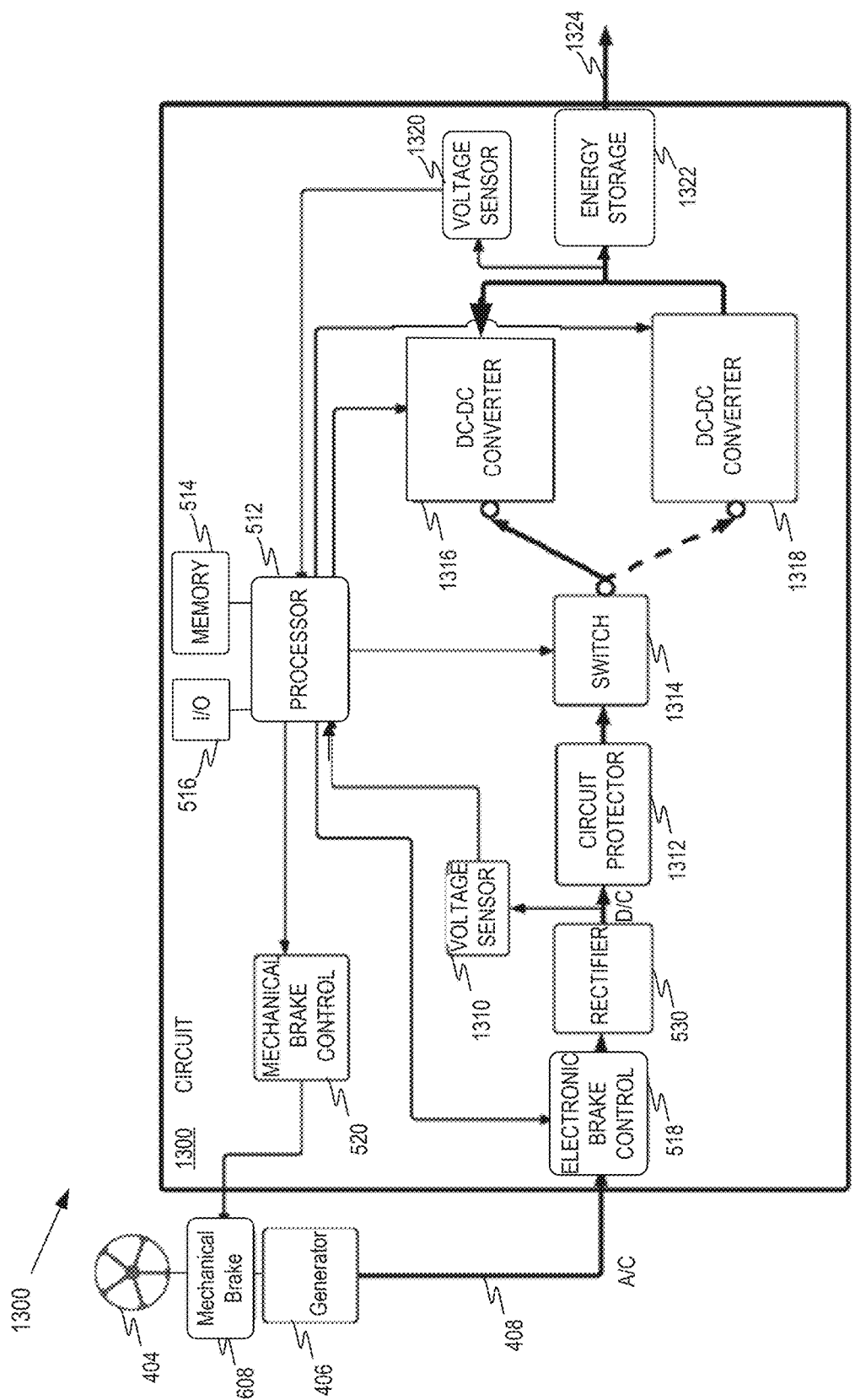
FIG. 13 is a schematic diagram of an exemplary braking circuit, consistent with some embodiments of the present disclosure.

FIG. 13 illustrates a schematic diagram of an exemplary circuit 1300, consistent with some embodiments of the present disclosure. In some embodiments, at least part of circuit 1300 may be associated with any of charge controllers 410, 802, and/or 902. In some embodiments, at least a portion of circuit 1300 may be associated with interconnecting circuitry 414. In some embodiments, a portion of circuit 1300 may be associated with any of charge controller 410, 802, and/or 902, and another portion of circuit 1300 may be associated with interconnecting circuitry 414.

Circuit 1300 may include at least one processor (e.g., at least one processor 512), memory (e.g., memory 514), mechanical brake control (e.g., mechanical brake control 520), electronic brake control (e.g., electronic brake control 518), a rectifier (e.g., rectifier 530), a first voltage sensor 1310, a circuit protector 1312 (e.g., including at least one of an electrostatic discharge, over-voltage, and/or over-current protection circuits), a switch 1314 (e.g., a single pole, double throw switch), a first DC/DC converter 1316 (e.g., configured to operate above a voltage threshold), a second DC/DC converter 1318 (e.g., configured to operate below the voltage threshold), a second voltage sensor 1320, an energy storage component 1322, and a DC power output 1324. Rectifier 530 may be a three-phase rectifier configured to produce a variable DC voltage output. In some embodiments, DC power output 1324 may be channeled to an inverter (e.g. inverter 434) for converting to an AC power output signal. In some embodiments, DC output 1324 may channel DC power output 1324 to a battery bank.

At least one processor 512 may control braking for fluid turbine 404 connected to energy generator 406 based on one or more signals, such as AC power output 408 (e.g., a three-phase AC power output signal) delivered to circuit 1300, and/or a signal received from one or more sensors (e.g., at least one sensor 418). Rectifier 530 may convert AC power output 408 to a DC power signal. At least one processor 512 may receive an indication of AC power output 408 as a DC power output measurement via first voltage sensor 1310. Fluid turbine 404 and energy generator 406 may be associated with mechanical brake 608. To control mechanical braking of fluid turbine 404 and/or energy generator 406, at least one processor 512 may send a control signal to mechanical brake control 520 for engaging a mechanical brake 608. To control electronic braking of fluid turbine 404, at least one processor 512 may subject energy generator 406 to a load via electronic brake control 518. In some embodiments, power output sensor 510 may be associated with first voltage sensor 1310 and/or second voltage sensor 1320.

By way of a non-limiting example, first DC-DC converter 1316 may be configured to operate at 500 Watts, receive an input ranging between 18-60V and output a voltage ranging between 3.3-24V, switch on at 16.5V, and operate at an efficiency below 98.5%. Second DC-DC converter 1318 may be configured to operate at 300 Watts, receive an input ranging between 9-36V and output a voltage ranging between 8-24V, switch on at 9V, and operate at an efficiency below 97%. Switch 1314 may channel DC signals above or equal to 22V to first DC-DC converter 1316 and channel DC signals below 22V to second DC-DC converter 1318. In some embodiments, at least one processor 512 may subject fluid turbine 404 to an MPPT protocol by matching an electronic load imposed on energy generator 406 to a rotational speed of fluid turbine 404 for a given fluid speed (e.g., based on a version of chart 1200 stored in memory 514) to produce a peak (or near-peak) AC power output.

In some embodiments, at least one processor 512 may communicate with at least one processor 428, e.g., to transmit information associated with a load imposed on fluid turbine 404. For example, the information may be used by the at least one processor to implement one or more MPPT protocols (e.g., including an individual MPPT protocol or lower-level MPPT protocol for a single fluid turbines, and/or a cluster MPPT protocol or an upper-level MPPT protocol for a plurality of geographically-associated fluid turbines), to coordinate braking for a cluster of geographically-associated fluid turbines, and/or to coordinate blade orientation for a cluster of geographically-associated fluid turbines.

For example, FIG. 10 may be taken together with FIGS. 4, and 13 as a detailed schematic diagram of integral fluid energy conversion system 400. A version of circuit 1300 may be associated with each one of MPPT controls 1002 of charge controllers 410, allowing each of at least one processors 512 (e.g., each dedicated to one of individual fluid turbines 404) to coordinate operations for each fluid turbine 404 (e.g., in isolation). In addition, interconnecting circuitry 414 may connect to each of MPPT controls 1002, allowing at least one processor 428 to receive information from any of charge controllers 410 (e.g., each dedicated to one of individual fluid turbines 404) to coordinate operations for fluid turbines 404 operating in cluster 401 as integral fluid energy conversion system 400.

Figure 14:
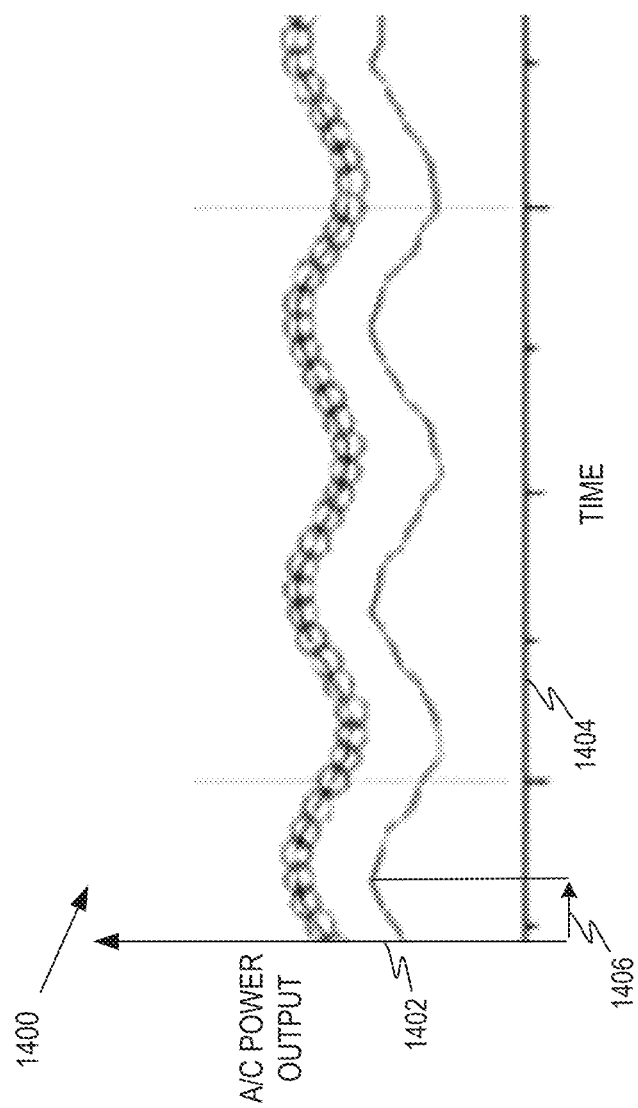
FIG. 14 is an exemplary graph of cyclical power signal generated by an electric energy generator connected to a fluid turbine, consistent with some embodiments of the present disclosure.

FIG. 14 illustrates an exemplary graph 1400 of cyclical power signal energy generator by an electric energy generator connected to a fluid turbine, consistent with some embodiments of the present disclosure. Graph 1400 may represent a power signal produced by energy generator 406 as fluid turbine 404 rotates in response to fluid flow 210. In some embodiments, graph 1400 may be substantially sinusoidal, corresponding to a rotating motion of fluid turbine 404, where different stages of rotation may correspond to the generation of differing levels of energy.

Providing small fluid turbines with an electronic and a mechanical brake may be challenging. For a small turbine, it may be expensive and/or difficult to implement braking for both horizontal and vertical axis turbines. During hurricanes, even if a turbine is completely braked, significant aerodynamic forces may continue affecting a turbine (unless the turbine has yawing capabilities, which may be expensive for a small turbine.) Disclosed embodiments include placing a hood or bag over turbine blades to substantially alleviate effects of wind. There may even be some durability advantage by having a little bit of flexibility to move slightly with the wind. The method may initiate by obtaining a meteorological forecast before placing a hood over a fluid turbine. For greater safety and utility, a brake may be activated to cease rotation of the blades prior to placing a hood over the turbine, but this is not required.

For greater safety and utility, a pole may be attached to a hood at its open end. The pole may be detachable from the hood. It can be left attached to make it easier to take off the hood when the hurricane is over. That pole may be attached to the base or body of the turbine in order to attach the hood more securely. The pole may function to keep the hood open so it can be placed over the blades. In one embodiment, a pole and hood combination may be shaped as a butterfly net but may be impermeable. A partially open hood may be used so that a turbine may still rotate to some degree and produce electricity during a hurricane.

A pole may be fully attached to a hood at the opening, like a butterfly net. A pole may be attached to a hood in other ways, for example, by threading a tube projecting from the pole into a tunnel of fabric made on the outer edge of the hood. A non-detachable pole that is provided along with the hood may remain connected so that the hood may be ready to be removed when the hurricane is over. In one embodiment, a hood may be made of rip-stop nylon or any other durable fabric. In one embodiment, a hood may include at least one grommet that corresponds to a nubbin on a non-moving part of the turbine, such as a turbine base.

Disclosed embodiments may include a hood of slightly larger size than turbine blades, the hood may be configured to be placed over the blades. In some embodiments, a turbine includes an electronic and/or physical brake to slow down or stop the turbine. In some embodiments, at least one grommet or cord attached to the hood may correspond to an extrusion or hole on a turbine base or body to attach a hood. In some embodiments, a pole may be attached to a hood to hold the hood open to dimensions on all sides greater than that of the blades. The pole may be either detachable or non-detachable.

Disclosed embodiments include a method for applying braking to a turbine. The method may include a step of providing a turbine with blades. The method may include a step of providing a hood having dimensions (e.g., a size) greater than that of the blades. The method may include a step of placing the hood over the blades. In some embodiments, a physical and/or electronic brake may be activated before placing the hood over the blades. In some embodiments, the hood includes at least one grommet or cord attached to the hood and which may correspond to an extrusion or hole on a turbine base or body to attach the hood, thereby causing the hood and the turbine base to be attached. In some embodiment, the method includes receiving a meteorological forecast of a pending hurricane, and placing a hood over blades of a fluid turbine prior to the hurricane. In some embodiments, the method includes attaching a pole to the hood which holds the hood open to dimensions on all sides greater than that of the blades. The pole may be used to throw the hood over the blades. The pole is either detachable or non-detachable.

Supplying electrical energy into an electrical grid may require matching a voltage, frequency, and/or phase of a grid power signal waveform. In addition, some electronic components (e.g., inverters) may be designed to operate in specific ranges, where operating outside these ranges may hamper performance and/or introduce loss and inefficiencies. When operating under low fluid speed conditions, a turbine-driven electric energy generator may fail to output AC energy at a level sufficient for supply to an electrical grid and/or fall within operating range of electronic components. However, failure to harness energy generated under low fluid speed conditions may result in energy loss, hampering efficiency of fluid-energy conversion systems.

For example, at low wind speed, electrical energy generated by a fluid turbine may be unsuitable for an electrical grid (e.g. may be less than 120 V, or frequency may be less than 50 Hz). In this situation, the energy may be stored in a battery. When wind speed is sufficiently high, the energy generated may be suitable for directly supplying to the electrical grid (e.g., at 120 V, 50 Hz, etc.). A controller may determine whether energy is suitable for direct supply. If the energy is not suitable for direct supply to the electrical grid, the controller may toggle a controllable switch that causes the energy to be stored in a battery for subsequent use. If the energy is suitable for direct supply to the electrical grid, the controller may toggle the controllable switch so that energy is directed to the electrical grid. Sometimes, the controller may also allow energy to be supplied from the battery to smooth out the energy being supplied to the electrical grid.

For example, under adequate wind speed conditions, a wind turbine may supply 100 kilowatt hours of electrical energy per year to an electrical grid. However, under low speed wind conditions, a wind turbine may only generate an average of 7.5 watts per hour, which may be insufficient to meet a threshold requirement of an inverter and/or electrical grid. At an annual period of 4000 hours of low wind speed conditions, this may accumulate to as much as 30 kilowatts (e.g., 4000 hours×7.5 watts per hour) of lost power. Harnessing energy produced under low wind speed conditions may, in this example, allow increasing annual power production by as much as 30%.

Systems, methods, and non-transitory computer readable media are disclosed for controlling an energy generator. Such a control system may include a detector for sensing an indicator associated with electrical energy generated by the energy generator; at least one energy storage component configured, in a first mode of operation, to store energy generated by the energy generator during operation at a sub-threshold level insufficient for real-time supply of energy to an associated electrical energy sink; an energy converter configured, in a second mode of operation, to provide energy generated by the energy generator during operation above the threshold level for real-time supply of energy to the associated electrical energy sink; and a controllable switch, electrically associated with the detector, and configured to alternately toggle between the first mode of operation and the second mode of operation based on the indicator to thereby permit energy generated at the sub-threshold level to be collected and intermittently used to allow harnessing energy generated under low speed conditions.

Some embodiments involve a control system for an energy generator. A control system for an energy generator may include a system configured to manage, coordinate, direct, and/or supervise one or more operating parameters of an energy generator. Such parameters may include, for example, a voltage level, a current level, an impedance, a capacitance, an inductance, a load, a brake, a rotational speed of a rotor and/or a fluid turbine connected thereto, a frequency of an AC signal, a phase of an AC signal, a voltage level of a DC signal (e.g. converted from an AC signal), a charge level of one or more associated energy storage components, and/or any other parameter associated with an operation of an energy generator.

Some embodiments involve a detector for sensing an indicator associated with electrical energy generated by the energy generator. A detector may be understood as described elsewhere in this disclosure. Sensing (e.g., to sense) may include detecting, measuring, and/or receiving a measurement. An indicator may include a measurement, a sign, and/or a signal conveying information about a state and/or level of, e.g., electrical energy. A detector for sensing an indicator associated with electrical energy generated by an energy generator may include a detector associated with an energy generator and/or with a fluid turbine connected thereto. Examples of a detector associated with an energy generator may include a voltmeter and/or current meter for measuring an electrical signal, a magnetometer to measure a magnetic field, and/or a detector for measuring a rotational velocity of a rotor. Examples of a detector associated with a fluid turbine may include an anemometer for sensing a fluid speed, and/or a detector for measuring a rotational speed of a plurality of blades and/or a shaft of a fluid turbine (e.g., as described elsewhere in this disclosure).

In some embodiments, the indicator is a measure of electrical output from the energy generator. A measure of electrical output may include a current level, a voltage level, a frequency, and/or a phase. A measure of electrical output may include a measure of an AC power output and/or a measure of a DC power signal converted from an AC power output (e.g., using a rectifier). In some embodiments, the indicator is a measure of fluid velocity. Fluid velocity may refer to a rate of a fluid flow (e.g., measured as meters per second or mps, or kilometers per hour or kph). An energy generator may be associated with a fluid turbine configured to convert a fluid flow to rotational mechanical motion. The energy generator may convert the rotational mechanical motion to an AC power signal having characteristics (e.g., amplitude, phase, and/or frequency) corresponding to the rotational mechanical motion (e.g., see FIG. 14). Characteristics of a fluid flow may affect characteristics of electric energy generated by an energy generator associated with a fluid turbine. For example, fluid velocity may translate to a rotational speed of a fluid turbine and/or an associated energy generator rotor, which may translate to a phase, amplitude, and/or frequency of an AC power signal generator by the energy generator. Thus, a measure of fluid velocity may be used as an indicator associated with electrical energy generated by the energy generator. In some embodiments, the fluid is air, e.g., the fluid velocity is wind velocity. For instance, an energy generator may be associated with a wind turbine configured to convert wind (e.g., a flow of air) to rotational mechanical motion. In some embodiments, the fluid is water, e.g., the fluid velocity is a velocity of a water current or flow. For instance, an energy generator may be associated with a water turbine configured to convert an ocean or river current to rotational mechanical motion.

In some embodiments, the indicator is associated with a measure of a rotational speed of a turbine of the energy generator. A rotational speed of a turbine of an energy generator may correspond to a number of revolutions that blades and/or a shaft of a fluid turbine and/or an associated rotor complete per minute (e.g. revolutions per minute, or RPM) or a number of completed cycles per second (e.g. Hz). A detector for measuring a rotational speed of a turbine may include one or more of a tachometer (e.g., configured to measure rotational speed of a fluid turbine shaft), a magneto-resistive sensor, an inductive sensor, a Hall effect sensor (e.g., configured to use a Hall Effect to detect a presence of a magnetic field for determining the rotations of a fluid turbine shaft), an oscillatory sensor, an optical sensor (e.g., an encoder and/or an infrared sensor configured to measure a rotational speed of a turbine shaft by counting a number of rotations or by measuring a time duration between rotations), an ultrasonic sensor (e.g., configured to emit ultrasonic waves for measuring a distance between the sensor and the blades of a fluid turbine, from which a rotational speed of the blades may be determined). A rotational speed tolerance threshold may limit a rotational speed of a fluid turbine to prevent blade erosion and/or stress on the blades and shaft of the fluid turbine causing instability and breakage and ensure proper, effective, and/or safely operation. An indicator of rotational speed of a fluid turbine of an energy generator may include an electronic signal emitted by a detector for measuring a rotational speed for a fluid turbine.

By way of a non-limiting example, in FIG. 13, circuit 1300 may function as a control system for energy generator 406. Circuit 1300 may include a rectifier 530 configured to convert AC power output 408 generated by energy generator 406 to a DC signal. Circuit may include a detector (e.g., voltage sensor 1310) positioned downstream from rectifier 530 for sensing a voltage and/or current level of the DC signal (e.g., an indicator associated with electrical energy generated by generator 406). Additionally or alternatively, in FIGS. 4-5, sensors 418A and 418B may include one or more detectors (e.g., sensors 502, 504, 506, 508, 510, and 524). Sensors 418A and 418B may sense an indicator associated with electrical energy generated by generators 406A and 406B, respectively. For example, power output sensor 510 (e.g., including a voltmeter and/or a current meter) may sense an indicator associated with electrical energy (e.g., electric output) generated by generators 406A and 406B. Additionally or alternatively, fluid speed sensor 504 may sense fluid velocity as an indicator associated with electrical energy generated by generators 406A and 406B. In some embodiments, the fluid may be wind (e.g., see fluid flow 210 in FIG. 2), and the fluid turbine may be a wind turbine (e.g., fluid turbine 100). In some embodiments, the fluid may be water, and the fluid turbine may be a water turbines (e.g., see turbine 104 in FIG. 1).

Some embodiments involve at least one energy storage component configured, in a first mode of operation, to store energy generated by the energy generator during operation at a sub-threshold level insufficient for real-time supply of energy to an associated electrical energy sink. An energy storage component may refer to a device or group of devices configured to accumulate and/or collect (e.g., electrical) energy for subsequent use. An energy storage component may store electrical energy as potential energy for subsequent use, e.g., as kinetic energy for performing work. In some embodiments, AC electrical energy may be converted to DC electrical energy (e.g., as a DC voltage potential) for accumulation in an energy storage component. Some examples of at least one energy storage component may include one or more batteries and/or capacitors. To store energy may include to accumulate and/or collect energy in reserve. Storing energy generated by an energy generator in an energy storage component may involve diverting a flow of electrical energy from an electrical generator output to an input of an energy storage component using an electrical transmission wire or cable. In some embodiments, the at least one energy storage component includes a capacitor or a battery. A capacitor and a battery may be understood as described elsewhere in this disclosure. In some embodiments, the at least one energy storage component includes a plurality of capacitors, e.g., multiple capacitors. In some embodiments, the plurality of capacitors may be arranged in parallel, e.g., to maintain a common voltage differential or level. A common voltage differential for each energy storage component may, for example, facilitate conversion (e.g., to other DC voltage levels, and/or to an AC voltage) for subsequent use of the stored energy.

A mode of operation may refer to a manner and/or a set of conditions for performing one or more procedures. A mode of operation may tune or adjust an operation of a system to accommodate a particular set or range of conditions. For instance, a first mode of operation may be associated with a first set of conditions and a second mode of operations may be associated with a second set of conditions. The first mode of operation may be incompatible with or otherwise unsuitable for the second set of conditions. The second mode of operation may be incompatible with or unsuitable for the first set of conditions. For instance, a first mode of operation may be associated with generating insufficient energy for supplying to an electrical energy sink in real-time, and a second mode of operation may be associated with generating sufficient energy for supplying to an electrical energy sink in real-time. The first mode of operation may allow storage of electrical energy generated at a sub-threshold level in at least one energy storage component for subsequent use, thereby allowing for harvesting energy generated at a sub-threshold level and prevent loss thereof. For instance, in a first mode of operation, generated electrical energy may be unsuitable for supply to grid and therefore may be stored. In a second mode, generated electrical energy may be suitable for supply to the grid and therefore would be supplied.

Insufficient may refer to inadequate, lacking, wanting, and/or deficient. Real-time may refer to an operation and/or process occurring within a specified time-limit. In some embodiments, real-time may account for communication and/or processing latencies, but may exclude latencies associated with storing data for later use. Supplying (e.g., supply) may include providing, transmitting, and/or delivering (e.g., via a medium). For example, energy may be supplied via one or more (e.g., high power) transmission lines (e.g., overhead, sub-transmission, and/or underground transmission lines). A real-time supply of energy may refer to providing a flow of electrical energy at a rate that the electrical energy is produced (e.g., dynamically). For example, the energy may be supplied in an absence of storing the generated electrical energy statically (e.g., in an energy storage component such as a battery or capacitor). Alternatively, the energy may be supplied in real time via an intermediate storage device. A threshold (e.g., a threshold level) may be understood as described elsewhere in this disclosure. A threshold level may be associated with a level of energy compatible for supplying to an electrical grid, an operating range of an inverter associated therewith, and/or with energy required to operate circuitry associated with controlling a fluid turbine and/or an associated electric energy generator. In some embodiments, a threshold level may be associated with a fluid speed, and/or a rotational speed of a fluid turbine and/or an energy generator. A sub-threshold level may refer to a measurable quantity below a threshold level and/or outside of a tolerance of a threshold level. An electrical energy sink may refer to an electrical circuit and/or electrical system configured to receive an electric current. Examples of an electrical energy sink may include one or more batteries, capacitors, loads, electric-powered appliances, and/or an electrical grid.

Operation (e.g., of an electric generator) at a sub-threshold level insufficient for real-time supply of energy to an associated electrical energy sink may refer to energy generated by a fluid turbine and/or an associated generator at a level inadequate for supply to an electrical energy sink. For example, the electrical energy may fail to reach one or more standards and/or regulations associated with an electrical grid, may fail to fall within an operating range of an inverter, and/or may fail to account for electrical energy needed to power circuitry for controlling a fluid turbine and/or an associated electric generator. Operation at a sub-threshold level may be associated, for instance, with a low fluid speed, a low rotational speed (e.g., of turbine blades or shaft, and/or a generator rotor) and/or a low electric energy output (e.g., current or voltage). For example, electrical energy supplied to an electrical grid may be required to conform with a voltage, frequency, and/or phase of an electrical grid power signal waveform (e.g., 120 V at 60 Hz or at 240 V at 50 Hz). Thus, electricity generated below 120 V at 60 Hz or below 240 V at 50 Hz may indicate operation at a sub-threshold level for real-time supply to an electrical energy sink. As another example, electrical energy supplied to an electrical energy sink may be required to undergo conversion to AC voltage via an inverter. Thus, electrical energy generated below an operating range of an inverter may indicate operation at a sub-threshold level for real-time supply to an electrical energy sink. As a further example, electrical energy may be required to power circuitry associated with controlling a fluid turbine and/or an associated electric generator, e.g., while simultaneously providing a real-time supply of energy to an electrical energy sink. Such circuitry may include, for example, at least one processor, at least one memory, a braking circuit and/or system, an MPPT unit, one or more sensors or detectors, and/or any other energy-demanding components for controlling a fluid turbine and/or an associated generator. Thus, in some embodiments, electrical energy insufficient to power circuitry and simultaneously meet an electrical grid requirement and/or an operating range for an inverter may indicate operation at a sub-threshold level for real-time supply to an electrical energy sink.

By way of a non-limiting example, in FIG. 13, at least one energy storage component 1322 may be configured, in a first mode of operation, to store energy generated by generator 406 during operation at a sub-threshold level insufficient for real-time supply of energy to associated electrical energy sink 402 (e.g., see FIG. 4). In some embodiments, energy storage component 1322 may include one or more capacitors. As another non-limiting example, in FIGS. 7-10, battery bank 720 (e.g., at least one energy storage component) may be configured, in a first mode of operation, to store energy generated by one or more generators 406 during operation at a sub-threshold level insufficient for real-time supply of energy to an associated electrical energy sink (e.g., electrical grid 718).

Some embodiments involve an energy converter configured, in a second mode of operation, to provide energy generated by the energy generator during operation above the threshold level for real-time supply of energy to the associated electrical energy sink. To convert may include to transform, alter, and/or adapt. An energy converter may refer to a device or circuitry configured to transform a first type of electrical energy to a second type of electrical energy. For example, a charge controller (e.g., including an AC-DC converter or an inverter) may transform an alternating current (AC) signal generated by an electric generator to a direct current (DC) signal (e.g., to power one or more electronic components). As another example, a rectifier may transform a DC signal to an AC signal. As a further example, a DC-DC converter may convert a DC signal from a first voltage level to a second voltage level. Providing (e.g., to provide) may include supplying, transmitting, and/or delivering. Providing energy may include supplying, delivering, and/or transmitting energy, e.g., via high power transmission line. Real-time supply of energy to an associated electrical energy sink may include providing a flow of electrical energy at a rate that the electrical energy is produced (e.g., dynamically) while avoiding and/or preventing (e.g., static) storage of electrical energy to later use. Operation above a threshold level for real-time supply of energy to the associated electrical energy sink may refer to energy generated by a fluid turbine and/or an associated generator at a level adequate for supplying to an electrical energy sink. For example, the electrical energy generated by the fluid turbine or associated generator may meet one or more standards and/or regulations associated with an electrical grid, may fall within an operating range of an inverter, and/or may account for electrical energy needed to power circuitry for controlling a fluid turbine and/or an associated electric generator. Operation above a threshold level may be associated, for example, with an above-threshold fluid speed, an above-threshold rotational speed (e.g., of turbine blades or shaft, and/or a generator rotor) and/or an above-threshold electric energy output (e.g., current or voltage). For example, electricity generated at 120 V at 60 Hz or at 240 V at 50 Hz may indicate operation above a threshold level for real-time supply to an electrical energy sink. As another example, electrical energy generated within an operating range of an inverter may indicate operation above a threshold level for real-time supply to an electrical energy sink. As a further example, electrical energy sufficient to power circuitry and simultaneously meet an electrical grid requirement and/or an operating range for an inverter may indicate operation above a threshold level for real-time supply to an electrical energy sink.

In some embodiments, the energy converter includes an inverter, and the associated electrical energy sink includes an electrical grid. An inverter and electrical grid may be understood as described elsewhere in this disclosure. For example, an inverter may convert a DC signal generated by one or more energy generators to a grid-compatible AC signal. In some embodiments, a single inverter may convert an aggregate DC signal generated by a cluster of fluid turbines and associated energy generators to a single grid-compatible AC signal. In some embodiments, the threshold is associated with a maximum input voltage rating or a minimum input voltage rating of the inverter. A voltage rating of an inverter may refer to a voltage threshold and/or a tolerance associated with a voltage threshold, for operating an inverter. A voltage rating of an inverter may be associated with one or more considerations related to safety, performance, efficiency, and/or compatibility (e.g., for connecting to an electrical grid). A maximum voltage rating of an inverter may be associated with an upper limit or boundary for a voltage signal inputted to an inverter. A minimum voltage rating of an inverter may be associated with a lower limit or boundary for a voltage signal inputted to an inverter. Thus, a threshold level for determining when to operate according to the first mode of operation and when to operate according to the second mode of operation may be associated with an operating range (e.g., a maximum and/or minimum input voltage rating) of an inverter.

Some embodiments involve at least one DC-DC converter, and at least one rectifier configured, during the second mode of operation, to convert an AC power signal generated by the energy generator operating above the threshold level to a DC signal. A DC-DC converter, rectifier, and an AC (e.g., an AC power signal) may be understood as described elsewhere in this disclosure. When an energy generator converts mechanical rotational motion to an AC power signal, characteristics of the AC power signal (e.g., voltage level, frequency, and/or phase) may correspond to characteristics of the mechanical rotation motion. However, such signal characteristics may fail to comply with regulations and/or specifications for real-time supply of energy to an electrical grid. Thus, when an energy generator operates above the threshold level (e.g., during the second mode of operation), an associated rectifier may convert the AC power signal to a DC signal. The DC signal may be manipulated such that converting the manipulated DC signal via an associated inverter may produce an AC signal suitable for real-time supply of energy to an electrical grid. In some embodiments, the DC-DC converter is configured to adapt the converted DC signal to another DC signal for supplying, in the second mode of operation, energy to the associated electrical grid via the inverter. Adapting (e.g., to adapt) may include adjusting and/or manipulating, e.g., to achieve conformance and/or accommodation with one or more specifications and/or regulations associated with real-time supply of energy to an electrical grid. A DC-DC converter may receive a DC signal converted from an AC power signal via a rectifier associated with an energy generator. A DC-DC converter may buck or boost a converted DC signal to produce another DC signal, that when converted to an AC signal via an inverter, may conform with one or more specifications and/or regulations associated with real-time supply of energy to an electrical grid.

In some embodiments, the energy converter includes a charge controller, and the associated electrical energy sink includes a battery bank. A charge controller and a battery bank may be understood as described elsewhere in this disclosure. A charge controller may ensure compliance with one or more regulations and/or specifications, e.g., associated with a battery bank and/or a fluid turbine and/or an associated energy generator. For example, a charge controller may divert excess DC power to a dump load to prevent overcharging of a battery bank, to prevent a rotational velocity of a fluid turbine and/or rotor from exceeding a safety threshold. For example, applying a resistance dump load to a generator may increase a load torque imposed on a wind turbine, slowing the turbine blades. Additionally or alternatively, a charge controller may enable aggregating multiple DC signals produced by multiple electric generators for real-time supply to a battery bank.

By way of a non-limiting example, in FIG. 4, an energy converter (e.g. including inverter 434) may be configured, in a second mode of operation, to provide energy generated by one or more of energy generators 406A and 406B during operation above the threshold level for real-time supply of energy to associated electrical energy sink 402. In some embodiments, electrical energy sink 402 may include electrical grid 718 (e.g., see FIG. 7). In some embodiments, the threshold may be associated with a maximum input voltage rating or a minimum input voltage rating of inverter 434.

By way of another non-limiting example, in FIG. 13, DC-DC converter 1318 and rectifier 530 may be configured, during the second mode of operation, to convert AC power output 408 (e.g., AC power output) generated by one or more of generators 406 operating above the threshold level to a DC signal. Rectifier 530 may convert AC power output 408 to a corresponding DC signal. DC-DC converter 1318 may adapt the converted DC signal to another DC signal, that when converted by inverter 434, may produce an above-threshold AC signal that may be supplied in real-time to associated electrical grid 718 (e.g., see FIGS. 7 to 11). By way of another non-limiting example, in FIG. 4, the energy converter may include a charge controller 410 (e.g., charge controllers 410A and 410B), and associated electrical energy sink 402 may include battery bank 720 (e.g., see FIG. 7). Charge controllers 410A and 410B may convert AC power outputs 408A and 408B, respectively, during the second mode of operation, for real-time supply of energy to battery bank 720.

Some embodiments involve a controllable switch, electrically associated with the detector. A switch may refer to an electronic component or device capable of toggling an electrical circuit to interrupt a signal and/or allow a signal to flow uninterrupted (e.g., capable of turning a signal on or off) and/or capable of diverting a signal from one path to at least one other path. An electronic switch may include one or more diodes and/or transistors. A controllable switch may include a switch associated with a trigger signal configured to operate a switch (e.g., by turning the switch on or off). In some embodiments, a controllable switch may include a switch associated with at least one processor. A controllable switch electrically associated with a detector may include a detector connected to a switch via one or more wires and/or fibers, allowing a trigger signal produced by the detector to operate the switch.

Some embodiments involve a controllable switch configured to alternately toggle between the first mode of operation and the second mode of operation based on the indicator. Alternately may refer to capable of changing or switching back and forth, e.g., in succession. To toggle may include to switch, flip, swap, or otherwise change a state. To alternately toggle between a first mode of operation and a second mode of operation may include to switch back and forth between two operation modes, in response to changing fluid speed conditions. In some instances, to alternately toggle may include to repeatedly switch between two operation mode.

For instance, based on a level of electrical energy, a controllable switch may alternate between activating first circuitry for storing electrical energy at a sub-threshold level in a first mode of operation for an energy generator versus activating second circuitry for real-time supply of electrical energy at an above-threshold level to an electrical energy sink in a second mode of operation for the energy generator. A controllable switch electrically associated with a detector for alternately toggling between a first mode of operation and a second operation based on an indicator may be configured to alternately toggle between first circuitry associated with a first mode of operation and second circuitry associated with a second mode of operation based on an indicator received from the detector. When an indicator received from a detector indicates electrical energy is being generated at a sub-threshold level, a controllable switch may establish a connection to first circuitry associated with a first mode of operation and may discontinue or sever a connection to second circuitry associated with a second mode of operation. When an indicator received from a detector indicates electrical energy is being generated above a threshold level, a controllable switch may discontinue or sever a connection to first circuitry associated with a first mode of operation, and may establish a connection to second circuitry associated with a second mode of operation.

Some embodiments involve a controllable switch configured to permit energy generated at the sub-threshold level to be collected and intermittently used. To permit may include to allow, to enable, and/or to establish a connection allowing access and/or communication (e.g., to a circuit). Collect may include accumulate, aggregate, and/or store. Intermittent may be understood as described elsewhere in this disclosure. Intermittently used may include utilizing periodically and/or occasionally. To permit energy generated at the sub-threshold level to be collected and intermittently used may include periodically accumulating and/or storing energy when energy is being generated at a sub-threshold level and periodically releasing accumulated energy when energy is being generated above the threshold level.

By way of a non-limiting example, in FIG. 13, controllable switch 1314 may be electrically associated with voltage sensor 1310 (e.g., a detector), and may be configured to alternately toggle between the first mode of operation (e.g., associated with DC-DC converter 1316) and the second mode of operation (e.g., associated with DC-DC converter 1318) based on the indicator. By establishing a connection to DC-DC converter 1316 and severing a connection to DC-DC converter 1318, controllable switch 1314 may thereby permit energy generated at the sub-threshold level to be collected (e.g., in energy storage component 1322) for subsequent intermittent use.

Some embodiments involve at least one rectifier for converting a first AC power signal generated by the energy generator operating at the sub-threshold level to a first DC power signal compatible for storing energy in the at least one energy storage component. A rectifier may be understood as described elsewhere in this disclosure. Compatible may refer to suitable and/or operable with. The at least one energy storage component may be configured to store energy in DC form, such that an AC power signal generated by an energy generator may be incompatible for storage in the at least one energy storage component. To allow storing energy generated by an energy generator in at least one energy storage component (e.g., in the first mode of operation), an associated rectifier may convert an AC power signal, produced by an energy generator operating at the sub-threshold level, to a DC power signal. Once in DC form, the at least one energy storage component may receive the DC power signal and store the DC power signal as (e.g., static) DC energy. In some embodiments, the at least one rectifier includes a three-phase rectifier. A three-phase rectifier may include a rectifier configured to receive a three-phase AC voltage at an input and convert a three-phase AC voltage to a DC voltage output. For instance, an energy generator may be configured to generate a three-phase AC power signal from rotational mechanical motion. A three-phase rectifier may convert the generated three-phase AC power signal to a DC signal, e.g., to allow for storage in at least one energy storage component.

By way of a non-limiting example, in FIG. 13, rectifier 530 may convert AC power output 408 generated by generator 406 operating at the sub-threshold level to a first DC power signal compatible for storing energy in at least one energy storage component 1322 (e.g., via DC-DC converter 1316). In some embodiments, generator 406 and rectifier 530 may be a three-phase generator and a three-phase rectifier. Some embodiments involve at least one processor configured to control the controllable switch by receiving the indicator from the detector. At least one processor may be understood as described elsewhere in this disclosure. In some embodiments, the detector, the switch, and the at least one processor are integrated within an ASIC circuit. An ASIC (e.g., application specific integrated circuit) may refer to a customized integrated circuit configured for a particular use-case. An ASIC circuit may include logic specific to solving a particular problem. Receiving may be understood as described elsewhere in this disclosure. Receiving an indicator from a detector may include receiving an electronic signal from a detector via a (e.g., wired and/or wireless) communications channel. The electronic signal may include information encoding one or more (e.g., sensed) measurements of physical phenomena. For example, the at least one processor may receive a measure of fluid velocity from an anemometer, and/or a measure of rotational velocity of a fluid turbine and/or an energy generator from a tachometer, a magneto-resistive sensor, an inductive sensor, a Hall effect sensor, an optical sensor, and/or an ultrasonic sensor. As another example, the at least one processor may receive a measure of voltage and/or current from a voltmeter and/or a current meter. The at least one processor may use the indicator to determine when the energy generator may be operating at the sub-threshold level in the first mode of operation, and when the energy generator may be operating above the threshold level in the second mode of operation. For example, when the at least one processor determines that the energy generator may be operating at the sub-threshold level insufficient for real-time supply of energy to an associated electrical energy sink, the at least one processor may transmit a control signal to the controllable switch to activate circuitry associated with the first mode of operation. When the at least one processor determines that the energy generator may be operating above the threshold level for real-time supply of energy to an associated electrical energy sink, the at least one processor may transmit a control signal to the controllable switch to activate circuitry associated with the second mode of operation.

In some embodiments, the at least one processor is configured to control the controllable switch by comparing the received indicator with the threshold. Comparing may include contrasting, correlating, and/or analyzing, e.g., to identify one or more distinguishing and/or similar features between two quantities, measurements and/or objects. In some embodiments, comparing may include subtracting and/or dividing, e.g., to determine a difference and/or ratio between an indicator and a threshold. The at least one processor may retrieve data corresponding to the threshold from memory, and compare the received indicator to the threshold. Based on the comparison, the at least one processor may determine whether an energy generator is operating at a sub-threshold level or at an above threshold level for real-time supply of energy to an electrical energy sink. In some embodiments, the at least one processor is configured to control the controllable switch by toggling the controllable switch between the first mode and the second mode based on the comparison. Toggling (e.g., to toggle) may be understood as described elsewhere in this disclosure. For example, varying fluid conditions may cause power generated by an energy generator to vary accordingly. Under a first fluid flow condition (e.g., during a first time period), the at least one processor may determine that the energy generator may be operating at a sub-threshold level. The at least one processor may transmit a control signal to the controllable switch to activate circuitry associated with the first mode of operation for storing energy in at least one energy storage component, and deactivate circuitry associated with the second mode of operation. Under a second fluid flow condition (e.g., during a second time period following the first time period), the at least one processor may determine that the energy generator may be operating above the threshold level. The at least one processor may transmit a control signal to the controllable switch to activate circuitry associated with the second mode of operation for supplying energy in real-time to an associated electrical energy sink, and deactivate circuitry associated with the first mode of operation. Under a third fluid flow condition (e.g., during a third time period following the second time period), the at least one processor may determine that the energy generator may revert to operating at a sub-threshold level. The at least one processor may transmit a control signal to the controllable switch to activate circuitry associated with the first mode of operation for storing energy in at least one energy storage component, and deactivate circuitry associated with the second mode of operation.

By way of a non-limiting example, at least one processor 512 may be configured to control controllable switch 1314 by receiving an indicator from a detector (e.g., voltage sensor 1310), comparing the received indicator with a threshold (e.g., retrieved from memory 514). Based on the comparison, at least one processor 512 may toggle controllable switch 1314 between DC-DC converter 1316 associated with the first mode of operation and DC-DC converter 1318 associated with the second mode of operation.

Some embodiments involve the at least one processor further configured to intermittently supply energy collected in the at least one energy storage component to the associated electrical energy sink when the energy in the at least one energy storage component reaches a limit. A limit may include a boundary, a baseline, a capacity, and/or a constraint. A limit may refer to an upper limit (e.g., a cap, ceiling, or maximum) or a lower limit (e.g., a floor or minimum). For example, a limit for at least one energy storage component may correspond to a maximum capacity for the at least one energy storage component to store energy, a time period (e.g., limit) after which stored energy may be released, an amount of (e.g., predetermined) stored energy for releasing, and/or any other criterion for determining when and/or how much stored energy may be released. In some embodiments, a time limit may include an amount of time (e.g., latency) needed by the at least one energy storage component to store additional energy to reach an electrical energy storage limit. Reaching a limit may include arriving at a limit, and/or within a tolerance of a limit. For instance, upon detecting a level of stored energy in the energy storage component reaching an energy storage limit, the at least one processor may transmit a signal to release energy stored in the at least one storage component. The at least one storage component may release all the stored energy, or only a portion of the stored energy (e.g., based on a timing and/or energy demand criterion). An associated electrical energy sink and/or circuitry associated with controlling one or more fluid turbines and/or associated energy generators may receive the released energy. Some embodiments involve the at least one processor further configured to intermittently supply energy collected in the at least one energy storage component to smooth power delivered to the associated electrical energy sink in the second mode. In some embodiments, an associated electrical energy sink may include an electrical grid. To smooth power delivered to an associated electrical energy sink may correspond to smoothing power delivered to an electrical grid, as described elsewhere in this disclosure. When operating under variable fluid flow conditions, an energy generator may generate variable levels of energy, at times generating insufficient energy for real-time supply to an electrical grid (e.g., which may be stored in at least one energy storage component for subsequent use according to the first mode of operation), and at times generating sufficient energy for real-time supply to an electrical grid according to the second mode of operation. However, even energy generated in the second mode of operation may fluctuate, e.g., in response to varying fluid conditions. To augment lower than average energy generated in the second mode of operation, the at least one processor may transmit a signal to release at least some energy stored in the at least one energy storage component, convert the released energy to a grid-compatible AC power signal, and add the converted energy to the lower than average energy, to thereby achieve an average level of energy to supplying to the electrical grid in real-time. In some embodiments, smoothing power delivered to an electrical grid may include diverting away excess energy generated in the second mode of operation. In some embodiments, the at least one processor may transmit a signal to divert at least some excess energy for storing in at least one energy storage component, for subsequent use (e.g., to augment a lower than average AC power signal). By augmenting lower than average AC power and/or diverting away greater than average AC power, the at least one processor may lessen fluctuations of AC power fed to an electrical grid.

By way of a non-limiting example, in FIG. 13, at least one processor 512 may intermittently supply energy collected in the at least one energy storage component 1322 to associated electrical energy sink 402 (e.g., see FIG. 4) when the energy in at least one energy storage component 1322 reaches a limit. In some embodiments, at least one processor 512 may intermittently supply energy collected in the at least one energy storage component 1322 to smooth power delivered to associated electrical energy sink 402 in the second mode.

Some embodiments involve the at least one processor further configured to intermittently supply energy collected in the at least one energy storage component to power circuitry associated with the energy generator. Power circuitry may include electronic circuitry configured to control one or more operations of a power-generating fluid turbine, and/or circuitry configured to control and/or deliver electric power generated by a fluid turbine. In some embodiments, power circuitry may be associated with an energy generator associated with a fluid turbine. Power circuitry may include one or more protective components, such as overcurrent, overload protections (e.g., shunt resistors, capacitors, and/or inductors), and/or rated contacts to conform with voltage and current ratings of a load connected thereto. Power circuitry associated with an electric generator may be configured to perform one or more protective, safety, and/or regulatory procedures associated with generating electrical energy, and may require energy for operating. The at least one processor may transmit a control signal to release energy stored in the at least one storage component for operating power circuitry associated with an electric generator. In some embodiments, the at least one processor may cause power generated in the second mode of operation to be drawn for operating power circuitry associated with an energy generator. In some embodiments, the at least one processor may (e.g., intermittently) supplement power for operating power circuitry associated with an energy generator with energy stored in at least one storage component (e.g., generated in the first mode of operation).

In some embodiments the circuitry is associated with a brake. A brake may include a mechanism for controlling a rotational speed of a fluid turbine and/or a rotor of an electrical generator associated with a fluid turbine. A brake may include a mechanical brake and/or an electronic brake. A mechanical brake may include one or more brake pads, discs, and/or drums configured to be engaged via a controllable switch causing a slowing of a rotation of a fluid turbine and/or a rotor connected thereto. For instance, a controllable switch may create a connection to a circuit configured to activate a mechanical component for engaging a mechanical brake. An electronic brake may be configured to increase a load on a generator causing slowing of a rotation of a generator rotor. A brake may be used to moderate and/or regulate operation of an energy generator by slowing a rotation of a fluid turbine and/or an associated rotor. Causing slowing of rotational velocity of a rotor may, for example, prevent an energy generator from overheating. In some instances, slowing rotation of a rotor and/or associated fluid turbine may cause a fluid turbine operating under a specific fluid speed to produce a peak power output (e.g., according to an MPPT protocol). The at least one processor may transmit a control signal to release energy stored in the at least one storage component for operating a brake, e.g., to slow an energy generator. For example, the at least one processor may control braking in accordance with an MPPT protocol.

By way of a non-limiting example, in FIG. 13, at least one processor 512 may intermittently supply energy collected in at least one energy storage component 1322 to power circuitry 1300 (e.g., including mechanical brake control 520 for operating mechanical brake 608, and electronic brake control 518) associated with energy generator 406.

Some embodiments involve at least one DC-DC converter configured, during the first mode of operation, to convert energy stored in the at least one energy storage component for intermittent supply of the stored energy. A DC-to-DC converter may boost (e.g., increase) or buck (e.g., decrease) a DC voltage signal, for example, to accommodate voltage requirements of one or more devices and/or energy sinks. For example, the at least one energy storage component may store electrical energy at a first voltage, and an electrical energy sink may consume electrical energy at a second voltage. At least one processor may cause a DC-DC converter to intermittently draw energy stored in the at least one energy storage component at the first voltage and convert the drawn energy to the second voltage for providing to the electrical energy sink. In some instances, one or more electronic components associated with controlling operations of a fluid turbine may intermittently use at least some of the electrical energy stored in at least one energy storage component. Such electronic components may include, for example, at least one processor, a memory, a mechanical brake control, an electronic brake control, a rectifier, or a circuit protector).

In some embodiments, the least one processor is configured to detect a level of energy stored in the at least one energy storage component and activate the DC-DC converter based on the detected level, thereby discharging the at least one energy storage component. A level of energy stored in the at least one energy storage component may include a level of charge, or capacity. Activating a DC-DC converter may include transmitting a signal to operate a switch creating a connection between a voltage source and an input of a DC-DC converter and a voltage sink and an output of the DC-DC converter. Discharging may refer to releasing energy or charge. The at least one processor may receive a signal from a detector (e.g., a voltage sensor) when sufficient energy is stored in the at least one energy storage component (e.g., above the level of energy) to allow releasing the energy to an associated electrical energy sink. For example, the at least one processor may receive a signal from a voltage detector associated with a battery, and may use the signal to determine how much energy (e.g., % capacity) is stored in a battery. Based on the level of determined energy (e.g., at least 50% capacity, at least 75% capacity, or at least 90% capacity), the at least one processor may activate a DC-DC converter to allow discharging the battery. In some embodiments, the level to allow discharging may be associated with an amount of energy needed to operate a circuit for controlling an energy generator (e.g., 4 Watts). Under low fluid flow conditions, it may take time to generate and store sufficient energy in the first mode of operation to allow for discharging. Therefore, the at least one processor may only activate a DC-DC converter to release stored energy intermittently, to allow for replenishment of stored energy. In some embodiments, the at least one processor may control a DC signal outputted by a rectifier via a controllable switch to allow storage of electrical energy until a level of stored energy is sufficient to overcome an operating threshold associated with one or more electronic components and devices.

By way of a non-limiting example, in FIG. 13, voltage sensor 1320 may detect a level of energy stored in energy storage component 1322. Voltage sensor 1320 may transmit an indication of the detected level of energy to at least one processor 512. At least one processor 512 may determine, based on the detected level of energy, whether to cause energy storage component 1322 to discharge. When the detected level of energy in energy storage component 1322 exceeds a threshold amount, the at least one processor may transmit a control signal to controllable switch 1314 to activate DC-DC converter 1316. Activating DC-DC converter 1316 may create an electrical connection between energy storage component 1322 and DC-DC converter 1316, causing electrical energy to flow out of energy storage component 1322, thereby discharging energy storage component 1322. When the detected level of energy in energy storage component 1322 does not exceed a threshold amount, the at least one processor may avoid transmitting a control signal to controllable switch 1314 for activating DC-DC converter 1316.

Some embodiments involve the at least one processor further configured to select between the first mode of operation and the second mode of operation based on operational parameters of the energy generator. Selecting (e.g., to select) may include choosing, and/or picking. Operational parameters of an energy generator may refer to properties whose values may affect one or more functionalities of an energy generator. Operational parameters of an energy generator may include, for example, a rotational speed or direction of a rotor, a fluid speed, a voltage, current, phase, and/or frequency of a power output, a capacitance, an inductance, an impedance, a resistance, a magnetic field, a load, a temperature, vibrations, oscillations, a brake or state thereof, and/or any other factor affecting operation of an energy generator. In some embodiments, one or more operational parameters may be determined from one or more other operational parameters, e.g., fluid speed may be determined from a rotational velocity of a rotor of an energy generator and the reverse. In some embodiments, operating parameters of an energy generator may include a power curve (e.g., an MPPT power curve) indicating an optimal rotational speed for a fluid turbine operating under a particular fluid speed. The at least one processor may receive (e.g., from one or more detectors) measurements of one or more operational parameters of the energy generator. The at least one processor may use the received measurements to determine if the energy generator is operating at a sub-threshold level and to operate the switch for activating circuitry for the first mode of operation, or if the energy generator is operating above the threshold level and to operate the switch for activating circuitry for the second mode of operation.

Some embodiments involve a non-transitory computer readable medium containing instructions that when executed by at least one processor cause the at least one processor to perform operations for controlling an energy generator. A non-transitory computer readable medium may be understood as described elsewhere in this disclosure. The operations may include receiving a sensed indicator associated with electrical energy generated by the energy generator; comparing the received indicator with a threshold associated with real-time supply of energy to an associated electrical energy sink; and control a controllable switch based on the comparison, wherein the controllable switch is configured to alternately toggle between a first mode of operation and a second mode of operation, wherein in the first mode of operation, energy generated by the energy generator during operation at a sub-threshold level insufficient for real-time supply of energy to an associated electrical energy sink is stored in at least one energy storage component, and during the second mode of operation, energy generated by the energy generator during operation above the threshold level for real-time supply of energy to the associated electrical energy sink is provided to the associated energy sink via an energy converter, and wherein alternately toggling between the first mode of operation and the second mode of operation thereby permits energy generated at the sub-threshold level to be collected and intermittently used.

By way of a non-limiting example, in FIG. 13, at least one processor 512 may receive from voltage sensor 1310 a sensed indicator associated with electrical energy generated by energy generator 406. At least one processor 512 may compare the received indicator with a threshold stored in memory 514, and associated with real-time supply of energy to an associated electrical energy sink 402 (e.g., see FIG. 4). At least one processor 512 may control controllable switch 1314 based on the comparison. Controllable switch 1314 may alternately toggle between a first mode of operation and a second mode of operation. In the first mode of operation, energy generated by energy generator 406 during operation at a sub-threshold level insufficient for real-time supply of energy to associated electrical energy sink 402 may be stored in at least one energy storage component 1322. During the second mode of operation, energy generated by energy generator 406 during operation above the threshold level for real-time supply of energy to associated electrical energy sink 402 may be provided to associated energy sink 402 via an energy converter (e.g., inverter 434). Alternately toggling between the first mode of operation and the second mode of operation may permit energy generated at the sub-threshold level to be collected and intermittently used.

Figure 15:
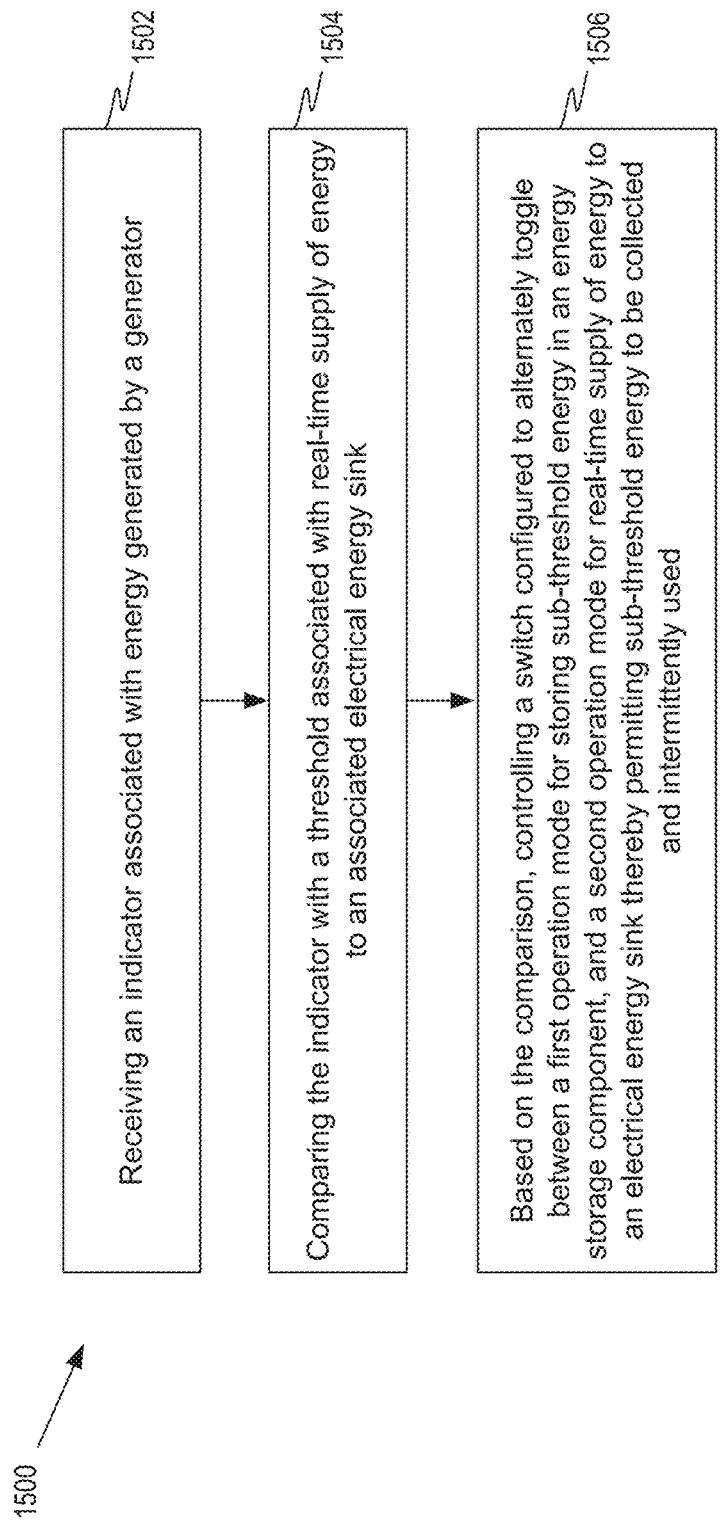
FIG. 15 illustrates a flow diagram of an exemplary process for controlling an energy generator, consistent with embodiments of the present disclosure.

FIG. 15 illustrates a flowchart of an exemplary process 1500 for coordinated braking of a plurality of geographically-associated associated fluid turbines, consistent with embodiments of the present disclosure. In some embodiments, process 1500 may be performed by at least one processor (e.g., processor 428 and/or processor 512) to perform operations or functions described herein. In some embodiments, some aspects of process 1500 may be implemented as software (e.g., program codes or instructions) that are stored in a memory (e.g., memory 430 and/or memory 514) or a non-transitory computer readable medium. In some embodiments, some aspects of process 1500 may be implemented as hardware (e.g., a specific-purpose circuit). In some embodiments, process 1500 may be implemented as a combination of software and hardware.

Referring to FIG. 15, process 1500 includes a step 1502 of receiving a sensed indicator associated with electrical energy generated by the energy generator. By way of a non-limiting example, in FIG. 13, at least one processor 512 may receive from voltage sensor 1310 a sensed indicator associated with electrical energy generated by energy generator 406.

Process 1500 includes a step 1504 of comparing the received indicator with a threshold associated with real-time supply of energy to an associated electrical energy sink. By way of a non-limiting example, in FIG. 13, at least one processor 512 may compare the received indicator with a threshold stored in memory 514. The threshold may be associated with real-time supply of energy to associated electrical energy sink 402.

Process 1500 includes a step 1506 of controlling a controllable switch based on the comparison, wherein the controllable switch is configured to alternately toggle between a first mode of operation and a second mode of operation, wherein in the first mode of operation, energy generated by the energy generator during operation at a sub-threshold level insufficient for real-time supply of energy to an associated electrical energy sink is stored in at least one energy storage component, and during the second mode of operation, energy generated by the energy generator during operation above the threshold level for real-time supply of energy to the associated electrical energy sink is provided to the associated energy sink via an energy converter, and wherein alternately toggling between the first mode of operation and the second mode of operation thereby permits energy generated at the sub-threshold level to be collected and intermittently used. By way of a non-limiting example, in FIG. 13, at least one processor 512 may control controllable switch 1314 based on the comparison. Controllable switch 1314 may alternately toggle between a first mode of operation and a second mode of operation. In the first mode of operation, energy generated by energy generator 406 during operation at a sub-threshold level insufficient for real-time supply of energy to associated electrical energy sink 402 (e.g. FIG. 4) may be stored in at least one energy storage component 1322. During the second mode of operation, energy generated by energy generator 406 during operation above the threshold level for real-time supply of energy to the associated electrical energy sink 402 may be provided to associated energy sink 402 via an energy converter (e.g., inverter 434). Alternately toggling between the first mode of operation and the second mode of operation may permit energy generated at the sub-threshold level to be collected and intermittently used.

Some electrical energy sinks (e.g., electrical grids and/or battery banks) and/or components (e.g., inverters) may require compliance with one or more standards and/or regulations. For example, an electrical grid and/or inverter connecter thereto may require electrical energy at 120V at 60 Hz or 24 V at 50 Hz. However, energy generators operating under inconsistent fluid flow may produce variable energy output that may fail to conform with a target output voltage level associated with an energy sink. Embodiments are disclosed to control an aggregate output voltage of a cluster of fluid turbines in order to achieve a consistent target voltage (a particular value or a value within a particular acceptable range of values), for example when operating under variable fluid conditions.

Systems, methods, and non-transitory computer readable media are disclosed for controlling an aggregated voltage for a cluster of fluid turbines. Such a control system may include at least one processor configured to: receive a target voltage level for the cluster of fluid turbines; receive via a plurality of rectifiers, each rectifier associated with a different fluid turbine in the cluster of fluid turbines, an indication of a DC voltage associated with each fluid turbine, wherein the DC voltage associated with at least one of the fluid turbines in the cluster is below the target voltage level; and based on the received indications of the DC voltage signals associated with each fluid turbine in the cluster, output a control signal to each of a plurality of DC-to-DC converters associated with the plurality of rectifiers, wherein each control signal is configured to regulate each DC-to-DC converter to produce a DC output signal at the target voltage level such that combining each DC output signal in parallel produces an aggregated DC voltage conforming to the target voltage level.

Some embodiments involve an aggregated voltage controller for a cluster of fluid turbines. A cluster of fluid turbines may be understood as described elsewhere in this disclosure. In some embodiments, the cluster of fluid turbines are wind turbines. For instance, a plurality of wind turbines, each associated with an energy generator, may convert wind (e.g., a flow of air) to electrical energy. In some embodiments, the cluster of fluid turbines are water turbines. For instance, a plurality of water turbines, each associated with an energy generator, may convert a river or ocean current (e.g., a flow of water) to electrical energy. Aggregated may include combined, accumulated, and/or added, e.g., to form a whole from several separate quantities. Aggregated voltage may refer to a voltage signal produced by combining and/or adding a plurality of voltage signals. Voltage signals may be combined in series and/or in parallel. Combining voltage signals in parallel may require that each signal conform to substantially the same voltage level. Combining voltage signals in parallel may thus require increasing and/or decreasing one or more individual voltage signals to reach a target voltage level (e.g., using one or more DC-DC converters, voltage regulators, and/or voltage boosters). A controller may include an electronic device configured to send and receive signals to and from a system for the purpose of monitoring, regulating, managing, and/or adjusting one or more operational parameters of a system. In some embodiments, a controller may include one or more feedback loops allowing to receive indications of system operational parameters, and output one or more control signals based on the received indications to cause adjustments to be made to the system operational parameters, e.g., in real time. For example, a controller may receive an indication of a voltage level, and use the indication to determine a signal for transmitting to a brake system for a fluid turbine to cause adjustment to the voltage level. An aggregated voltage controller for a cluster of fluid turbines includes circuitry for controlling voltages output from more than one fluid turbine. The structure and components included in such circuitry may vary depending on system design. For example, an aggregated voltage controller may include one or more processors, memory, detectors and/or sensors, brake circuits, switches, rectifiers, DC-DC converters, capacitors, inverters, batteries, and/or any other device and/or component that can be used as part of a control for aggregating voltage output of a cluster of fluid turbines. Some such controllers may omit components listed above or may add additional components to achieve the function of aggregated voltage control. For example, at least one processor may execute instructions for monitoring, regulating, managing, and/or adjusting one or more operational parameters affecting an aggregate voltage output of a cluster of fluid turbines. For instance, at least one processor may receive signals associated with operating parameters for a cluster of fluid turbines from one or more detectors, use received signals to determine control signals for adjusting one or more (e.g., same and/or different) operating parameters, and transmit control signals to circuitry associated with each fluid turbine.

By way of a non-limiting example, in FIG. 3, circuitry 310 may function as an aggregated voltage controller for cluster 300 of fluid turbines 100A-100C. By way of another non-limiting example, in FIG. 4, interconnecting circuitry 414 may function as an aggregated voltage controller for cluster 401 of geographically-associated fluid turbines 404 (e.g., fluid turbines 404A and 404B). In FIG. 1, fluid turbines 404 may include any of wind turbines 100, 102, and/or 106 to 112, and/or water turbine 104.

Some embodiments involve at least one processor configured to receive a target voltage level for the cluster of fluid turbines. At least one processor may be understood as described elsewhere in this disclosure. Receiving (e.g., receive) may be understood as described elsewhere in this disclosure. A target voltage level may include a desired and/or intended voltage level, e.g., configured to meet one or more objectives and/or purposes. For example, a target voltage level may be selected to conform with one or more standards and/or regulations associated with an electrical energy sink (e.g., an electrical grid, an inverter associated therewith, a battery bank, and/or an appliance). A target voltage level for a cluster of fluid turbines may therefore refer to a desired or intended power output for a cluster of fluid turbines. At least one processor may receive a target voltage level for a cluster of fluid turbines, for example, from memory. In some embodiments, at least one processor may receive a target voltage level from another processor, sensor, and/or device via a communications channel. In some embodiments, at least one centralized processor associated with an entire cluster of fluid turbines may receive a target voltage. In some embodiments, a plurality of processors, each processor dedicated to a different fluid turbine may receive a target voltage level for a cluster of fluid turbines. In some embodiments, a target voltage level may be constant over time (e.g., corresponding to a specification for an electrical grid that may remain unchanged). In some embodiments, a target voltage level may vary over time, e.g., based on supply and demand, on one or more specifications associated with one or more energy storage components, and/or any other criterion for determining a target voltage level.

In some embodiments, the target voltage level corresponds to a charging voltage level of an associated battery. A charging voltage level of an associated battery may include a voltage for applying to charge a battery, an amount of voltage supplied by a battery when a battery is fully (e.g., or nearly fully) charged, and/or an amount of voltage available from a charged (e.g., or partially charged) battery. In some instances, to shorten an amount of time for charging a battery, and/or to compensate for energy loss due to leakage and/or heat, a voltage higher than a battery capacity may be used to charge a battery. For example, a voltage of 13V may be used to charge a 12V battery to enable the charging reaction to proceed at a higher rate. In some embodiments, the target voltage level ranges between 14V and 15V. For example, 14-15V may be a typical voltage range used when charging a 12-V battery system, e.g., within a given timeframe and/or to compensate for loss. In some embodiments, the target output voltage level is a range that varies based on a threshold voltage of an associated inverter. A range may include a span, a spectrum, and/or a domain of values, e.g., delineated between an upper and/or lower bound. A range that varies may refer to a range having one or more adjustable or alterable bounds (e.g., upper and/or lower bounds), allowing the plurality of values encompassed by the range to change. A threshold may be understood as described elsewhere in this disclosure. A threshold voltage may refer to a baseline (e.g., a lower bound) voltage level above which current may begin flowing from a current source to a current drain, and/or a minimum voltage level for establishing a conducting path between a current source and a current drain. A threshold voltage for an inverter may refer to a baseline voltage level above which an inverter may operate. For instance, an inverter may fail to operate, or may operate sub-optimally (e.g., inefficiently) at voltage levels beneath a threshold voltage.

By way of a non-limiting example, in FIG. 7, at least one processor 428 may receive a target voltage level for cluster 401 of fluid turbines 404. For example, in FIG. 4, at least one processor 428 may receive the target voltage from memory 430 and/or from another device and/or processor via I/O 442. As another example, in FIG. 5, at least one processor 512 may receive a target voltage level for cluster 401 of fluid turbines 404A and 404B from memory 514, and may transmit a target voltage level to at least one processor 428 via I/O 516. In some embodiments, a target voltage level for cluster 401 of fluid turbines 404 may be associated with one or more regulations and/or standards associated with inverter 434. For instance, inverter 434 may convert aggregated DC power outputted by cluster 401 of fluid turbines 404 to AC power signal 722 for feeding to electrical grid 718, and a target voltage level may correspond to a voltage requirement associated with electrical grid 718. In some embodiments, at least one processor 428 may receive a target voltage for cluster 401 of fluid turbines 404A and 404B in association with battery bank 720. For example, such a target voltage may range between 14V and 15V, e.g., to comply with one or more regulations and/or standards associated with battery bank 720.

Some embodiments involve at least one processor configure to receive via a plurality of rectifiers, each rectifier associated with a different fluid turbine in the cluster of fluid turbines, an indication of a DC voltage associated with each fluid turbine. A rectifier may be understood as described elsewhere in this disclosure. A plurality of rectifiers each associated with a different fluid turbine in a cluster may include a rectifier dedicated to each fluid turbine in a cluster (e.g., via a dedicated high power transmission line or cable), such that a number of rectifiers corresponds to a number of fluid turbines. A plurality of rectifiers each associated with a different fluid turbine in a cluster may allow to independently convert each AC power output of each fluid turbine to a separate DC signal. For instance, variable fluid conditions may affect at least some fluid turbine in a cluster differently, causing at least some fluid turbines to produce different AC power output. Each rectifier may separately convert each AC power output to a DC signal, allowing to combine the DC signal to an aggregate DC power output for the cluster. In some embodiments, a centralized processor associated with an entire cluster of fluid turbines may receive. In some embodiments, a plurality of processors, each associated with.

A DC voltage associated with a fluid turbine may include an AC voltage produced by an energy generator associated with a fluid turbine and converted to a DC signal via an associated rectifier. An indication of a DC voltage may include a measurement and/or signal (e.g., an analog or digital signal) associated with a DC voltage. An indication of a DC voltage may include, for example, one or more of an on/off signal signifying existence/non-existence of a DC voltage, an (e.g., numerical) measurement indicating a level of a DC voltage, an (e.g., yes/no) signal indicating if a DC voltage meets one or more baselines, thresholds, and/or operating ranges, and/or any other signal conveying information associated with a DC voltage. In some embodiments, a DC voltage associated with a fluid turbine may include a statistical measure of a DC voltage over a time period, for example, a mode, a maximum, and/or a minimum DC voltage over at time period. At least one processor may receive one or more indications of a DC voltage associated with a fluid turbine, for example, from a sensor associated with an output of a rectifier associated therewith (e.g., via a wired and/or wireless communications channel). In some embodiments, at least one processor may receive multiple DC voltage measurements from a sensor associated with a fluid turbine over a time period (e.g., at least 10 seconds, at least 1 minute, at least 5 minutes, or any other time period). The at least one processor may compute one or more statistical measures based on received DC voltage measurements to determine an indication of DC voltage associated with a fluid turbine. In some embodiments, at least one centralized processor associated with an entire cluster of fluid turbines may receive indications of DC voltage associated with at least some fluid turbines in a cluster. In some embodiments, at least one centralized processor associated with an entire cluster of fluid turbines may receive an indication of DC voltage associated with each fluid turbine in a cluster. In some embodiments, a plurality of processors, each processor dedicated to a different fluid turbine may receive an indication of DC voltage from a different fluid turbine.

In some embodiments, the DC voltage associated with at least one of the fluid turbines in the cluster is below the target voltage level. A DC voltage below a target voltage level may refer to a DC voltage that is less than an intended or desired voltage level and/or a DC voltage that is outside an acceptable voltage range (e.g., less than a target voltage level and an associated tolerance). In some embodiments, below a target voltage level may include below a target voltage for a minimal time duration (e.g., at least 30 seconds, at least 1 minute, at least 10 minutes, or at least any other time period). For example, when operating under low fluid speed conditions, an energy generator associated with a fluid turbine may generate a voltage output (e.g., a DC signal converted from an AC power output) insufficient to meet a target voltage level. The at least on processor may compare a target voltage level with each received indication of DC voltage to identify any indications of DC voltage below the target voltage level. Comparing a target voltage level with a received indication of DC voltage may include performing one or more subtraction and/or division operations, e.g., to determine a difference and/or ratio therebetween. In some embodiments, at least one processor may determine that at least some fluid turbines in a cluster of turbines may be associated with a DC voltage below a target voltage level. In some embodiments, at least one processor may determine that each fluid turbine in a cluster of fluid turbines may be associated with a DC voltage below a target voltage level, for instance, when an entire cluster of fluid turbines may operate under low fluid flow conditions.

In some embodiments, the at least one of the fluid turbines in the cluster with the DC voltage below the target level includes all of the fluid turbines in the cluster. All of the fluid turbines in a cluster may include each (e.g., every) fluid turbine in a cluster or a sub-cluster (e.g., including some fluid turbines in a cluster). For example, low fluid velocity conditions may affect an entire cluster of fluid turbines such that each fluid turbine in the cluster or in a sub-cluster may produce a DC voltage below a target level.

By way of a non-limiting example, in FIG. 7, at least one processor 428 may receive via each rectifier 530 included in each charge controller 410 an indication of DC voltage associated with each of fluid turbines 404 (e.g., see in FIG. 4, DC signals 412A and 412B flowing from charge controllers 410A and 410B to circuitry 414). For instance, each of charge controllers 410A and 410B may be associated with circuit 1300 (see FIG. 13) including rectifier 530, voltage sensor 1310, and at least one processor 512. For each fluid turbine 404 included in cluster 401, each rectifier 530 may receive AC power output 408 produced by generator 406 associated with fluid turbine 404. Each rectifier 530 may convert AC power output 408 to a DC signal. Voltage sensor 1310 may sense the DC signal and transmit an indication of DC voltage to at least one processor 512. In some embodiments, each processor 512 dedicated to each fluid turbine 404 may transmit indications of DC voltage for each fluid turbine 404 to at least one processor 428 via I/O 516, allowing at least one processor 428 to receive indications of DC voltage for each fluid turbine 404 in cluster 401.

Some embodiments involve, at least one processor configured to, based on the received indications of the DC voltage signals associated with each fluid turbine in the cluster, output a control signal to each of a plurality of DC-DC converters associated with the plurality of rectifiers. A DC-DC converter and a rectifier may be understood as described elsewhere in this disclosure. A DC-DC converter associated with a rectifier may include a DC-DC converter in electrical communication with a DC output of a rectifier and configured to receive a DC signal from the rectifier, convert the DC signal from a first DC voltage level to a second DC voltage level, and output a DC signal at the second voltage level. For instance, a DC-DC converter may operate as a voltage booster and raise a DC output of a rectifier from a sub-target voltage level (e.g., due to low fluid speed) to a target voltage level and/or to a target voltage level and an associated tolerance. Alternatively, a DC-DC converter may reduce a DC output of a rectifier from an above-target voltage level (e.g., due to high fluid speed) to a target voltage level and/or to a target voltage level and an associated tolerance. In some embodiments, a DC-DC converter may be configured to receive a variable DC voltage signal and boost the variable DC voltage signal by a fixed voltage level such that an output of the DC-DC converter may be a variable boosted DC signal. In some embodiments, a DC-DC converter may be configured to receive a variable DC voltage signal and boost the variable DC voltage signal by a variable voltage level such that an output of the DC-DC converter may be a fixed boosted DC signal (e.g., corresponding to a target voltage level). In some embodiments, each DC-to-DC converter includes at least one of a voltage booster, or a voltage regulator. A voltage booster (e.g. a step-up converter) may include a DC to DC converter having an output voltage greater than an input (e.g., source) voltage. Since power must be conserved, an output current of a voltage booster may be lower an input (source) current. A voltage regulator may include a device configured to ensure a steady (e.g. substantially constant) voltage supply under varying operating conditions. A voltage regulator may regulate voltage during fluctuations in power generation (e.g., due to varying fluid speeds) and/or varying loads connected thereto. To ensure conservation of power, adjustments to voltage may cause corresponding adjustments to current.

A control signal may include an (e.g., analog and/or digital) signal configured to cause an electronic component and/or device to operate in a particular manner. A control signal may activate or deactivate (e.g., turn on/off) an electronic component and/or device, and/or cause an electronic component or device to operate according to one of multiple modes of operation. For instance, a control signal may operate a switch to select a specific DC-DC converter from multiple DC-DC converters, cause a specific DC-DC converter to raise (e.g., boost) or reduce (e.g., buck) a DC signal, and/or control an amount of DC voltage raised or reduced by a specific DC-DC converter. Outputting (e.g., output) may include sending, transmitting, and/or providing, e.g., a signal generated based on one or more calculations. Outputting a control signal to each of a plurality of DC-DC converters (e.g., based on received indications of DC voltage signals associated with each fluid turbine) may include calculating a particular control signal for each DC-to-DC converter based on an indication of a DC voltage associated therewith, and/or transmitting a particular control signal to each DC-DC converter via a separate communications channel. In some embodiments, at least one processor may output the same control signal to each DC-DC converter. In some embodiments, at least one processor may transmit the same control signal to at least some of the plurality of DC-DC converters. In some embodiments, at least one processor may transmit a different control signal to each DC-DC converter. In some embodiments, outputting a control signal to each DC-DC converter may involve at least one processor outputting a control signal to each of a plurality of switches, each switch configured to divert a DC signal outputted by a rectifier associated with a particular fluid turbine to a particular DC-DC converter of multiple associated DC-DC converters. For instance, each fluid turbine may be associated with a plurality of DC-DC converters, each DC-DC converter being associated with a different mode of operation.

By way of a non-limiting example, in FIG. 7, based on the received indications of the DC voltage signals associated with each fluid turbine 404 in cluster 401, at least one processor 428 may output a control signal to at least one of DC-DC converters 1316 and 1318 (see FIG. 13) included in each charge controller 410. In some embodiments, at least one of DC-DC converters 1316 and 1318 may include a voltage booster (e.g., voltage booster 714) and/or a voltage regulator.

In some embodiments, each control signal is configured to regulate each DC-DC converter to produce a DC output signal at the target voltage level such that combining each DC output signal in parallel produces an aggregated DC voltage conforming to the target voltage level. To regulate may include to control, modify, and/or normalize (e.g., a signal) in order to conform with one or more standards and/or regulations. A DC-DC converter may be regulated using, for example, a digitally controlled voltage source (e.g., a digital-to-analog converter or DAC), a digitally adjustable resistor (e.g., a potentiometer), and/or by using Pulse-width modulation (PWM) to adjust a duty cycle of a voltage signal to change an average output signal. To produce may include to generate, supply, and/or output. A control signal configured to regulate a DC-DC converter to produce a DC output signal at a target voltage level may include a control signal configured to adjust and/or modify an output voltage of a DC-DC converter to produce a DC signal at a voltage level substantially meeting a target voltage level and/or substantially meeting a target voltage level and an associated tolerance. Adjusting and/or modifying an output voltage of a DC-DC converter may cause associated adjustments and/or modifications to a current flow corresponding to each output voltage. Combining (e.g., signals) may include aggregating, adding, merging, and/or integrating. Combining DC output signals in parallel may involve transmitting multiple individual DC signals concurrently via multiple electrically common wires at a substantially equal voltage potential (e.g., a target voltage level), and merging the electrically common wires to produce an aggregated DC signal from the individual DC signals. Such an aggregated DC signal may have a voltage level corresponding to the shared voltage potential across the electrically common wires, and a current corresponding to a sum of the current flowing in each of the electrically common wires. Conforming may include complying with, according with, and/or accommodating. An aggregate DC voltage conforming to a target voltage level may include a DC voltage signal produced by combining multiple DC voltage signals in parallel, each DC voltage being substantially at a target voltage level, such that a combination of the DC voltage signals substantially matches a target DC voltage level. In some embodiments, an aggregate DC voltage conforming to a target voltage may include a statistical measure (e.g., a mode, an average, a maximum, and/or a minimum) of an aggregate DC voltage conforming to a target voltage over a time period (e.g., at least 10 seconds, at least 1 minute, at least 5 minutes, or any other time period).

In some embodiments, each fluid turbine in a cluster of fluid turbines may produce an AC power output. Each rectifier associated with each fluid turbine may convert one of the AC power outputs to a DC signal. Each DC-DC converter may modify each DC signal to cause conformance with a target voltage level, to allow aggregating each DC signal in parallel. The at least one processor may regulate each DC-DC converter over time to ensure a steady DC output even when the cluster of fluid turbines operates under varying fluid conditions.

In some embodiments, the regulated aggregate DC voltage conforms to the target voltage level by exceeding a threshold. Exceeding a threshold may refer to surpassing and/or overreaching a threshold, e.g., by preventing falling below a threshold. In some embodiments, a threshold may correspond to a minimal voltage level required to achieve a target voltage level. The minimal voltage level may be determined based on a margin or gap above a target voltage level, e.g., to compensate for energy loss (e.g., a drop in voltage) due to heat, voltage leakage, and/or any other cause of energy loss. A regulated aggregate DC voltage exceeding a threshold (e.g., at the minimal voltage required to achieve the target voltage level) may thus conform to a target voltage level after accounting for energy loss, voltage leakage, or other losses. In some embodiments, exceeding a threshold may include exceeding a threshold for a minimal time duration (e.g., at least 10 seconds, at least 1 minute, at least 5 minutes, or any other time period). In some embodiments, a regulated aggregate DC voltage exceeding a threshold may include a statistical measure associated with an aggregated DC voltage (e.g., a mode, an average, a running average, a maximum, and/or a minimum) exceeding a threshold over a time period.

In some embodiments, the regulated aggregate DC voltage conforms to the target voltage level by remaining below a threshold. Remaining below a threshold may refer to limited and/or contained by a threshold, e.g., by preventing a threshold from being surpassed. In some embodiments, a threshold may correspond to a maximum voltage for achieving a target threshold. For example, threshold may be associated with one or more safety regulations, e.g., to prevent overheating, or from reaching a gassing voltage for a battery associated with undesirable chemical reactions. A regulated aggregate DC voltage remaining below a threshold may thus allow conforming to a target voltage level in compliance with one or more safety regulations. In some embodiments, a target voltage level may be associated with a voltage range including a minimal threshold and a maximal threshold. For instance an inverter, a battery, and/or an electrical grid may be associated with a voltage cap or ceiling. At least one processor may output control signals to a plurality of DC-DC converters to cause an aggregate DC voltage to remain within a range, e.g., to remain above a minimal threshold and below a maximal threshold. In some embodiments, remaining below a threshold may include remaining below a threshold for a minimal time duration (e.g., at least 10 seconds, at least 1 minute, at least 5 minutes, or any other time period). In some embodiments, a regulated aggregate DC voltage remaining below a threshold may include a statistical measure associated with an aggregated DC voltage (e.g., a mode, an average, a running average, a maximum, and/or a minimum) remaining below a threshold over a time period.

In some embodiments, the regulated aggregate DC voltage conforms to the target voltage level by remaining within a predefined range of the target output voltage level over time. Remaining within a predefined range of a target output voltage level may refer to remaining inside both upper and lower bound thresholds associated with a target output voltage level, such as not to exceed an upper bound while not falling below a lower bound. Remaining within a predefined range of a target output voltage level over time may include one or more of preventing a maximum voltage over a time period from exceeding an upper bound of a range associated with a target output voltage, preventing a minimum voltage over a time period from falling beneath a lower bound of a range associated with a target output voltage, and/or preventing an average and/or mode of a voltage level over a time period from exceeding an upper bound and/or from falling below a lower bound of a range associated with a target output voltage. In some embodiments, remaining within a predefined range may include remaining within a predefined range for a minimal time duration (e.g., at least 10 seconds, at least 1 minute, at least 5 minutes, or any other time period). In some embodiments, a regulated aggregate DC voltage remaining within a predefined range may include a statistical measure associated with an aggregated DC voltage (e.g., a mode, an average, a running average, a maximum, and/or a minimum) remaining below a threshold over a time period.

By way of a non-limiting example, in FIG. 7, each DC-DC converter 1316 and/or 1318 (see FIG. 13) included in each charge controller 410 may produce a DC output signal at a target voltage level such that combining each DC output signal in parallel (e.g., see parallel outputs from each charge controller 410 converging at inverter 434) produces an aggregated DC voltage conforming to the target voltage level. In some embodiments, the regulated aggregate DC voltage may conform to the target voltage level by exceeding a threshold. In some embodiments, the regulated aggregate DC voltage may conform to the target voltage level by remaining below a threshold. In some embodiments, the regulated aggregate DC voltage may conform to the target voltage level by remaining within a predefined range of the target output voltage level over time.

Some embodiments involve a non-transitory computer readable medium containing instructions that when executed by at least one processor cause the at least one processor to perform operations for controlling aggregated voltage for a cluster of fluid turbines. The operations may include receiving a target voltage level for the cluster of fluid turbines;

receiving via a plurality of rectifiers, each rectifier associated with a different fluid turbine in the cluster of fluid turbines, an indication of a DC voltage associated with each fluid turbine, wherein the DC voltage associated with at least one of the fluid turbines in the cluster is below the target voltage level; and based on the received indications of the DC voltage signals associated with each fluid turbine in the cluster, output a control signal to each of a plurality of DC-DC converters associated with the plurality of rectifiers, wherein each control signal is configured to regulate each DC-DC converter to produce a DC output signal at the target voltage level such that combining each DC output signal in parallel produces an aggregate DC voltage conforming to the target voltage level.

Figure 16:
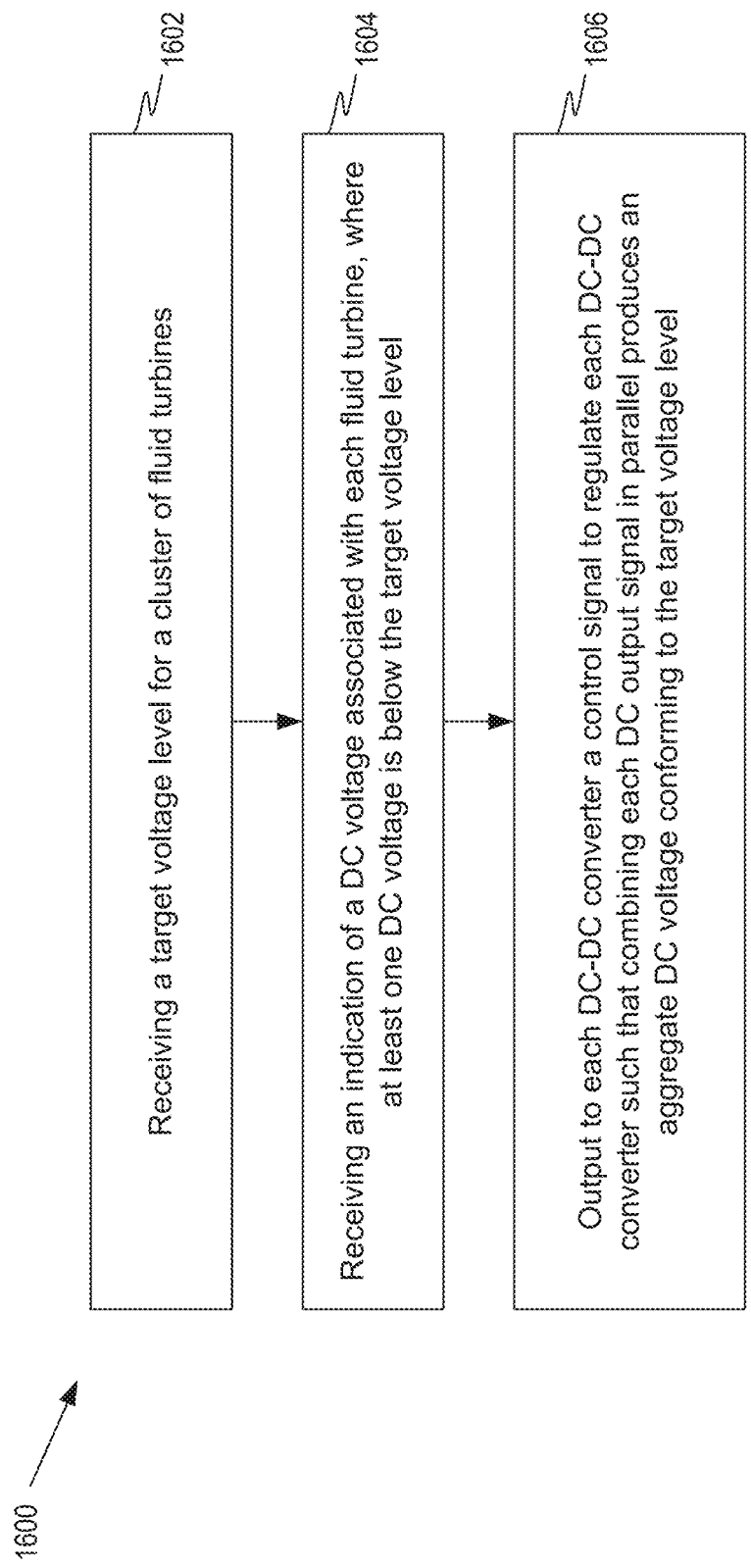
FIG. 16 illustrates a flow diagram of an exemplary process for controlling aggregated voltage for a cluster of fluid turbines, consistent with embodiments of the present disclosure.

FIG. 16 illustrates a flowchart of an exemplary process 1600 for coordinated braking of a plurality of geographically-associated associated fluid turbines, consistent with embodiments of the present disclosure. In some embodiments, process 1600 may be performed by at least one processor (e.g., processor 428 and/or processor 512) to perform operations or functions described herein. In some embodiments, some aspects of process 1600 may be implemented as software (e.g., program codes or instructions) that are stored in a memory (e.g., memory 430 and/or memory 514) or a non-transitory computer readable medium. In some embodiments, some aspects of process 1600 may be implemented as hardware (e.g., a specific-purpose circuit). In some embodiments, process 1600 may be implemented as a combination of software and hardware.

Referring to FIG. 16, process 1600 includes a step 1602 of receiving a target voltage level for the cluster of fluid turbines. By way of a non-limiting example, in FIG. 7, at least one processor 428 may receive a target voltage level for cluster 401 of fluid turbines 404. For example, at least one processor 428 may receive a target voltage from memory 430 (see FIG. 4) and/or from a device and/or processor associated with electrical grid 718.

Process 1600 includes a step 1604 of receiving via a plurality of rectifiers, each rectifier associated with a different fluid turbine in the cluster of fluid turbines, an indication of a DC voltage associated with each fluid turbine. The DC voltage associated with at least one of the fluid turbines in the cluster is below the target voltage level. By way of a non-limiting example, in FIG. 7, at least one processor 428 may receive via plurality of rectifiers 530, each rectifier 530 associated with a different fluid turbine 404 in cluster 401 of fluid turbines, an indication of a DC voltage (e.g. see in FIG. 4, DC signals 412A and 412B) associated with each fluid turbine 404. At least one of the DC voltages associated with one of fluid turbines 404 in cluster 401 may be below a target voltage level.

Process 1600 includes a step 1606 of based on the received indications of the DC voltage signals associated with each fluid turbine in the cluster, output a control signal to each of a plurality of DC-DC converters associated with the plurality of rectifiers, wherein each control signal is configured to regulate each DC-DC converter to produce a DC output signal at the target voltage level such that combining each DC output signal in parallel produces an aggregate DC voltage conforming to the target voltage level. By way of a non-limiting example, in FIG. 7, based on the received indications of DC voltage signals associated with each fluid turbine 404 in cluster 401, at least one processor 428 may output a control signal to each charge controller 410. Each charge controller 410 may include DC-DC converters 1316 and 1318 (e.g., see FIG. 13). For instance, a control signal may be configured to select one of DC-DC converters 1316 or 1318 via controllable switch 1314 and regulate the selected DC-DC converter to produce a DC output signal at a target output voltage level. Combining each DC output signal in parallel may produce an aggregate DC voltage conforming to a target voltage level. For instance, the target voltage may correspond to an operating voltage for inverter 434, and may allow converting the aggregate DC voltage to an AC power output suitable for feeding to electrical grid 718.

At low wind speed, electrical energy generated by a cluster fluid turbine may fail to conform to electrical grid power standards. An inverter associated with at least one processor (e.g., a smart inverter) may prevent power that fails to conform to electrical grid standards from entering an electrical grid. Instead, the at least one processor may redirect the power for storage in a battery in an off-grid mode. In some instances, a smart inverter may manage and control power produced by a cluster of fluid turbines. For example, a smart inverter may control a load on a plurality of turbines via a plurality of associated charge controllers. Controlling a load may cause power generated by the plurality of fluid turbines to conform to electrical grid power standards.

Some embodiments involve an inverter for communicating power from a cluster of fluid turbines to an electrical grid. An inverter, power, a cluster of fluid turbines, and an electrical grid may be understood as described elsewhere in this disclosure. Communicating may include delivering, supplying, and/or transmitting. An inverter communicating power from a cluster of fluid turbines to an electrical grid may include an inverter configured to receive an aggregated DC voltage associated with a cluster of fluid turbines, convert an aggregated DC voltage to a grid-compatible AC voltage, and deliver a grid-compatible AC voltage to an electrical grid.

By way of a non-limiting example, in FIG. 7, inverter 434 may communicate power generated by cluster 401 of fluid turbines 404 to electrical grid 718. For example, each of charge controllers 410 associated with each fluid turbine 404 may include a rectifier 530. Each rectifier 530 may convert AC power outputs 408 to DC power signals (see DC signals 412A and 412B in FIG. 4). Inverter 434 may convert the DC power signals to AC power signal 722 for communicating to electrical grid 718.

Some embodiments involve circuitry configured to receive via a rectifier associated with each fluid turbine in the cluster of fluid turbines, a DC voltage such that a plurality of DC voltages from differing fluid turbines are received and aggregated. Circuitry, a rectifier, a fluid turbine, a cluster of fluid turbines, and a DC voltage may be understood as described elsewhere in this disclosure. Differing fluid turbines may refer to individual fluid turbines, each operating separately to generate electrical energy from a fluid flow. In some embodiments, circuitry may be associated with one or more charge controllers (e.g., which may be understood as described elsewhere in this disclosure). In some embodiments, circuitry may include separate circuitry dedicated to each differing fluid turbine in a cluster of fluid turbines (e.g., each dedicated circuitry may include a dedicated charge controller). In some embodiments, circuitry may include circuitry associated with a cluster (or sub-cluster) of fluid turbines (e.g., circuitry may include a single charge controller associated with at least some fluid turbine in a cluster of fluid turbines). In some embodiments, circuitry may include circuitry dedicated to each differing individual fluid turbine in a cluster of fluid turbines and circuitry associated with every fluid turbine in the cluster of fluid turbines. A rectifier associated with each fluid turbine in a cluster of fluid turbines may include multiple rectifiers, each rectifier dedicated to a different fluid turbine in a cluster of fluid turbines, permitting each AC voltage produced by each fluid turbine in the cluster of fluid turbines to be converted to a DC voltage independently and simultaneously (e.g., in parallel).

Receiving DC voltages may include obtaining, accepting delivery of, or otherwise acquiring DC voltages. A plurality of DC voltages from differing fluid turbines may include a separate DC voltage produced (e.g., simultaneously) by each fluid turbine in a cluster of fluid turbines (e.g., via an associated rectifier) in response to exposure to a fluid flow. Aggregated DC voltages may include DC voltages that are combined, accumulated, and/or added together, e.g., to form a whole from several separate quantities. Circuitry configured to receive via a rectifier associated with each fluid turbine in a cluster of fluid turbines, a DC voltage may include circuitry electrically connected to multiple rectifiers, each rectifier associated with a different fluid turbine in a cluster of fluid turbines, allowing the circuitry to receive multiple DC voltage signals, e.g., simultaneously and/or in parallel. A plurality of DC voltages from differing fluid turbines are received and aggregated may refer to circuitry configured to combine or add each DC voltage produced by each fluid turbine in the cluster of fluid turbines to produce a net or total DC voltage. In some embodiments, circuitry may receive a plurality of DC voltages in parallel, (e.g., each DC voltage may conform to a common DC voltage associated with each rectifier), such that combining a plurality of DC voltages produces an aggregate voltage at a common DC voltage and having a current corresponding to a sum of the current for each DC voltage of the plurality of DC voltages.

By way of a non-limiting example, in FIG. 4, interconnecting circuitry 414 may receive DC signals 412A and 412B via rectifier 530 (e.g., see FIG. 5) included in each of charge controllers 410A and 410B associated with each fluid turbine 404A and 404B in cluster 401 of fluid turbines, respectively. Interconnecting circuitry 414 may receive and aggregate a plurality of DC signals 412A and 412B from differing fluid turbines 404A and 404B. By way of another non-limiting example, in FIGS. 7, 9-11, circuits 700, 900, 1000, and 1100 may aggregate a plurality of DC signals 412 outputted by plurality of rectifiers 530 to an aggregated DC voltage 726. Each of rectifiers 530 may be associated with a different fluid turbine 404 in cluster 401 of fluid turbines.

Some embodiments involve at least one processor configured to: confirm that a connection to the electrical grid conforms with at least one predetermined operating parameter. At least one processor may be understood as described elsewhere in this disclosure. In some embodiments, at least one processor may be associated with a charge controller. A connection to an electrical grid may include a portion of an electrical circuit allowing an AC signal to merge with an AC signal of an electrical grid. A connection to an electrical grid may include one or more devices (e.g., at least one of a processor, a switch, an inverter, a voltage boosters, a load, a battery, a brake detection circuit, a voltage boost circuit, a shunt resistor, a capacitor, an inductor, a rated contact) and/or one or more electrically conductive channels (e.g., at least one wire and/or cable) configured to convey a flow of electrical energy from a source of electrical energy (e.g., a cluster of fluid turbines) to an electrical grid. In some embodiments, an inverter may include a connection to an electrical grid. Predetermined may refer to defined and/or established in advance. A predetermined operating parameter may include a variable, property, and/or setting established in advance and associated with providing electrical energy to an electrical grid. In some instances, an operating parameter may be associated with one or more operating parameters of a fluid turbine (e.g., a fluid flow speed, a rotor speed, a blade tip speed, a blade pitch, blade yaw, blade wobble and/or vibration, shaft wobble and/or vibration, power output, generator temperature, and/or a load) affecting an AC signal generated by the fluid turbine for feeding to an electrical grid. For instance, varying fluid conditions may cause a fluid turbine to generate an inconsistent AC signal that may lack compliance with one or more operating parameters associated with providing electrical energy to an electrical grid. In some embodiments, a predetermined operating parameter may be associated with a power signal flowing in an electrical grid. In some embodiments, a predetermined parameter may include operating parameters for an inverter configured to provide AC power to an electrical grid. Conforming (e.g. conformity) may include complying with, according with, and/or accommodating. Confirming (e.g., confirm) may include verifying, establishing, and/or validating. For instance, prior to allowing electrical energy to flow to an electrical grid via a connection, at least one processor may verify and/or determine that the connection to the electrical grid complies with at least one operating parameter, e.g., with a voltage and/or current rating of an electrical grid and/or an associated inverter.

Impedance may refer to an opposition of an AC signal resulting from a combined effect of resistance and reactance (e.g., including capacitance and/or inductance). Impedance may include magnitude and phase attributes. Failing to match impedances in AC circuits may lead to loss in power transfer and or signal reflection. In some instances, to maximize power transfer and/or minimize energy loss due to interference and/or signal reflection, it may be necessary to match impedance of circuitry associated with an AC voltage produced by a cluster of fluid turbines and an impedance of an electrical grid. Such matching may be required to occur at a connection between circuitry associated with a cluster of fluid turbines and an electrical grid. Matching impedance may include conjugate matching (e.g., matching an output impedance of a source to a complex conjugate of an input impedance of an electrical grid) and/or reflectionless matching (e.g., matching a source impedance with an impedance of an electrical grid). Thus, in some embodiments, confirming conformance with at least one operating parameter may include matching an impedance of a circuit associated with a cluster of fluid turbines with an impedance of an electrical grid.

In some embodiments, the at least one predetermined operating parameter is associated with a grid frequency. A grid frequency may refer to a number of cycles per time unit (e.g., per second) of an AC signal flowing through an electrical grid. In some embodiments, a grid frequency may correspond to 60 Hz or 50 Hz. Introducing an AC voltage having a frequency that does not match a frequency associated with an electrical grid (e.g., having a frequency other than 60 Hz or 50 Hz) may cause a mismatch in impedance between circuitry associated with the cluster of fluid turbines and an electrical grid, leading to energy loss. For example, mismatched frequency may lead to destructive interference between an AC voltage produced by a cluster of fluid turbines and an AC voltage associated with an electrical grid. The at least one processor may confirm that a connection to an electrical grid conforms with a grid frequency, e.g., to prevent energy loss due to non-matching AC frequencies.

In some embodiments, the at least one predetermined operating parameter is associated with a grid phase. A grid phase may refer to a particular stage or position within a cycle of an AC voltage of an electrical grid, e.g., at a point in time, and may be measured as an angle, e.g., in units of degrees, radians, minutes, and/or seconds. For example, halfway into a cycle may correspond to a 180° phase, and a quarter of a cycle may correspond to a 90° phase. A grid phase may indicate when an AC voltage may reach a peak or trough. Introducing an AC voltage produced by a cluster of fluid turbines having a phase that does not match a phase associated with an electrical grid may cause a mismatch in impedance between circuitry associated with the cluster of fluid turbines and an electrical grid, leading to energy loss. For example, combining two AC signals having a mismatched phase may result in destructive interference (e.g., leading to cancellation due to a signal peak coinciding with a signal trough). The at least one processor may confirm that a connection to an electrical grid conforms with a grid phase, e.g., to prevent energy loss due to a mismatched phase.

In some embodiments, the at least one predetermined operating parameter is associated with a grid voltage. A voltage may be understood as described elsewhere in this disclosure. A grid voltage may refer to a voltage associated with an electrical grid. In some embodiments, a grid voltage may correspond to 110V, 220V, or 240V. Introducing an AC voltage produced by a cluster of fluid turbines having a voltage that does not match a voltage associated with an electrical grid may cause a mismatch in impedance between circuitry associated with the cluster of fluid turbines and an electrical grid, leading to signal reflection which may lead to energy loss. The at least one processor may confirm that a connection to an electrical grid conforms with a grid voltage, e.g., to prevent energy loss due to signal reflection. In some embodiments, a grid voltage may correspond to an operating range of an associated inverter, and conformity of an electrical grid connection with at least one predetermined operating parameter may ensure that a voltage level of an aggregate DC voltage falls inside an operating range of an inverter.

By way of a non-limiting example, in FIG. 7, inverter 434 may include a connection to electrical grid 718 allowing electrical energy to flow from generators 406, through circuit 700 to electrical grid 718. At least one processor 428 may confirm that the connection to electrical grid 718 via inverter 434 conforms with at least one predetermined operating parameter. For example, in FIG. 14, the at least one predetermined operator may be associated with a grid voltage (e.g., see y-axis 1402), a grid frequency (e.g., see cycles per time unit along x-axis 1404), and/or a grid phase (e.g., see time gap 1406 to cycle peak, indicating a phase).

Some embodiments involve, when conformity of the electrical grid connection with the at least one predetermined operating parameter is confirmed, at least one processor configured to enable inversion of the aggregated DC voltage to an AC voltage compatible with the electrical grid and enable output of the AC voltage to the electrical grid. Confirming conformity of an electrical grid connection with at least one predetermined operating parameter may involve at least one processor receiving one or more indications associated with an AC signal produced by a plurality of fluid turbines, comparing received indications with one or more attributes associated with an electrical grid, and determining conformity based on the comparison. For example, the at least one processor may use one or more received indications to compute an impedance associated with an AC signal for feeding to an electrical grid and compare the computed impedance with an impedance associated with an electrical grid. If the computed impedance matches a grid impedance, the at least one processor may confirm conformity of an electrical grid connection and at least one operating parameter. As another example, the at least one processor may use one or more received indications associated with an AC signal produced by a cluster of fluid turbines to confirm conformity with one or more safety regulations associated with an electrical grid (e.g., a current and/or voltage limit). As a further example, at least one processor may determine that an AC signal produced by a cluster of fluid turbines conforms with an operating range of an inverter to confirm performance with at least one predetermined operating parameter.

An aggregated DC voltage may include a combination of a plurality of DC voltages, each DC voltage produced by a differing fluid turbine of a cluster of fluid turbines. DC voltages may be aggregated in series (e.g., where each voltage may be summed and current may remain constant) or in parallel (e.g., where the voltage may be common to all the signals and current may be summed). Compatible may include suitable, matching, and/or coherent. An AC voltage compatible with an AC voltage of an electrical grid may include an AC voltage conforming with one or more standards and/or regulations associated with the electrical grid. Such standards and/or regulations may include, for example, ensuring impedance matching between an AC voltage and an electrical grid (e.g. to prevent loss due to interference and/or reflection), ensuring compliance with one or more safety regulations, and/or ensuring compliance with an operating range of an inverter (e.g., to prevent energy loss). To enable (e.g., enabling) may include to allow or permit. Enabling inversion of an aggregated DC voltage to an AC voltage compatible with an electrical grid may include establishing a connection between an aggregate DC voltage produced by a cluster of fluid turbines and a DC input of an inverter, thereby allowing an inverter to convert an aggregate DC input voltage to produce an AC output voltage. Enabling output of an AC voltage to an electrical grid may involve allowing electrical energy to flow from an AC output of an inverter associated with a cluster of fluid turbines and an electrical grid (e.g., by establishing an electric circuit between a source and a sink for an AC signal). For example, in response to confirming conformity of an electrical grid connection with at least one predetermined operating parameter, the at least one processor may operate a switch to establish a connection between an aggregate DC voltage produced by a cluster of fluid turbines and a DC input of an inverter. The inverter may include an AC output connected to an electrical grid such that operating the switch may complete a circuit enabling a flow of electrical energy through the inverter to the electrical grid. Completing a circuit may thus allow the inverter to convert the aggregate DC voltage to an AC output, which may be fed to the electrical grid.

By way of a non-limiting example, in FIG. 7, at least one processor 428 may confirm conformity of the connection to electrical grid 718 via inverter 434 with at least one predetermined operating parameter (e.g., a voltage and current rating, and a phase of electrical grid 718). At least one processor 428 may enable inversion of aggregate DC voltage 726 to AC power signal 722. For example, at least one processor 428 may operate a plurality of switches 1314 (e.g., see FIG. 13). Each switch 1314 may be associated with a different rectifier 530, and may allow establishing an electrical connection between each rectifier 530 and inverter 434 (e.g., via DC-DC converter 1318). At least one processor 428 may operate plurality of switches 1314 to establish a plurality of electrical connections between each rectifier 530 and inverter 434, causing each DC signal 412 outputted by each rectifier 530 to flow towards inverter 434 (e.g., via DC-DC converter 1318) and merge (e.g., in parallel) to become aggregated DC voltage 726. Aggregated DC voltage 726 may flow to a DC input of inverter 434, which may convert aggregated DC voltage 726 to AC power signal 722 (e.g., a voltage) compatible with electrical grid 718.

Some embodiments involve, when conformity of the electrical grid connection with the at least one predetermined operating parameter is not confirmed, preventing output of the AC voltage to the electrical grid. Failing to confirm conformity of an electrical grid connection with at least one predetermined operating parameter may involve at least one processor determining a mismatch between an impedance associated with an AC signal produced by a cluster of fluid turbines and an impedance of an electrical grid, a lack of conformity of an AC signal with one or more safety regulations associated with an electrical grid, and/or a lack of conformity of an AC signal with an operating range of an inverter. Preventing may include blocking, averting, thwarting, and/or intercepting. Preventing output of an AC voltage to an electrical grid may involve blocking a DC voltage from being converted to an AC voltage for feeding to an electrical grid and/or diverting an AC voltage away from an electrical grid. For example, at least one processor may operate a switch to divert a DC signal away from a DC input of an inverter, and/or to divert an AC voltage outputted by an inverter to an electrical energy sink other than an electrical grid (e.g., to a dump load, an appliance, and/or any other sink for AC voltage).

In some embodiments, preventing output of the AC voltage to the grid includes preventing conversion of the aggregate DC voltage to the AC voltage. As mentioned, earlier, the term "preventing" may include thwarting, hindering, and/or blocking. Thus, preventing conversion of the aggregate DC voltage to the AC voltage may include severing a connection between an aggregate DC voltage and an input of an inverter and/or diverting an aggregate DC voltage to an electrical power sink other than an inverter connected to an electrical grid. For example, in response to determining a lack of conformity of an electrical grid connection with at least one predetermined operating parameter, at least one processor may prevent conversion of an aggregate DC voltage to an AC voltage by operating a switch to disconnect an aggregate DC voltage produced by a cluster of fluid turbines from a DC input of an inverter. In some embodiments, operating the switch thus may cause an aggregate DC voltage to be directed to an energy storage component, e.g., a battery bank.

In some embodiments, when conformity of the grid connection is unconfirmed the at least one processor is further configured to enable energy storage in an off-grid mode. To enable energy storage may refer to allowing capturing of energy produced during a first time period for use during a subsequent time period. Such energy may be stored in a DC mode in an energy storage component (e.g., a capacitor or battery). An off-grid mode may refer to an operation and/or functionality of a system that may be independent and/or separate from an electrical grid. For example, in an off-grid mode, energy generated by a cluster of fluid turbines may be delivered to an energy sink other than an electrical grid. Energy storage in an off-grid mode may include accumulating DC energy in one or more energy storage components (e.g., one or more batteries and/or capacitors) that may operate independently of an electrical grid. Storing energy in an off-grid mode may include preventing conversion of an aggregate DC voltage to an AC voltage, and storing an aggregate DC voltage as electrical energy. The at least one processor may enable energy storage in an off-grid mode by operating a switch to divert an aggregate DC voltage from a DC input of an inverter to a DC input of an energy storage component. In some embodiments, the off-grid mode involves storing energy in a battery. A battery may be understood as described elsewhere in this disclosure. The at least one processor may operate a switch causing an aggregated DC voltage to flow to a DC input of a battery, allowing to charge a battery using an aggregate DC voltage.

By way of a non-limiting example, in FIG. 7, upon failing to confirm conformity of the connection (via inverter 434) to electrical grid 718 with the at least one predetermined operating parameter, at least one processor 428 may prevent AC power signal 722 from flowing to electrical grid 718. For example, at least one processor 428 may operate plurality of switches 1314 (see FIG. 13) to prevent each DC output of each rectifier 530 from flowing towards inverter 434, thereby preventing conversion of aggregate DC voltage 726 to an AC voltage (e.g., AC power signal 722) via inverter 434.

In some embodiments, the at least one processor is further configured to regulate each fluid turbine in the cluster of fluid turbines to thereby cause conformity of the grid connection to the at least one predetermined operating parameter. Regulating a fluid turbine may include one or more of receiving measurements associated with one or more operating parameters of a fluid turbine, determining, based on one or more measurements, a signal to adjust one or more operating parameters, and/or transmitting a signal for adjusting one or more operating parameters of a fluid turbine (e.g., as feedback in an iterative process to cause a one or more operational parameters of a fluid turbine to converge to a baseline or threshold level). For example, at least one processor may transmit a signal to activate and/or deactivate a brake system associated with a fluid turbine to thereby regulate a fluid turbine. As another example, at least one processor may transmit a signal to divert at least a portion of an electrical energy output of fluid turbine to a load (e.g., a dump load) to thereby regulate a fluid turbine. Regulating each fluid turbine in a cluster of fluid turbines may include at least one processor transmitting a signal for each fluid turbine in a cluster of fluid turbines to regulate each fluid turbine.

In some embodiments, regulating each fluid turbine includes controlling a load on each fluid turbine. Controlling may include one or more of monitoring, measuring, adjusting, and/or coordinating. A load on a fluid turbine may be understood as described elsewhere in this disclosure. Controlling a load may involve at least one processor increasing a load to cause a slowing of a rotation of a fluid turbine, or decreasing a load to cause an increase in rotational velocity of a fluid turbine. For example, the at least one processor may increase or decrease a load for a limited period of time to adjust a phase of an AC voltage produced by a fluid turbine and thereby cause a connection to an electrical grid to conform with at least one predetermined operating parameter. As another example, the at least one processor may increase or decrease a load for an extended period of time to adjust a frequency and/or voltage of an AC voltage produced by a fluid turbine and thereby cause a connection to an electrical grid to conform with at least one predetermined operating parameter.

In some embodiments, controlling the load on each fluid turbine includes controlling a brake associated with each fluid turbine. A brake may be understood as described elsewhere in this disclosure. Controlling a brake associated with a fluid turbine may include at least one processor regulating a brake circuit configured to engage or disengage one or more brakes, and/or configured to regulate a level of engagement or disengagement of one or more brakes (e.g., to allow for partial braking). In some embodiments, each brake is electrically activated. An electrically activated brake may refer to a brake that may be engaged in response to a transmitted electronic signal. Such a signal may be transmitted, for example, via at least one processor. In some embodiments, an electrically activated brake may be associated with a charge controller. An electrically activated brake may include an electronic brake and/or a mechanical brake. An electronic brake may include a circuit configured to (e.g., at least partially) connect and/or disconnect a fluid turbine to an electrical load. In some embodiments, each brake is mechanical. A mechanical brake may include a device configured to introduce a physical object (e.g., one or more pads, discs, and/or drums) as an obstacle for hampering motion, e.g., by increasing friction to slow a rotating shaft, rotating blades, and/or a rotating rotor associated with a fluid turbine. At least one processor may control a mechanical brake by transmitting an electronic signal to an associated mechanical brake circuit configured to (e.g., at least partially) engage or disengage a mechanical brake.

In some embodiments, each brake includes an electrical circuit for shunting generator windings. Generator windings may include one or more coils of electrically conductive wire (e.g., copper wire) configured to induce an AC signal when exposed to a fluctuating magnetic field (e.g., as in an electric energy generator). Shunting may refer to diverting, e.g., to create an alternative path. Shunting generator windings may include diverting a current away from conductive windings of an energy generator, e.g., to a dump load. Shunting generator windings may cause energy to leave an electric energy generator system, causing rotation of a rotor to slow (e.g., thereby reducing kinetic energy to maintain conservation of energy). A brake including an electrical circuit for shunting generator windings may include a switch allowing for diversion of at least some current away from generator windings (e.g., to a dump load) and/or to divert at least some current towards generator windings (e.g., away from a dump load). For example, increasing a load on a fluid turbine by diverting current away from generator windings may remove electrical energy from a fluid turbine system. In keeping with conservation of energy, removal of electrical energy may cause a corresponding reduction in kinetic energy, causing rotation of the energy generator and an associated fluid turbine to slow. Decreasing a load on a fluid turbine by diverting current towards generator windings may add electrical energy to a fluid turbine system. In keeping with conservation of energy, adding energy may cause a corresponding increase in kinetic energy, causing rotation of the energy generator and an associated fluid turbine to increase. The at least one processor may control an amount of current shunted away or to generator windings by controlling an associated switch, thereby controlling a load and an associated rotational velocity. For example, controlling a load may allow the at least one processor to adjust a frequency, voltage, and/or phase of an AC signal, allowing the at least one processor to regulate each fluid turbine and cause conformity of a grid connection to at least one predetermined operating parameter.

In some embodiments, regulating each turbine includes conforming with an MPPT protocol, thereby causing each turbine to generate power at a maximum power point. An MPPT protocol may be understood as described elsewhere in this disclosure. A maximum power point (e.g., peak power point) may refer to a rotational speed for a fluid turbine for generating a maximum power output (e.g., a peak power output) when operating under a particular fluid velocity. A maximum power point for a fluid turbine may be determined, for example, using an associated power curve (e.g., see chart 1200 in FIG. 12) stored in memory. An associated power curve may be based on prior testing and/or via simulation. In some embodiments, each fluid turbine in a cluster of fluid turbines may be associated with the same maximum power point for a given fluid velocity (e.g., each fluid turbine in the cluster may be associated with the same power curve). In some embodiments, at least some fluid turbines in a cluster of fluid turbines may be associated with differing maximum power points for a given velocity. For example, at least some fluid turbines in a cluster may be associated with differing power curves due to differing designs and/or differing operational parameters. In some embodiments, at least some fluid turbines in a cluster of fluid turbines may be subject to fluid-dynamical coupling and may therefore be subject to differing fluid velocities at any given point in time, causing at least some fluid turbines to be associated with differing maximum power points at a given point in time (e.g., even if the at least some fluid turbines may be associated with the same power curve).

For example, at least one processor may receive an indication of fluid velocity from one or more detectors associated with one or more fluid turbines. An indication of fluid velocity may include, for example, a measure of fluid speed, a measure of rotational speed in response to a fluid flow, a measure of an AC power output of an electric energy generator and associated fluid turbine, and/or any other measurement that may be used to determine a fluid velocity. The at least one processor may use an indication of fluid velocity and/or an associated power curve retrieved from memory to determine a rotational velocity corresponding to the fluid velocity for producing a maximum power output in accordance with an MPPT protocol. The at least one processor may transmit one or more signals to regulate each fluid turbine, for example, by engaging an associated brake to adjust a rotational speed of each fluid turbine. Adjusting rotational speeds thus may cause each fluid turbine to substantially at a rotational velocity corresponding to a maximum power output for each fluid turbine.

By way of a non-limiting example, in FIG. 7, at least one processor 428 may regulate fluid turbines 404 in cluster 401 to cause conformity of the connection (via inverter 434) to electrical grid 718 to the at least one operating parameter. For example, at least one processor 428 may transmit a plurality of signals to each charge controller 410 to control a load on each fluid turbine 404. Controlling a load on each fluid turbine 404 may involve at least one processor 428 controlling a brake associated with each fluid turbine 404. For instance, in FIG. 13, at least one processor 428 may activate an associated brake electronically by transmitting a signal to electronic brake control 518 and/or to mechanical brake control 520 associated with each fluid turbine 404. In some embodiments, at least one processor 428 may activate a mechanical brake associated with each fluid turbine 404 (e.g., see mechanical brake 608 in FIG. 6). In some embodiments, at least one processor 428 may control a load on each fluid turbine 404 according to an MPPT protocol. For example, at least one processor 428 may retrieve a version of chart 1200 (see FIG. 12) associated with each fluid turbine 404 from memory 430 (see FIG. 4). At least one processor 428 may use chart 1200 to determine a rotational velocity to cause each fluid turbine 404 to generate power at a maximum power point.

In some embodiments, each rectifier is configured to receive a differing AC voltage from the associated fluid turbine and to convert each differing AC voltage to a DC voltage, thereby producing the plurality of DC voltages. Differing AC voltages may include distinct AC voltages, e.g., distinguishable by at least one AC voltage attribute (e.g., frequency, phase, and/or voltage level). For example, each fluid turbine may be associated with differing operating parameters (e.g. due to differing design), and/or a different fluid flow (e.g., a different incident angle of a fluid flow on a plurality of blades, and/or a differing fluid flow due to fluid dynamical coupling between differing fluid turbines in a cluster of fluid turbines). Consequently, each fluid turbine may produce a different AC voltage (e.g., different phase, frequency, and/or voltage). Each different AC voltage produced by each fluid turbine may flow to an associated rectifier, which may convert each different AC voltage to a DC voltage. Each DC voltage may be delivered to a common circuitry for aggregation. In some embodiments, each DC voltage may be converted to a common DC voltage via a DC-DC converter to allow merging a plurality of DC voltages in parallel. In some embodiments, each differing AC voltage is a three-phase AC voltage. A three-phase AC voltage may be understood as described elsewhere in this disclosure.

By way of a non-limiting example, in FIG. 7, each rectifier 530 may receive a differing AC power output 408 (e.g., an AC voltage) from associated fluid turbine 404. Each rectifier 530 may convert each differing AC power output 408 (e.g., AC voltage) to a different DC signal 412 to produce a plurality of DC voltages. Plurality of DC signals 412 (e.g., DC voltages) may be combined in parallel to produce aggregated DC voltage 426. In some embodiments, generators 406 may be three-phase generators and AC power outputs 408 (e.g., AC voltages) may be three-phase AC voltages.

In some embodiments, confirming that the connection to an electrical grid conforms with at least one predetermined operating parameter includes receiving a signal from regulation circuitry. A signal and circuitry may be understood as described elsewhere in this disclosure. Regulation circuitry may refer to circuitry configured to perform one or operations to ensure compliance of an AC voltage with one or more regulations and/or specifications associated with an electrical grid. Regulation circuitry may include one or more transformers, tap changers, compensators (e.g., static VAR compensators), condensers (e.g., synchronous condensers), at least one processor, an inverter, a voltage booster, a load, a brake circuit, a shunt resistor, a capacitor, an inductor, rated contacts, one or more detectors (e.g., voltage and/or current meters) and/or any other component configured to ensure compliance of an AC voltage to an electrical grid. At least one processor may receive a signal from regulation circuitry and determine, based on the signal, if an attribute of an AC voltage (e.g., a voltage level, a frequency, a phase, an impedance, and/or any other characterization of an AC voltage) conforms with the at least one predetermined operating parameter.

In some embodiments, the at least one processor may use signals received from regulation circuitry to adjust an AC power output of one or more fluid turbines to maintain conformance of a connection to an electrical grid with at least one predetermined operating parameter. For example, based on the received signals, the at least one processor may engage or disengage one or more brakes and/or DC-DC converters associated with one or more fluid turbines to thereby adjust a voltage level, a phase, an impedance, and/or frequency to cause an AC voltage to conform with the at least one predetermined operating parameter.

By way of a non-limiting example, in FIGS. 7, at least one processor 428 may receive at least one signal from circuit 700. Circuit 700 may include a plurality of brake detection circuits 712 (e.g., to control a load imposed on fluid turbines 404) and a plurality of voltage boost circuits 714 (e.g., to cause conformance of a voltage level with electrical grid 718), allowing to regulate the connection between cluster 401 of fluid turbines 404 (via inverter 434) to electrical grid 718.

In some embodiments, the at least one processor is further configured to sense a demand for power associated with a battery and prioritize transmission of the aggregated DC voltage to the battery in response. Sensing (e.g., to sense) may include detecting, measuring, and/or receiving a measurement. Power may be understood as described elsewhere in this disclosure. A demand for power may refer to a request and/or need to consume power. In some embodiments, a battery may provide electrical energy to control operations for one or more fluid turbines. For example, a battery may provide energy to operate circuitry for controlling a load, a rotational speed, a rotational phase, a voltage booster and/or voltage reducer, one or more brakes, one or more switches to divert a flow of energy to one or more energy sinks, and/or any other operation for controlling a fluid turbine. In some embodiments, a demand for power associated with a battery may be associated with a threshold level for a battery. For example, a threshold level for a battery may be associated with an amount of stored energy needed to power circuitry for controlling operations for a cluster of fluid turbines A demand for power associated with a battery may refer to a need for electrical energy by a battery. For example, when a level of stored electrical energy in a battery reaches or falls beneath a threshold level, a detector associated with a battery may transmit a signal to at least one processor, thereby allowing the at least one processor to sense a demand for power associated with a battery. Prioritizing (e.g., to prioritize) may include raising a rank of importance and/or focus, to give preference and/or precedence, e.g., for performing one task instead or ahead of a different task. Transmission of the aggregated power "in response" may refer to power being transmitted consequent to, or as a result of, e.g., sensing a demand for power. Prioritizing transmission of an aggregate DC voltage to a battery in response may include at least one processor diverting at least some of an aggregate DC voltage to charge a battery (e.g., instead of using an aggregate DC voltage for another purpose) upon sensing a demand for power associated with the battery. For example, instead of allowing an inverter to convert an aggregate DC voltage to an AC voltage for feeding to an electrical grid, the at least one processor may operate a switch to divert at least some of the aggregate DC voltage to charge a battery and/or a capacitor.

By way of a non-limiting example, in FIG. 7, at least one processor 428 may sense a demand for power associated with battery bank 720. At least one processor 428 may prioritize transmission of aggregated DC voltage 726 to battery bank 720 in response. For example, in FIG. 13, at least one processor 428 (and/or at least one processor 512)

may operate switch 1314 to divert at least some of a DC voltage signal to energy storage component 1322 via DC-DC converter 1316.

Some embodiments involve a non-transitory computer readable medium containing instructions that when executed by at least one processor cause the at least one processor to perform operations for communicating power from a cluster of fluid turbines to an electrical grid. The at least one processor may confirm that a connection of the cluster of fluid turbine to an electrical grid conforms with at least one predetermined operating parameter; when conformity of an electrical grid connection with the at least one predetermined operating parameter is confirmed, enabling inversion of an aggregated DC voltage to an AC voltage compatible with the electrical grid and enabling output of the AC voltage to the electrical grid; and when conformity of the electrical grid connection with the at least one predetermined operating parameter is not confirmed, preventing output of the AC voltage to the electrical grid.

By way of a non-limiting example, in FIG. 7, at least one processor 428 may confirm that a connection (e.g., via inverter 434) of cluster 401 of fluid turbines 404 to electrical grid 718 conforms with at least one predetermined operating parameter. When conformity of the electrical grid connection with the at least one predetermined operating parameter is confirmed, at least one processor 428 may enable inversion of aggregated DC voltage 726 to an AC voltage (e.g., AC power signal 722) compatible with electrical grid 718, and may enable inverter 434 to output an AC voltage (e.g., AC power signal 722) to electrical grid 718. When conformity of the electrical grid connection (e.g., via inverter 434) with the at least one predetermined operating parameter is not confirmed, at least one processor 428 may prevent output of AC voltage 422 to the electrical grid 718.

Figure 17:
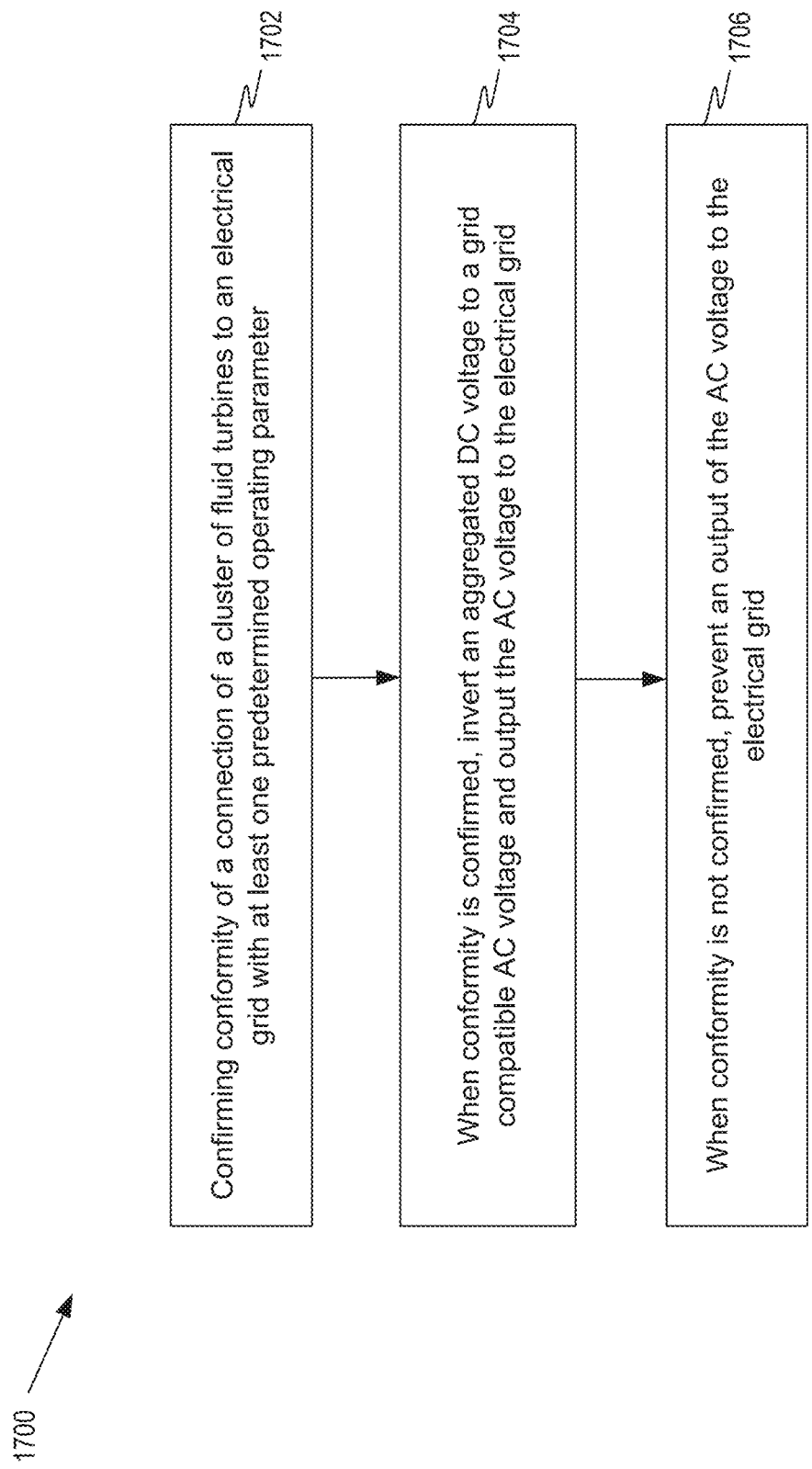
FIG. 17 illustrates a flow diagram of an exemplary process for communicating power from a cluster of fluid turbines to an electrical grid, consistent with embodiments of the present disclosure.

FIG. 17 illustrates a flow diagram of an exemplary process 1700 for communicating power from a cluster of fluid turbines to an electrical grid, consistent with embodiments of the present disclosure. In some embodiments, process 1700 may be performed by at least one processor (e.g., processor 428 and/or processor 512) to perform operations or functions described herein. In some embodiments, some aspects of process 1700 may be implemented as software (e.g., program codes or instructions) that are stored in a memory (e.g., memory 430 and/or memory 514) or a non-transitory computer readable medium. In some embodiments, some aspects of process 1700 may be implemented as hardware (e.g., a specific-purpose circuit). In some embodiments, process 1700 may be implemented as a combination of software and hardware.

Process 1700 includes a step 1702 of confirming that a connection of the cluster of fluid turbines to an electrical grid conforms with at least one predetermined operating parameter. By way of a non-limiting example, in FIG. 7, at least one processor 428 may confirm that a connection (e.g., via inverter 434) of cluster 401 of fluid turbines 404 to electrical grid 718 conforms with at least one predetermined operating parameter.

Process 1700 includes a step 1704 of, when conformity of an electrical grid connection with the at least one predetermined operating parameter is confirmed, enabling inversion of an aggregated DC voltage to an AC voltage compatible with the electrical grid and enabling output of the AC voltage to the electrical grid. By way of a non-limiting example, in FIG. 7, when conformity of the electrical grid connection with the at least one predetermined operating parameter is confirmed, at least one processor 428 may enable inversion of aggregated DC voltage 726 to an AC voltage (e.g., AC power signal 722) compatible with electrical grid 718, and may enable inverter 434 to output of an AC voltage (e.g., AC power signal 722) to electrical grid 718.

Process 1700 includes a step 1706 of, when conformity of the electrical grid connection with the at least one predetermined operating parameter is not confirmed, preventing output of the AC voltage to the electrical grid. By way of a non-limiting example, in FIG. 7, when conformity of the electrical grid connection (e.g., via inverter 434) with the at least one predetermined operating parameter is not confirmed, at least one processor 428 may prevent output of AC voltage 422 to the electrical grid 718.

When operating under low fluid speed conditions, a fluid turbine may produce energy at a level below a threshold for supplying to an electrical grid (e.g., in an off-grid mode of operation). To avoid losing energy generated under low fluid speeds, energy may be converted to a DC voltage and stored in an energy storage component, such as a capacitor or battery. However, converting an AC power signal to a DC power signal for energy storage may result in a loss of information associated with AC characteristics. Information associated with AC characteristics may be valuable, for example, for applying an MPPT protocol to a fluid turbine and an associated generator, and/or for detecting anomalies (e.g., related to mechanical dysfunction and/or sabotage). Additionally, information associated with stored DC energy may be useful, for example, to detect a level of stored DC energy (e.g., to prevent overcharging of a battery or capacitor, and/or to determine when to release stored energy).

Some disclosed embodiments include a circuit for storing energy generated under low fluid speed conditions (e.g., in an off-grid mode) having two separate channels of information, an AC information channel and a DC information channel. An AC information channel may convey information associated with AC characteristics of an AC power output of a fluid turbine. At least one processor may use information delivered via an AC information channel, for example, to apply an MPPT protocol to a fluid turbine and an associated generator, and/or to detect anomalies. At least one processor may use information delivered via a DC information channel, for example, to detect a level of energy stored in an energy storage component. The at least one processor may use the detected level of stored energy to determine when to release stored energy, and/or determine when to discontinue storing energy (e.g. to prevent overcharging an energy storage component).

Some embodiments involve a dual-channel fluid turbine controller. A fluid turbine may be understood as described elsewhere in this disclosure. A fluid turbine controller may include one or more devices, processors, and/or circuitry for controlling a fluid turbine. Controlling a fluid turbine may include receiving data associated with one or more operational parameters for a fluid turbine, monitoring one or more operational parameters for a fluid turbine, performing computations based on data associated with one or more operational parameters, transmitting signals affecting one or more operational parameters for a fluid turbine, and/or performing any other function or procedure to control one or more operational parameters associated with a fluid turbine. Dual-channel may refer to a system including two separate or partially separate (e.g., either partially or completely parallel) channels, pathways, routes, or circuits for transmitting signals. For example, a first channel may be configured to convey information associated with AC characteristics, and a second channel may be configured to convey information associated with DC characteristics. Information associated with AC characteristics may relate to an AC power output of a fluid turbine. Information associated with DC characteristics may relate to a level of energy stored in an energy storage component, e.g., during an off-grid mode of operation for a fluid turbine. A dual-channel fluid turbine controller may refer to a controller for a fluid turbine configured to receive information via two separate channels of information, e.g., a first channel for conveying information associated with AC characteristics, and a second channel for conveying information associated with DC characteristics.

Some embodiments involve at least one processor configured to receive, via an AC channel coupled to an AC output of a fluid turbine, first signals indicating fluctuations in power generated by the fluid turbine operating beneath a grid power supply threshold. "At least one processor", "receiving", a "signal", "power", "threshold", and a "grid" (e.g., an electrical grid) may be understood as described elsewhere in this disclosure. Power that is generated may refer to power that is produced, created, and/or converted. Power generated by a fluid turbine may refer to electrical energy generated by an energy generator coupled to a fluid turbine. Such an energy generator may convert mechanical motion (e.g., torque) of a fluid turbine to AC electrical energy via induction, as described elsewhere in this disclosure. Power "beneath" a grid power supply threshold may refer to power that is less than or below such a threshold. A grid power supply threshold may refer to a floor or baseline for delivering power to an electrical grid, where AC power beneath the threshold may be incompatible for supplying power to an electrical grid. A grid power supply threshold may be uniform or geographically based (e.g., different regions may be associated with different grid power supply thresholds). For example a grid power supply threshold may correspond to 110 to 120V at 60 Hz, or 220-240V at 50 Hz. A fluid turbine operating beneath a grid power supply threshold may refer to a fluid turbine subject to a low speed fluid flow and carrying too little kinetic energy to cause the fluid turbine to spin at a rotational velocity sufficient for producing electrical energy above a grid power supply threshold, preventing delivery of generated energy to an electrical grid. In some embodiments, a fluid turbine operating beneath a grid power supply threshold may include a fluid turbine subject to a load drawing away at least some generated electrical power to power at least one processor and associated circuitry, such that the remaining electrical power may be beneath a grid power supply threshold. Fluctuations may include variations, oscillations, variability, and/or movements (e.g., from high to low and vice versa). Fluctuations in power generated by a fluid turbine operating beneath a grid power supply threshold may refer to variations, irregularities, and/or unevenness in power generated by a fluid turbine operating under low fluid speed conditions (e.g., in an off-grid mode of operation), e.g., due to variations in fluid speed over time.

Signals indicating fluctuations in power generated by a fluid turbine may refer to measurements and/or readings by a detector (e.g., a voltage and/or current meter) indicating characteristics of an AC power signal. Such characteristics may include, for example, a voltage level, a frequency, a phase, and/or variations and/or lack of variations thereof. Such characteristics may additionally include, for example, above average, below average, and/or irregular peaks and/or troughs of an AC power signal. In some embodiments, signals indicating fluctuations in power generated by a fluid turbine may include one or more statistical measures associated with one or more characteristics of an AC power signal (e.g., statistical measures associated with a voltage, frequency, and/or phase). Such statistical measure may include, for example, an average (e.g., a running time-average), a mode, a standard deviation or variance, a minimum, a maximum, and/or any other statistical measure for a characteristic of an AC power signal.

An AC channel may refer to one or more wired and/or wireless communication links designated to carry digitally encoded information associated with an AC signal (e.g., an AC power output of a fluid turbine). An AC output of a fluid turbine may refer to one or more electrically conductive ports, conduits, wires, and/or cables associated with a generator of a fluid turbine and configured to transmit generated AC power to an energy power sink. An AC output of a fluid turbine may be a source of information associated with an AC power output of a fluid turbine. A coupled AC channel may include an AC channel that is connected (e.g., electrically connected) and/or associated. Thus, an AC channel coupled to an AC output of a fluid turbine may include an interface (e.g., an analog to digital interface) that is connected or otherwise associated with an AC output. Such a connection may be configured to convert AC characteristics of an AC power output of a fluid turbine to digitally encoded information (e.g., for receiving by at least one processor). For example, an AC channel coupled to an AC output of a fluid turbine may include one or more sampling devices for measuring AC characteristics of an AC power output of a fluid turbine (e.g., according to a Nyquist sampling frequency). Examples of sampling devices may include, for example, a voltmeter, a current meter, a phase measurement unit (e.g., a PMU for estimating a magnitude and/or a phase angle of time-varying electric signals), a SCADA (e.g., Supervisory Control and Data Acquisition) control system, and/or any other device capable of extracting information from an AC power output of a fluid turbine. At least one processor configured to receive, via an AC channel coupled to an AC output of a fluid turbine may include at least one processor electrically connected to an AC channel coupled to an AC output of a fluid turbine. For example, the at least one processor may be a receiver of information, the AC output of a fluid turbine may be a source of information, and the AC channel may deliver information from the source to the receiver. In some embodiments, the first signals are received from a voltage sensor connected to the AC channel. A voltage sensor may include a device (e.g., an interfacing device) for converting a voltage difference at any given point in time between two points of an electric circuit to an electronic (e.g., digital) signal. In some embodiments, a voltage sensor may sample an AC power output of a fluid turbine according to a sampling frequency (e.g., a Nyquist sampling frequency) allowing the voltage sensor to convert an analog AC power output to digitally encoded information (e.g., for receiving by at least one processor). A voltage sensor may have a first connection to an AC power output of a fluid turbine, and a second connection to at least one processor, allowing the at least one processor to receive digital information associated with the AC power output of a fluid turbine.

For example, at least one processor may be in communication with a sampling device connected to an AC power output of a fluid turbine and may receive multiple readings (e.g., samplings) associated with an AC power output of a fluid turbine from the sampling device. In addition, the at least one processor may retrieve a grid power supply threshold from memory. The at least one processor may analyze and/or compare the multiple readings of an AC power output of a fluid turbine with the grid power supply threshold to determine if the AC power output meets the grid power supply threshold. If the AC power output meets the grid power supply threshold, the at least one processor may operate a switch allowing the generated AC power to be delivered to an electrical grid. If the AC power output fails to meet the grid power supply threshold, the at least one processor may operate a switch causing conversion of generated AC power to DC energy for storage in an energy storage component (e.g., in an off-grid mode of operation). Moreover, when operating in an off-grid mode, the at least one processor may use readings of an AC power output of a fluid turbine to detect fluctuations in power generated. Such fluctuations may be caused, for example, by variations in fluid speed and/or direction, and/or due to sabotage or a mechanical flaw.

In some embodiments, the at least one processor is further configured to use the first signals to detect at least one anomaly associated with power generated by the fluid turbine. An anomaly may include an abnormality, an irregularity, and/or deviation, e.g., from expected behavior. For example, the at least one processor may compare characteristics of an AC power output of a fluid turbine to expected characteristics, and may detect an anomaly upon determining a discrepancy therebetween. Such discrepancies may include, for example, a lack of pattern, an above average spike and/or trough in an AC power signal, a sudden drop or increase in generated AC power absent a correlation in a sudden drop or increase in fluid speed, an irregular frequency absent a correlation to a change in fluid speed, and/or any other discrepancy indicating abnormal behavior of a fluid turbine and an associated generator. In some embodiments, the at least one anomaly indicates sabotage. Sabotage may include deliberate destruction or damage. For example, an agent (e.g., a human and/or a device such as a drone) may sabotage a fluid turbine by deliberately damaging one or more physical components of a fluid turbine (e.g., a plurality of blades, a shaft, a generator, connecting wires, and/or electronics). As another example, an agent (e.g., human, a device, and/or a software agent) may sabotage a fluid turbine by deliberately damaging software associated with controlling and/or regulating a fluid turbine (e.g., by introducing a virus or malware to a software application configured to be executed by at least one processor associated with a fluid turbine). In some embodiments, the at least one anomaly indicates a mechanical flaw. A mechanical flaw may include a physical defect, weakness, and/or failure affecting a structure. For example, a fluid turbine and/or an associated generator may suffer a mechanical flaw in one or more components of the fluid turbine or associated generator due to wear and tear, introduction of moisture into a generator, strong fluid speeds, shifting of the ground, and/or any other factor that may cause mechanical damage to a fluid turbine and/or an associated generator.

Figure 18:
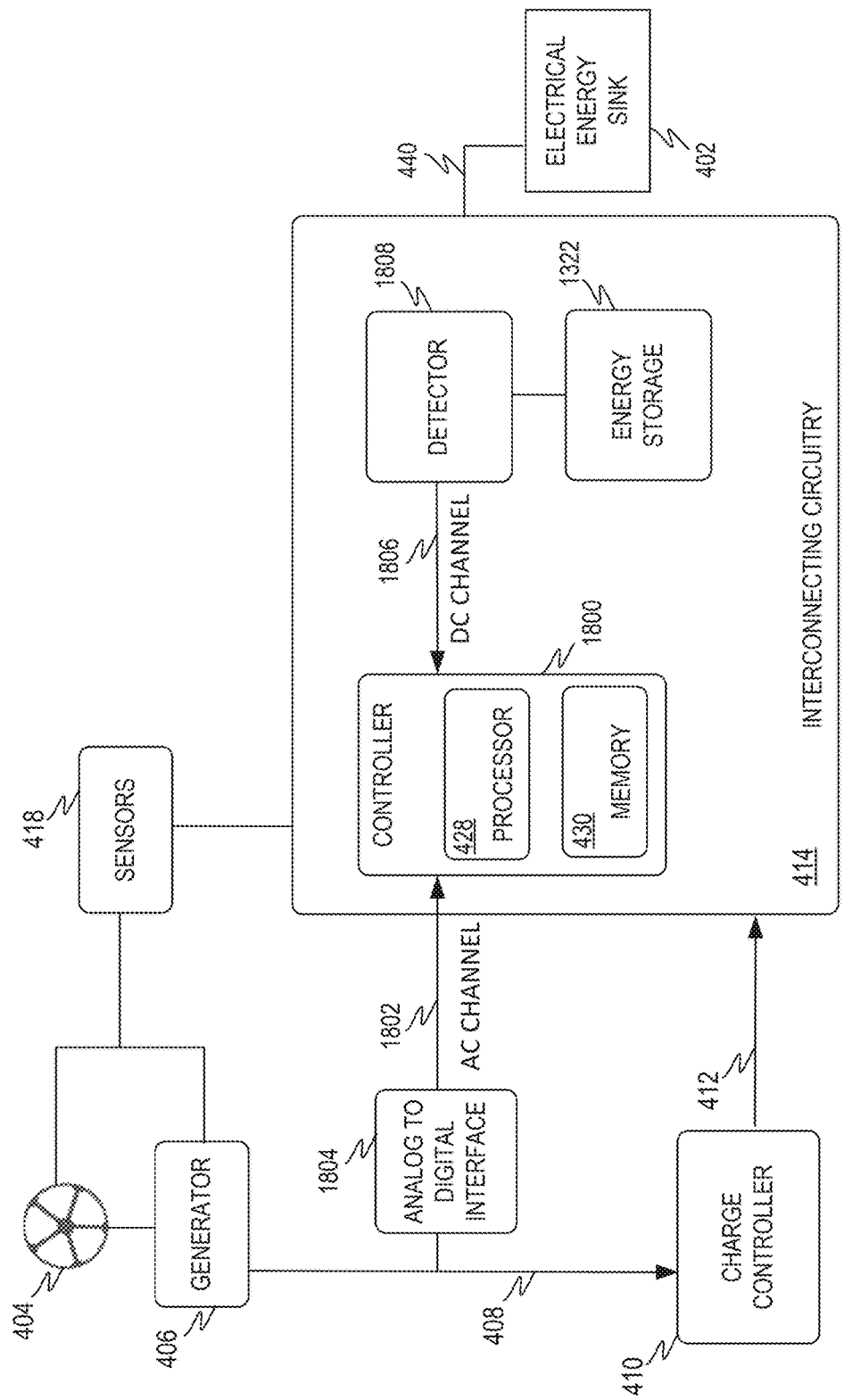
FIG. 18 is a schematic diagram of an exemplary dual-channel controller for a fluid turbine, consistent with some embodiments of the present disclosure.

By way of a non-limiting example, reference is made to FIG. 18 showing a schematic diagram of an exemplary dual-channel controller 1800 for a fluid turbine, consistent with some embodiments of the present disclosure. In the example shown, dual-channel controller 1800 includes at least one processor 428 and is integrated with interconnecting circuitry 414, however this is for illustrative purposes only and does not limit the invention. In some embodiments, dual-channel controller may be integrated with charge controller 410 and may include at least one processor 512. In some embodiments, dual-channel controller may be associated with charge controller 410 in association with at least one processor 512 and with interconnecting circuitry 414 in association with at least one processor 428.

Dual-channel controller 1800 may be coupled to AC power output 408 of generator 406 and fluid turbine 404 via an AC channel 1802 and an analog-to-digital interface 1804. Dual-channel controller 1800 may be additionally coupled to energy storage component 1322 via a DC channel 1806 and a detector 1808. For example, detector 1808 may correspond to voltage sensor 1320. Fluid turbine 404 may be operating in an off-grid mode of operation due to a low fluid speed, such that AC power output 408 may be beneath a grid power supply threshold (e.g., less than 110V at 60 Hz). Analog-to-digital interface 1804 may sample one or more measurements of AC power output 408 and may convert the measurements to first signals carrying digitally encoded information associated with AC power output 408. The at least one processor may receive via AC channel 1802 coupled to AC power output 408 of fluid turbine 404 the first signals indicating fluctuations in AC power output 408 generated by fluid turbine 404 operating beneath the grid power supply threshold. For example, the fluctuations in AC power output 408 may be due to a change in the low fluid speed. In some embodiments, analog-to-digital interface 1804 may include a voltage sensor connected to AC channel 1802. In some embodiments, the at least one processor may use the first signals to detect at least one anomaly associated with AC power output 408 generated by fluid turbine 404. For example, the at least one anomaly may indicate sabotage and/or a mechanical flaw associated with fluid turbine 404 and/or generator 406.

Some embodiments involve at least one processor configured to access an MPPT protocol. An MPPT protocol may be understood as described elsewhere in this disclosure. Accessing (e.g., access) may include obtaining, acquiring, reading, and/or receiving. At least one processor may access an MPPT protocol by retrieving data associated with an MPPT protocol from memory, and/or by generating data associated with an MPPT protocol via simulation. Such data may include, for example, a power curve (e.g., chart 1200 shown in FIG. 12), a measurement of fluid speed, a load currently imposed on a fluid turbine, and/or one or more associated operational parameters. Some examples of operational parameters may include rotational velocity (e.g., RMP), voltage, and/or current produced by an energy generator, an indication of fluid speed, a load (e.g., an amount of power transferred to an energy sink such as an energy storage component or an electrical grid, blade position (e.g., blade positions for a cluster of fluid turbines), a measure of torque, and/or magnetic characteristics of an energy generator. For example, to implement an MPPT protocol on a fluid turbine and an associated generator, at least one processor may require information associated with AC power (e.g., a voltage level and/or a frequency) generated under a particular fluid speed. The at least one processor may use information associated with an AC power output to determine one or more adjustments to make to a rotational velocity of a fluid turbine that may be necessary to allow the fluid turbine to generate a peak power output under a particular fluid speed, according to an MPPT protocol.

By way of a non-limiting example, in FIG. 12, the at least one processor (e.g., at least one processor 428 and/or 512) may access chart 1200 associated with an MPPT protocol for fluid turbine. For example, chart 1200 may be stored in memory 430 and/or memory 514. In some embodiments, the accessed MPPT protocol may be associated with a particular fluid turbine of a cluster of fluid turbines (e.g., fluid turbine 404A of cluster 401 of fluid turbines).

Some embodiments involve at least one processor configured to determine a correspondence between the first signals and a portion of the MPPT protocol. A correspondence may include one or more of a correlation, a measure of similarity or likeness, a mapping, and/or a comparison. A portion may refer to a part, a segment, and/or a fragment, e.g., of a whole. A portion of an MPPT protocol may refer to a section of an MPPT protocol associated with making one or more adjustments to a rotational velocity of a fluid turbine (e.g., by adjusting an associated load), causing corresponding adjustments to generated power. In some embodiments, a portion of an MPPT protocol may correspond to a specific fluid speed or range thereof, and/or a specific power output or range thereof. In some embodiments, a portion of an MPPT protocol may be associated with a portion of a power curve where a relationship between rotational velocity and power output may be substantially linear. In some embodiments, a portion of an MPPT protocol may be associated with a portion of a power curve including a peak power output. In some embodiments, an MPPT protocol may be associated with a power curve for a fluid turbine having multiple curved lines, each curved line associated with a different fluid speed (e.g., see chart 1200 in FIG. 12), and a portion of an MPPT protocol may be associated with a specific one of the multiple curved lines associated with a particular fluid speed.

A correspondence between signals and a portion of an MPPT protocol may include a mapping and/or correlation between signals indicating fluctuations in generated power and a portion of an MPPT protocol. For example, the correspondence may indicate a discrepancy between a level of generated AC power and a peak power output due to a change in fluid speed, sabotage, and/or a mechanical flaw. At least one processor may determine a correspondence between signals indicating fluctuations in generated power and a portion of an MPPT protocol, for example, based on detecting changes in fluid speeds and/or generated AC power. In some embodiments, the correspondence between the first signals and a first portion of the MPPT protocol is at least partially determined using a machine learning algorithm. Machine learning may be understood as described elsewhere in this disclosure. The at least one processor may use one or more machine learning algorithms to determine, based on signals indicating fluctuations in generated AC power, a portion of an MPPT protocol for applying to a fluid turbine. In some embodiments, the at least one processor may continually determine (e.g., by continually updating) a correspondence between signals indicating fluctuations in an AC power and a portion of the MPPT protocol over time, e.g., in response to continually detecting changes in fluid speed and/or generated AC power. In some embodiments, the at least one processor may periodically determine (e.g., periodically update) a correspondence between signals indicating fluctuations in an AC power and a portion of the MPPT protocol over time, in response to periodically detecting changes in fluid speed and/or generated AC power (e.g., every minute, every 10 minutes, every hour, or using any other time period).

For example, during a first period under a first fluid speed, at least one processor may use a first portion of an MPPT protocol (e.g., based on a first correspondence) to make a first adjustment to a rotational velocity of a fluid turbine (e.g., by applying a first load), causing the fluid turbine to produce a first peak power output under the first fluid speed during the first time period. For instance, the first portion of the MPPT protocol may be associated with a first curved line of a power curve for a fluid turbine associated with the first fluid speed. During a second period, at least one processor may detect a fluctuation in AC power generated (e.g., based on signals received from a detector via an AC channel). The at least one processor may determine a change from the first fluid speed to the second fluid speed, based on the received signals and/or data received from a fluid speed detector. The at least one processor may determine a second correspondence to a second portion of an MPPT protocol (e.g., a second curved line of a power curve) associated with the second fluid speed. The at least one processor may use the second correspondence to the second portion of the MPPT protocol to adjust the first load to a second load, causing a corresponding adjustment to the rotational velocity of the fluid turbine. For example, the adjusted rotational velocity may correspond to a second peak power output under the second fluid velocity based on the second portion of the MPPT protocol.

By way of a non-limiting example, in FIG. 12, the at least one processor may determine a correspondence between the first signals received via AC channel 1802 and a portion of the MPPT protocol. For example, prior to receiving the first signals, while a fluid speed is $v_{w1}$, the at least one processor may use a first portion of the MPPT protocol (e.g., curved line 1220 associated with peak 1204 for fluid speed $v_{w2}$) to control a load on fluid turbine 404 such that AC power output 408 matches peak 1204 for fluid speed $v_{w1}$. However, based on the first signals and/or one or more signals received from sensors 418, the at least one processor may determine that a current fluid speed is now vw2. For example, the at least one processor may receive a fluid speed measurement from fluid speed sensor 504 (e.g., see FIG. 5) included in sensors 418. The at least one processor may determine a correspondence between the fluctuations in AC power output 408 indicated by the first signals and a second portion of the MPPT protocol (e.g., curved line 1222 associated with peak 1206 for fluid speed vw2).

Some embodiments involve at least one processor configured to apply the portion of the MPPT protocol to a generator of the fluid turbine to generate greater power than would be generated in an absence of application of the portion of the MPPT protocol. To apply may include use and/or employ. A generator of a fluid turbine may refer to an electrical energy generator coupled to a fluid turbine allowing the electrical energy generator to convert rotational motion of the fluid turbine to electrical energy. Applying a portion of an MPPT protocol to a generator of a fluid turbine may include at least one processor using a portion of an MPPT protocol (e.g., associated with a particular fluid speed) to adjust a load and/or a brake associated with a generator and an associated fluid turbine to cause a corresponding adjustment in rotational velocity, thereby causing a corresponding adjustment in an AC power output of a generator and an associated fluid turbine. In some embodiments, applying a portion of an MPPT protocol may include determining a current fluid speed (e.g., based on receiving a signal from a fluid speed detector and/or based on receiving signals indicating fluctuations in generated power). Applying a portion of an MPPT protocol may further include measuring an (e.g., adjusted) AC power output associated with a generator and an associated fluid turbine operating under an (e.g., adjusted) load and/or brake, and comparing the measured AC power output to a peak power output for the portion of the MPPT protocol (e.g., associated with a particular fluid speed). The at least one processor may perform some or all of these steps repeatedly in an iterative manner until a measured AC power output substantially matches a peak power output for a particular fluid speed. Greater power may refer to a more power, additional and/or augmented power. Absence may refer to a lack of, an omission, and/or excluding. An absence of application of a portion of an MPPT protocol may refer to operations without and/or excluding an application of a portion of an MPPT protocol. To generate greater power than would be generated in absence of application of the portion of the MPPT protocol may refer to causing a generator of a fluid turbine to produce an increased level of generated power due to an adjustment of an associated load and/or brake based the portion of the MPPT protocol.

For example, in a first time period associated with a first fluid speed, a generator of a fluid turbine spinning at a first rotational velocity under a first load may produce a first AC power output substantially at a level of a first peak power output associated with the first fluid speed. For instance, the first rotational velocity may be associated with a first correspondence between the first AC power output and a first portion of an MPPT protocol associated with the first fluid speed. However, during a second time period associated with a second fluid speed, based on signals indicating fluctuations in generated AC power (e.g., a second AC power output), the at least one processor may determine a second correspondence to a second portion of an MPPT protocol associated with the second fluid speed. Based on the second correspondence, the at least one processor may determine a discrepancy between the second AC power output and a second peak power output associated with the second fluid speed. For example, the second AC power output may be less than the second peak power output due to a discrepancy between the second rotational velocity and a rotational velocity for achieving a second peak power output according to the second portion of an MPPT protocol associated with the second fluid speed. In response, the at least one processor may apply a second load (e.g., different than the first load) to the generator, causing the fluid turbine to spin at a third rotational velocity to produce a third AC power output substantially at the level of the second peak power output associated with the second fluid speed, thereby generating greater power than would be generated in absence of application of the second portion of the MPPT protocol.

In some embodiments, applying the portion of the MPPT protocol to the generator includes modifying a load on the fluid turbine via a DC-DC converter of the generator. A load may be understood as described elsewhere in this disclosure. Modifying a load may include changing, adjusting, altering, e.g., by increasing or decreasing a load. A DC-DC converter may be understood as described elsewhere in this disclosure. In some embodiments, at least one processor may apply a load to a generator via a charge controller including a DC-DC converter. At least one processor may adjust a duty cycle and/or a switching frequency of the DC-DC converter to cause a corresponding adjustment to a load applied to the generator.

In some embodiments, the generated power is stored as energy in a capacitor associated with the generator. Storing, a capacitor, and storing energy in a capacitor may be understood as described elsewhere in this disclosure. Upon applying a portion of an MPPT protocol to a generator of a fluid turbine to generate greater AC power than would be generated in an absence of application of the portion of the MPPT protocol, the at least one processor may cause a DC power signal corresponding to the generated AC power to flow to a capacitor. The DC power signal may charge the capacitor, causing AC power produced by the generator to be stored as DC voltage. In some embodiments, the at least one processor may cause a DC power signal corresponding to the generated AC power to flow to one or more batteries (e.g., a battery bank). In some embodiments, the at least one processor may cause a DC power signal corresponding to the generated AC power to flow to an energy storage component (e.g., including one or more capacitors and/or batteries). For example, a rectifier may convert an AC power output of a fluid turbine to a DC power signal and the at least one processor may operate a switch to divert the DC power signal towards a capacitor when a fluid turbine operates beneath a grid power supply threshold.

By way of a non-limiting example, in FIG. 18, the at least one processor may apply the second portion of the MPPT protocol (e.g., curved line 1222 associated with peak 1206 for fluid speed vw2 shown in FIG. 12) to generator 406 of fluid turbine 404 to generate greater power than would be generated in an absence of application of the second portion of the MPPT protocol. For example, prior to applying curved line 1222 associated with peak 1206 for fluid speed vw2, the at least one processor may have adjusted a load on fluid turbine 404 based on curved line 1220 associated with peak 1204 for fluid speed vw1, causing fluid turbine 404 to produce AC power output 408 at a level beneath peak 1206 for fluid speed vw2. After applying curved line 1222 associated with peak 1206 for fluid speed vw2 (e.g., based on receiving the first signals indicating fluctuations in AC power output 408), the at least one processor may adjust a load on fluid turbine 404 based on curved line 1222 associated with peak 1206 for fluid speed vw2, causing fluid turbine 404 to produce AC power output 408 at a level substantially equal to peak 1206 for fluid speed vw2. Consequently, fluid turbine 404 may generate greater power than would be generated in absence of applying curved line 1222 associated with peak 1206 for fluid speed vw2.

In some embodiments, the at least one processor may apply the portion of the MPPT protocol to the generator by modifying a load on fluid turbine 404 via one or more of DC-DC converters 426, 1316, and/or 1318 associated with generator 406. In some embodiments, the at least one processor may apply the portion of the MPPT protocol to the generator by modifying a load on fluid turbine 404 using mechanical brake control 520 and/or electronic brake control 518.

Some embodiments involve at least one processor configured to receive, via a DC channel, second signals indicating a level of energy stored in the capacitor. A level of energy stored in a capacitor may refer to an amount of electrical charge stored or a voltage potential maintained between two conducting plates of a capacitor. Signals indicating a level of energy stored in a capacitor may include digitally encoded measurements of a level of charge stored in a capacitor. For example, a detector such as a multimeter or a voltage sensor may sense a level of charge in a capacitor and convert the level of charge to digitally encoded information. A DC channel may refer to one or more wired and/or wireless communication links designated for carrying digitally encoded information associated with a DC signal, e.g., a level of energy stored in a capacitor. The at least one processor may be in electronic communication with a detector connected to a capacitor via a DC channel. The at least one processor may receive from the detector electronic signal indicating a level of charge in a capacitor via a DC channel. In some embodiments, the at least one processor may be in electronic communication with a detector connected to one or more batteries (e.g., a battery bank) via a DC channel. The at least one processor may receive from the detector electronic signal indicating a level of charge in one or more batteries via a DC channel. In some embodiments, the at least one processor may be in electronic communication with a detector connected to an energy storage component (e.g., including one or more capacitors and/or batteries) via a DC channel. The at least one processor may receive from the detector electronic signal indicating a level of charge in the energy storage component via a DC channel.

By way of a non-limiting example, in FIG. 18, the at least one processor may receive via DC channel 1806, second signals indicating a level of energy stored in a capacitor (e.g., energy storage component 1322). For example, the at least one processor may receive a level of charge stored in the capacitor from detector 1808.

Some embodiments involve at least one processor configured to use the second signals to determine when to release the stored energy. To release may include to discharge, e.g., by establishing an electrically conductive connection. Releasing stored energy (e.g. stored in a capacitor) may involve manipulating a switch allowing electric energy (e.g., a current) to flow out of a capacitor via one or more conducting wires. At least one processor may compare signals indicating a level of energy stored in a capacitor with a stored energy threshold level (e.g., retrieved from memory). For example, a stored energy threshold level may be associated with a maximum capacitance for a capacitor, and/or with a demand for electrical energy stored in a capacitor (e.g., such that the energy stored in the capacitor may be released once stored energy reaches the demand). When the level of stored energy reaches a stored energy threshold level, the at least one processor may flip a switch causing the capacitor to discharge. For example, the released energy may be used to power the at least one processor and associated circuitry. In some embodiments, the at least one processor may use the second signals to determine when to release the stored energy from one or more batteries (e.g., a battery bank). In some embodiments, the at least one processor may use the second signals to determine when to release the stored energy from an energy storage component (e.g., including one or more capacitors and/or batteries).

In some embodiments, the at least one processor is further configured to release energy stored in the at least one capacitor to an electrical grid when the level of energy at least reaches the grid power supply threshold. An electrical grid may be understood as described elsewhere in this disclosure. A level of energy at least reaching a grid power supply threshold may refer to when an amount of energy at least meets and/or attains a grid power supply threshold. Upon detecting a level of stored energy in a capacitor meeting a grid power supply threshold, the at least one processor may operate a switch causing DC electrical energy stored in the capacitor to flow to an inverter. The inverter may convert the DC electrical energy to a grid-compatible AC voltage.

In some embodiments, the at least one processor is further configured to subsequently release energy stored in the at least one capacitor to smooth power released to an electrical grid during a subsequent operation of the fluid turbine generating power above the grid power supply threshold. "Subsequently" may include following, afterwards, and/or at a later stage. "To smooth power released to an electrical grid" may be understood as described elsewhere in this disclosure. A subsequent operation of a fluid turbine may refer to a later operation of a fluid turbine, e.g., during a subsequent time period where a fluid speed may have increased. A fluid turbine generating power above a grid power supply threshold may refer to a fluid turbine spinning at a fluid speed sufficient for producing electrical energy above a grid power supply threshold, and/or a fluid turbine subject to a load drawing away insufficient electrical energy such that remaining electrical energy may meet or exceed a grid power supply threshold. Thus, during an off-grid mode of operation when a fluid turbine produces energy beneath a grid power supply threshold, the at least one processor may divert generated AC power for storage as DC energy in a capacitor. In addition, during the off-grid mode of operation, the at least one processor may use information received via an AC channel to apply a portion of an MPPT protocol to a fluid turbine, allowing the fluid turbine to generate greater power than would be generated in an absence of application of the portion of the MPPT protocol. Subsequently, during an on-grid mode of operation when a fluid turbine generates power above a grid supply threshold, the at least one processor may release at least some of the stored DC energy to smooth an amount of AC power supplied to the electrical grid.

In some embodiments, the at least one processor is further configured to intermittently release energy stored in the at least one capacitor to power circuitry internal to the fluid turbine. Intermittent (e.g., intermittently) may be understood as described elsewhere in this disclosure. To power may include to supply (e.g., energy), activate, and/or operate. Circuitry may be understood as described elsewhere in this disclosure. Internal may refer to interior to, and/or associated with components internal to something. Circuitry internal to a fluid turbine may include circuitry configured to control operations of a fluid turbine system and/or associated energy generator. Such circuitry may include, for example, one or more processors, charge controllers, rectifiers, braking circuits, DC-DC converters, switches, capacitors, inductors, transformers, and/or inverters. Circuitry internal to a fluid turbine may be included in a housing of a fluid turbine and/or an associated generator, however this is not required. Circuitry internal to a fluid turbine may include circuitry dedicated to controlling operations for an individual fluid turbine (e.g., in a cluster of fluid turbines) and/or circuitry dedicated for controlling operations for a cluster of fluid turbines. In some embodiments, the at least one processor may periodically release at least some of the energy stored in a capacitor to power circuitry associated with operating the fluid turbine and the associated generator. For example, the at least one processor may release energy periodically (e.g., every minute, every 10 minutes, every hour, and/or based on any other time period) to power a battery associated with circuitry internal to a fluid turbine, and/or based on a demand for power by circuitry (e.g., based on a level of the associated battery).

By way of a non-limiting example, in FIG. 18, the at least one processor may use the second signals to determine when to release the stored energy from energy storage component 1322. In some embodiments, the at least one processor may release energy stored in the at least one capacitor to electrical grid 718 when the level of energy in energy storage component 1322 at least reaches the grid power supply threshold. In some embodiments, the at least one processor may subsequently release energy stored in the at least one capacitor (e.g., energy storage component 1322) to smooth power released to electrical grid 718 during a subsequent operation of fluid turbine 404 generating power above the grid power supply threshold (e.g., when a fluid speed exceeds $v_{w4}$). In some embodiments, the at least one processor may intermittently release energy stored in the at least one capacitor (e.g., energy storage component 1322) to power circuitry internal to fluid turbine 404, (e.g., one or more of circuits 414, 700, 800, 900, 1000, 1100, and/or 1300).

As an example, a power threshold may be required to be met to cause an inverter to push power to an electrical grid. An inverter may fail to function properly if a power threshold is not met. If a fluid turbine fails to continuously produce power above the threshold, such power may be lost. To avert this, disclosed embodiments describe storing sub-threshold energy in an energy storage component such as a capacitor for a period of time. When sufficient energy is captured, it may be transmitted to the inverter (e.g., as pulses) at a level sufficient to exceed an operational power threshold of the inverter. For instance, a generator may produce 10 volts and a threshold for an inverter may be 20 volts. At least one processor may cause a charge controller (e.g., with or without a capacitor and/or a voltage booster) to discharge electricity to the inverter when the stored energy is sufficient to provide at least 20 volts for a period of time. In some instances, the at least one processor may cause stored electrical energy to be discharged to the inverter when the stored electrical energy is substantially above the threshold (e.g., when the stored electrical energy is 50 volts and the threshold is 20 volts). In some instances, a charge controller may be associated with a threshold. For example, a charge controller may consume 5 watts to operate. A capacitor positioned between a rectifier and a charge controller may accumulate electrical energy produced by an energy generator at low fluid speeds. The at least one processor may cause the capacitor to release electrical energy to the charge controller when the stored electrical energy is sufficient to operate the charge controller and pass through to the inverter.

Some embodiments involve a non-transitory computer readable medium containing instructions that when executed by at least one processor cause the at least one processor to perform operations for dual-channel fluid turbine control. The operations may include receiving, via an AC channel coupled to an AC output of a fluid turbine, first signals indicating fluctuations in power generated by the fluid turbine operating beneath a grid power supply threshold; accessing an MPPT protocol; determining a correspondence between the first signals and a portion of the MPPT protocol; applying the portion of the MPPT protocol to a generator of the fluid turbine to generate greater power than would be generated in an absence of application of the portion of the MPPT protocol, wherein the generated power is stored as energy in a capacitor associated with the generator; receiving, via a DC channel, second signals indicating a level of energy stored in the capacitor; and using the second signals to determine when to release the stored energy.

By way of a non-limiting example, in FIG. 18, at least one processor (e.g., at least one processors 428 and/or 512) may receive, via AC channel 1802 coupled to AC power output 408 of fluid turbine 404, first signals indicating fluctuations in power generated by fluid turbine 404 operating beneath a grid power supply threshold (e.g., at a fluid speed $v_{w2}$). The at least one processor may access an MPPT protocol (e.g., chart 1200 stored in memory 514 and/or memory 430). The at least one processor may determine a correspondence between the first signals and a portion of the MPPT protocol (e.g., at least one processor 428 may determine a correspondence with curved line 1222 for fluid speed $v_{w2}$). The at least one processor may apply the portion of the MPPT protocol (e.g., curved line 1222 for fluid speed $v_{w2}$) to generator 406 of fluid turbine 404 to generate greater power than would be generated in an absence of application of the portion of the MPPT protocol. The at least one processor may cause generated power to be stored as energy in a capacitor (e.g., energy storage component 1322) associated with generator 406. The at least one processor may receive, via DC channel 1806, second signals indicating a level of energy stored in the capacitor (e.g., energy storage component 1322). The at least one processor may use the second signals to determine when to release the stored energy from energy storage component 1322.

Figure 19:
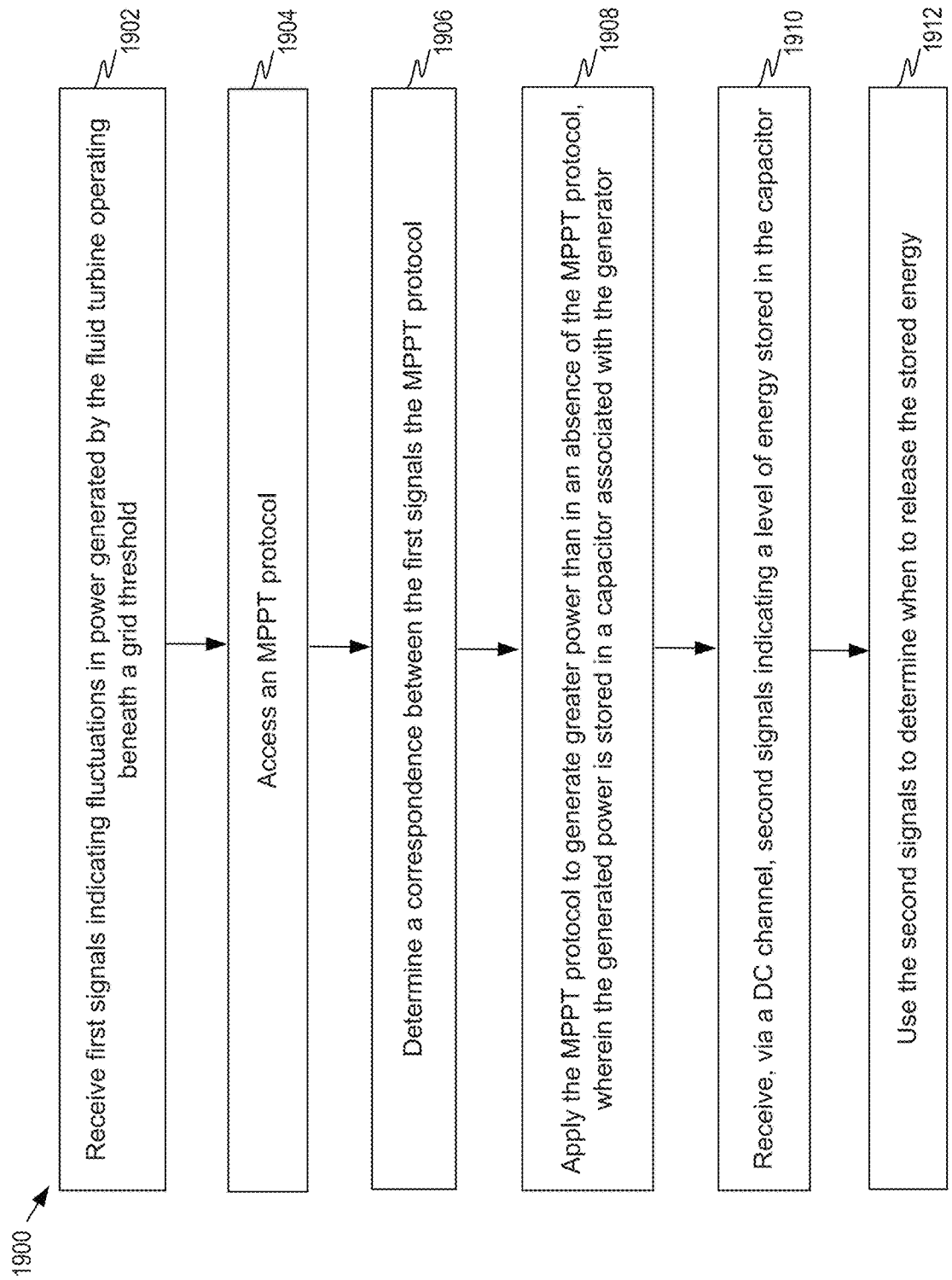
FIG. 19 illustrates a flow diagram of an exemplary process for dual-channel control of a fluid turbine, consistent with embodiments of the present disclosure

FIG. 19 illustrates a flow diagram of an exemplary process 1900 for dual-channel control of a fluid turbine, consistent with embodiments of the present disclosure. In some embodiments, process 1900 may be performed by at least one processor (e.g., processor 428 and/or processor 512) to perform operations or functions described herein. In some embodiments, some aspects of process 1900 may be implemented as software (e.g., program codes or instructions) that are stored in a memory (e.g., memory 430 and/or memory 514) or a non-transitory computer readable medium. In some embodiments, some aspects of process 1900 may be implemented as hardware (e.g., a specific-purpose circuit). In some embodiments, process 1900 may be implemented as a combination of software and hardware.

Referring to FIG. 19, process 1900 includes a step 1902 of receiving, via an AC channel coupled to an AC output of the fluid turbine, first signals indicating fluctuations in power generated by the fluid turbine operating beneath a grid power supply threshold. By way of a non-limiting example, in FIG. 18, the at least one processor (e.g., at least one processors 428 and/or 512) may receive, via AC channel 1802 coupled to AC power output 408 of fluid turbine 404, first signals indicating fluctuations in power generated by fluid turbine 404 operating beneath a grid power supply threshold (e.g., at a fluid speed vw2).

Process 1900 includes a step 1904 of accessing an MPPT protocol. By way of a non-limiting example, in FIG. 18, the at least one processor may access an MPPT protocol (e.g., chart 1200 stored in memory 514 and/or memory 430).

Process 1900 includes a step 1906 of determining a correspondence between the first signals and a portion of the MPPT protocol. By way of a non-limiting example, in FIG. 12, the at least one processor may determine a correspondence between the first signals and a portion of the MPPT protocol (e.g., curved line 1222 for fluid speed vw2).

Process 1900 includes a step of 1908 of applying the portion of the MPPT protocol to a generator of the fluid turbine to generate greater power than would be generated in an absence of application of the portion of the MPPT protocol, wherein the generated power is stored as energy in a capacitor associated with the generator. By way of a non-limiting example, in FIG. 12, the at least one processor may apply the portion of the MPPT protocol (e.g., curved line 1222 for fluid speed $v_{w2}$) to generator 406 of fluid turbine 404 to generate greater power than would be generated in an absence of application of the portion of the MPPT protocol. The at least one processor may cause generated power to be stored as energy in a capacitor (e.g., energy storage component 1322) associated with generator 406.

Process 1900 includes a step of 1910 of receiving, via a DC channel, second signals indicating a level of energy stored in the capacitor. By way of a non-limiting example, in FIG. 18, the at least one processor may receive, via DC channel 1806, second signals indicating a level of energy stored in the capacitor (e.g., energy storage component 1322).

Process 1900 includes a step of 1912 of using the second signals to determine when to release the stored energy. By way of a non-limiting example, in FIG. 18, the at least one processor may use the second signals to determine when to release the stored energy from energy storage component 1322.

Examples of inventive concepts are contained in the following clauses which are an integral part of this disclosure.

Clause 1. A control system for an energy generator, the control system comprising:
- a detector for sensing an indicator associated with electrical energy generated by the energy generator;
- at least one energy storage component configured, in a first mode of operation, to store energy generated by the energy generator during operation at a sub-threshold level insufficient for real-time supply of energy to an associated electrical energy sink;
- an energy converter configured, in a second mode of operation, to provide energy generated by the energy generator during operation above the threshold level for real-time supply of energy to the associated electrical energy sink; and
- a controllable switch, electrically associated with the detector, and configured to alternately toggle between the first mode of operation and the second mode of operation based on the indicator to thereby permit energy generated at the sub-threshold level to be collected and intermittently used.

Clause 2. The control system of clause 1, wherein the at least one energy storage component includes a capacitor or a battery.

Clause 3. The control system of clauses 1 and 2, wherein the at least one energy storage component includes a plurality of capacitors.

Clause 4. The control system of clauses 1 to 3, wherein the energy converter includes an inverter, and the associated electrical energy sink includes an electrical grid.

Clause 5. The control system of clauses 1 to 4, wherein the threshold is associated with a maximum input voltage rating or a minimum input voltage rating of the inverter.

Clause 6. The control system of clauses 1 to 5, further comprising at least one DC-DC converter, and at least one rectifier configured, during the second mode of operation, to convert an AC power signal generated by the energy generator operating above the threshold level to a DC signal, and wherein the DC-DC converter is configured to adapt the converted DC signal to another DC signal for supplying, in the second mode of operation, energy to the associated electrical grid via the inverter.

Clause 7. The control system of clauses 1 to 6, wherein the energy converter includes a charge controller, and the associated electrical energy sink includes a battery bank.

Clause 8. The control system of clauses 1 to 7, further comprising at least one rectifier for converting a first AC power signal generated by the energy generator operating at the sub-threshold level to a first DC power signal compatible for storing energy in the at least one energy storage component.

Clause 9. The control system of clauses 1 to 8, wherein the at least one rectifier includes a three-phase rectifier.

Clause 10. The control system of clauses 1 to 9, wherein the indicator is a measure of electrical output from the energy generator.

Clause 11. The control system of clauses 1 to 10, wherein the indicator is associated with a measure of a rotational speed of a turbine of the energy generator.

Clause 12. The control system of clauses 1 to 11, wherein the indicator is a measure of fluid velocity of a fluid.

Clause 13. The control system of clauses 1 to 12, wherein the fluid is air.

Clause 14. The control system of clauses 1 to 13, wherein the fluid is water.

Clause 15. The control system of clauses 1 to 14, further comprising at least one processor configured to control the controllable switch by receiving the indicator from the detector, comparing the received indicator with the threshold, and toggling the controllable switch between the first mode and the second mode based on the comparison.

Clause 16. The control system of clauses 1 to 15 wherein the at least one processor is further configured to intermittently supply energy collected in the at least one energy storage component to the associated electrical energy sink when the energy in the at least one energy storage component reaches a limit.

Clause 17. The control system of clauses 1 to 16, wherein the at least one processor is further configured to intermittently supply energy collected in the at least one energy storage component to smooth power delivered to the associated electrical energy sink in the second mode.

Clause 18. The control system of clauses 1 to 17, wherein the at least one processor is further configured to intermittently supply energy collected in the at least one energy storage component to power circuitry associated with the energy generator.

Clause 19. The control system of clauses 1 to 18, wherein the circuitry is associated with a brake.

Clause 20. The control system of clauses 1 to 19, further comprising at least one DC-DC converter configured, during the first mode of operation, to convert energy stored in the at least one energy storage component for intermittent supply of the stored energy, and wherein the least one processor is configured to detect a level of energy stored in the at least one energy storage component and activate the DC-DC converter based on the detected level, thereby discharging the at least one energy storage component.

Clause 21. The control system of clauses 1 to 20, wherein the detector, the switch, and the at least one processor are integrated within an ASIC circuit.

Clause 22. The control system of clauses 1 to 21, wherein the at least one processor is further configured to select between the first mode of operation and the second mode of operation based on operational parameters of the energy generator.

Clause 23. A non-transitory computer readable medium containing instructions that when executed by at least one processor cause the at least one processor to perform operations for controlling an energy generator, the operations comprising:
- receiving a sensed indicator associated with electrical energy generated by the energy generator;
- comparing the received indicator with a threshold associated with real-time supply of energy to an associated electrical energy sink; and
- controlling a controllable switch based on the comparison,
- wherein the controllable switch is configured to alternately toggle between a first mode of operation and a second mode of operation,
- wherein in the first mode of operation, energy generated by the energy generator during operation at a sub-threshold level insufficient for real-time supply of energy to an associated electrical energy sink is stored in at least one energy storage component, and
- during the second mode of operation, energy generated by the energy generator during operation above the threshold level for real-time supply of energy to the associated electrical energy sink is provided to the associated energy sink via an energy converter, and wherein alternately toggling between the first mode of operation and the second mode of operation thereby permits energy generated at the sub-threshold level to be collected and intermittently used.

Clause 24. A method for controlling an energy generator, the method comprising:

receiving a sensed indicator associated with electrical energy generated by the energy generator;

comparing the received indicator with a threshold associated with real-time supply of energy to an associated electrical energy sink; and controlling a controllable switch based on the comparison, wherein the controllable switch is configured to alternately toggle between a first mode of operation and a second mode of operation, wherein in the first mode of operation, energy generated by the energy generator during operation at a sub-threshold level insufficient for real-time supply of energy to an associated electrical energy sink is stored in at least one energy storage component, and during the second mode of operation, energy generated by the energy generator during operation above the threshold level for real-time supply of energy to the associated electrical energy sink is provided to the associated energy sink via an energy converter, and wherein alternately toggling between the first mode of operation and the second mode of operation thereby permits energy generated at the sub-threshold level to be collected and intermittently used.

Clause 25. An aggregated voltage controller for a cluster of fluid turbines, the aggregated voltage controller comprising:

at least one processor configured to:

receive a target voltage level for the cluster of fluid turbines;

receive via a plurality of rectifiers, each rectifier associated with a different fluid turbine in the cluster of fluid turbines, an indication of a DC voltage associated with each fluid turbine, wherein the DC voltage associated with at least one of the fluid turbines in the cluster is below the target voltage level; and based on the received indications of the DC voltage signals associated with each fluid turbine in the cluster, output a control signal to each of a plurality of DC-DC converters associated with the plurality of rectifiers, wherein each control signal is configured to regulate each DC-DC converter to produce a DC output signal at the target voltage level such that combining each DC output signal in parallel produces an aggregated DC voltage conforming to the target voltage level.

Clause 26. The aggregated voltage controller according to any of clauses 1 to 25, wherein the at least one of the fluid turbines in the cluster with the DC voltage below the target level includes all of the fluid turbines in the cluster.

Clause 27. The aggregated voltage controller according to any of clauses 1 to 26, wherein each DC-to-DC converter includes at least one of a voltage booster, or a voltage regulator.

Clause 28. The aggregated voltage controller according to any of clauses 1 to 27, wherein the target voltage level corresponds to a charging voltage level of an associated battery.

Clause 29. The aggregated voltage controller according to any of clauses 1 to 28, wherein the target voltage level ranges between 14V and 15V.

Clause 30. The aggregated voltage controller according to any of clauses 1 to 29, wherein the target output voltage level is a range that varies based on a threshold voltage of an associated inverter.

Clause 31. The aggregated voltage controller according to any of clauses 1 to 31, wherein the regulated aggregate DC voltage conforms to the target voltage level by exceeding a threshold.

Clause 32. The aggregated voltage controller according to any of clauses 1 to 32, wherein the regulated aggregate DC voltage conforms to the target voltage level by remaining below a threshold.

Clause 33. The aggregated voltage controller according to any of clauses 1 to 32, wherein the regulated aggregate DC voltage conforms to the target voltage level by remaining within a predefined range of the target output voltage level over time.

Clause 34. The aggregated voltage controller according to any of clauses 1 to 33, wherein the cluster of fluid turbines are wind turbines.

Clause 35. The aggregated voltage controller according to any of clauses 1 to 34, wherein the cluster of fluid turbines are water turbines.

Clause 36. A non-transitory computer readable medium containing instructions that when executed by at least one processor cause the at least one processor to perform operations for controlling aggregated voltage for a cluster of fluid turbines, the operations comprising:

receiving a target voltage level for the cluster of fluid turbines;

receiving via a plurality of rectifiers, each rectifier associated with a different fluid turbine in the cluster of fluid turbines, an indication of a DC voltage associated with each fluid turbine, wherein the DC voltage associated with at least one of the fluid turbines in the cluster is below the target voltage level; and based on the received indications of the DC voltage signals associated with each fluid turbine in the cluster, output a control signal to each of a plurality of DC-DC converters associated with the plurality of rectifiers, wherein each control signal is configured to regulate each DC-DC converter to produce a DC output signal at the target voltage level such that combining each DC output signal in parallel produces an aggregate DC voltage conforming to the target voltage level.

Clause 37. The non-transitory computer readable medium according to any of clauses 1 to 36, wherein each DC-DC converter includes at least one of a voltage booster, or a voltage regulator.

Clause 38. The non-transitory computer readable medium according to any of clauses 1 to 37, wherein the target voltage level corresponds to a charging voltage level of an associated battery.

Clause 39. The non-transitory computer readable medium according to any of clauses 1 to 38, wherein the target voltage level ranges between 14V and 15V.

Clause 40. The non-transitory computer readable medium according to any of clauses 1 to 39, wherein the target voltage level is a range that varies based on a threshold voltage of an associated inverter.

Clause 41. The non-transitory computer readable medium according to any of clauses 1 to 40, wherein the at least one processor causes the regulated aggregate DC voltage to conform to the target voltage level by causing the regulated aggregate DC voltage to exceed a threshold.

Clause 42. The non-transitory computer readable medium according to any of clauses 1 to 41, wherein the at least one processor causes the regulated aggregate DC voltage to conform to the target voltage level by causing the regulated aggregate DC voltage to remain below a threshold.

Clause 43. The non-transitory computer readable medium according to any of clauses 1 to 42, wherein the at least one processor causes the regulated aggregate DC voltage to conform to the target voltage level by causing the regulated aggregate DC voltage to remain within a predefined range of the target output voltage level over time.

Clause 44. A method for controlling aggregated voltage for a cluster of fluid turbines, the method comprising:
  receiving a target voltage level for the cluster of fluid turbines;
  receiving via a plurality of rectifiers, each rectifier associated with a different fluid turbine in the cluster of fluid turbines, an indication of a DC voltage associated with each fluid turbine, wherein the DC voltage is associated with at least one of the fluid turbines in the cluster is below the target voltage level; and
  based on the received indications of the DC voltage signals associated with each fluid turbine in the cluster, output a control signal to each of a plurality of DC-DC converters associated with the plurality of rectifiers,
  wherein each control signal is configured to regulate each DC-DC converter to produce a DC output signal at the target voltage level such that combining each DC output signal in parallel produces an aggregate DC voltage conforming to the target voltage level.

Clause 45. An inverter for communicating power from a cluster of fluid turbines to an electrical grid, the inverter comprising:
  circuitry configured to receive via a rectifier associated with each fluid turbine in the cluster of fluid turbines, a DC voltage such that a plurality of DC voltages from differing fluid turbines are received and aggregated;
  at least one processor configured to:
  confirm that a connection to the electrical grid conforms with at least one predetermined operating parameter;
  when conformity of the electrical grid connection with the at least one predetermined operating parameter is confirmed, enable inversion of the aggregated DC voltage to an AC voltage compatible with the electrical grid and enable output of the AC voltage to the electrical grid; and
  when conformity of the electrical grid connection with the at least one predetermined operating parameter is not confirmed, prevent output of the AC voltage to the electrical grid.

Clause 46. The inverter according to any of clauses 1 to 45, wherein preventing output of the AC voltage to the grid includes preventing conversion of the aggregate DC voltage to the AC voltage.

Clause 47. The inverter according to any of clauses 1 to 46, wherein when conformity of the grid connection is unconfirmed the at least one processor is further configured to enable energy storage in an off-grid mode.

Clause 48. The inverter according to any of clauses 1 to 47, wherein the off-grid mode involves storing energy in a battery.

Clause 49. The inverter according to any of clauses 1 to 48, wherein the at least one processor is further configured to regulate each fluid turbine in the cluster of fluid turbines to thereby cause conformity of the grid connection to the at least one predetermined operating parameter.

Clause 50. The inverter according to any of clauses 1 to 49, wherein regulating each fluid turbine includes controlling a load on each fluid turbine.

Clause 51. The inverter according to any of clauses 1 to 50, wherein controlling the load on each fluid turbine includes controlling a brake associated with each fluid turbine.

Clause 52. The inverter according to any of clauses 1 to 51, wherein each brake is electrically activated.

Clause 53. The inverter according to any of clauses 1 to 52, wherein each brake is mechanical.

Clause 54. The inverter according to any of clauses 1 to 53, wherein each brake includes an electrical circuit for shunting generator windings.

Clause 55. The inverter according to any of clauses 1 to 54, wherein regulating each turbine includes conforming with an MPPT protocol, thereby causing each turbine to generate power at a maximum power point.

Clause 56. The inverter according to any of clauses 1 to 55, wherein each rectifier is configured to receive a differing AC voltage from the associated fluid turbine and to convert each differing AC voltage to a DC voltage, thereby producing the plurality of DC voltages.

Clause 57. The inverter according to any of clauses 1 to 56, wherein each differing AC voltage is a three-phase AC voltage.

Clause 58. The inverter according to any of clauses 1 to 57, wherein the at least one predetermined operating parameter is associated with a grid frequency.

Clause 59. The inverter according to any of clauses 1 to 58, wherein the at least one predetermined operating parameter is associated with a grid phase.

Clause 60. The inverter according to any of clauses 1 to 59, wherein the at least one predetermined operating parameter is associated with a grid voltage.

Clause 61. The inverter according to any of clauses 1 to 60, wherein confirming that the connection to an electrical grid conforms with at least one predetermined operating parameter includes receiving a signal from regulation circuitry.

Clause 62. The inverter according to any of clauses 1 to 61, wherein the at least one processor is further configured to sense a demand for power associated with a battery and prioritize transmission of the aggregated DC voltage to the battery in response.

Clause 63. A non-transitory computer readable medium containing instructions that when executed by at least one processor cause the at least one processor to perform operations for communicating power from a cluster of fluid turbines to an electrical grid, the operations comprising:
  confirming that a connection of the cluster of fluid turbine to an electrical grid conforms with at least one predetermined operating parameter;
  when conformity of an electrical grid connection with the at least one predetermined operating parameter is confirmed, enabling inversion of an aggregated DC voltage to an AC voltage compatible with the electrical grid and enabling output of the AC voltage to the electrical grid; and
  when conformity of the electrical grid connection with the at least one predetermined operating parameter is not confirmed, preventing output of the AC voltage to the electrical grid.

Clause 64. A method for communicating power from a cluster of fluid turbines to an electrical grid, the method comprising:

confirming that a connection of the cluster of fluid turbines to an electrical grid conforms with at least one predetermined operating parameter;

when conformity of an electrical grid connection with the at least one predetermined operating parameter is confirmed, enabling inversion of an aggregated DC voltage to an AC voltage compatible with the electrical grid and enabling output of the AC voltage to the electrical grid; and when conformity of the electrical grid connection with the at least one predetermined operating parameter is not confirmed, preventing output of the AC voltage to the electrical grid.

Clause 65. A dual-channel fluid turbine controller, the dual channel fluid turbine controller comprising:
at least one processor configured to:
receive, via an AC channel coupled to an AC output of a fluid turbine, first signals indicating fluctuations in power generated by the fluid turbine operating beneath a grid power supply threshold;
access an MPPT protocol;
determine a correspondence between the first signals and a portion of the MPPT protocol;
apply the portion of the MPPT protocol to a generator of the fluid turbine to generate greater power than would be generated in an absence of application of the portion of the MPPT protocol, wherein the generated power is stored as energy in a capacitor associated with the generator;
receive, via a DC channel, second signals indicating a level of energy stored in the capacitor; and
use the second signals to determine when to release the stored energy.

Clause 66. The dual-channel controller according to any of clauses 1 to 65, wherein the first signals are received from a voltage sensor connected to the AC channel.

Clause 67. The dual-channel controller according to any of clauses 1 to 66, wherein the correspondence between the first signals and a first portion of the MPPT protocol is at least partially determined using a machine learning algorithm.

Clause 68. The dual-channel controller according to any of clauses 1 to 67, wherein the at least one processor is further configured to use the first signals to detect at least one anomaly associated with power generated by the fluid turbine.

Clause 69. The dual-channel controller according to any of clauses 1 to 69, wherein the at least one anomaly indicates sabotage.

Clause 70. The dual-channel controller according to any of clauses 1 to 69, wherein the at least one anomaly indicates a mechanical flaw.

Clause 71. The dual-channel controller according to any of clauses 1 to 70, wherein applying the portion of the MPPT protocol to the generator includes modifying a load on the fluid turbine via a DC-DC converter of the generator.

Clause 72. The dual-channel controller according to any of clauses 1 to 71, wherein the at least one processor is further configured to release energy stored in the at least one capacitor to an electrical grid when the level of energy at least reaches the grid power supply threshold.

Clause 73. The dual-channel controller according to any of clauses 1 to 72, wherein the at least one processor is further configured to subsequently release energy stored in the at least one capacitor to smooth power released to an electrical grid during a subsequent operation of the fluid turbine generating power above the grid power supply threshold.

Clause 74. The dual-channel controller according to any of clauses 1 to 73, wherein the at least one processor is further configured to intermittently release energy stored in the at least one capacitor to power circuitry internal to the fluid turbine.

Clause 75. A non-transitory computer readable medium containing instructions that when executed by at least one processor cause the at least one processor to perform operations for dual-channel fluid turbine control, the operations comprising:
receiving, via an AC channel coupled to an AC output of a fluid turbine, first signals indicating fluctuations in power generated by the fluid turbine operating beneath a grid power supply threshold;
accessing an MPPT protocol;
determining a correspondence between the first signals and a portion of the MPPT protocol;
applying the portion of the MPPT protocol to a generator of the fluid turbine to generate greater power than would be generated in an absence of application of the portion of the MPPT protocol, wherein the generated power is stored as energy in a capacitor associated with the generator;
receiving, via a DC channel, second signals indicating a level of energy stored in the capacitor; and
using the second signals to determine when to release the stored energy.

Clause 76. The non-transitory computer readable medium according to any of clauses 1 to 75, wherein the first signals are received from a voltage sensor connected to the AC channel.

Clause 77. The non-transitory computer readable medium according to any of clauses 1 to 76, wherein the correspondence between the first signals and a first portion of the MPPT protocol is at least partially determined using a machine learning algorithm.

Clause 78. The non-transitory computer readable medium according to any of clauses 1 to 77, further comprising using the first signals to detect at least one anomaly associated with power generated by the fluid turbine.

Clause 79. The non-transitory computer readable medium according to any of clauses 1 to 78, wherein the at least one anomaly indicates sabotage or a mechanical flaw.

Clause 80. The non-transitory computer readable medium according to any of clauses 1 to 79, wherein applying the portion of the MPPT protocol to the generator includes modifying a load on the fluid turbine via a DC-DC converter of the generator.

Clause 81. The non-transitory computer readable medium according to any of clauses 1 to 80, further comprising releasing energy stored in the at least one capacitor to an electrical grid when the level of energy at least reaches the grid power supply threshold.

Clause 82. The non-transitory computer readable medium according to any of clauses 1 to 81, further comprising subsequently releasing energy stored in the at least one capacitor to smooth power released to an electrical grid during a subsequent operation of the fluid turbine generating power above the grid power supply threshold.

Clause 83. The non-transitory computer readable medium according to any of clauses 1 to 82, further comprising intermittently release energy stored in the at least one capacitor to power circuitry internal to the fluid turbine.

Clause 84. A method for dual-channel control of a fluid turbine, the method comprising:
receiving, via an AC channel coupled to an AC output of the fluid turbine, first signals indicating fluctuations in power generated by the fluid turbine operating beneath a grid power supply threshold;

accessing an MPPT protocol;

determining a correspondence between the first signals and a portion of the MPPT protocol;

applying the portion of the MPPT protocol to a generator of the fluid turbine to generate greater power than would be generated in an absence of application of the portion of the MPPT protocol, wherein the generated power is stored as energy in a capacitor associated with the generator;

receiving, via a DC channel, second signals indicating a level of energy stored in the capacitor; and using the second signals to determine when to release the stored energy.

Disclosed embodiments may include any one of the following bullet-pointed features alone or in combination with one or more other bullet-pointed features, whether implemented as a system and/or method, by at least one processor or circuitry, and/or stored as executable instructions on non-transitory computer readable media or computer readable media.

- a control system for an energy generator;
- a detector for sensing an indicator associated with electrical energy generated by an energy generator;
- at least one energy storage component configured, in a first mode of operation, to store energy generated by an energy generator during operation at a sub-threshold level insufficient for real-time supply of energy to an associated electrical energy sink;
- an energy converter configured, in a second mode of operation, to provide energy generated by an energy generator during operation above a threshold level for real-time supply of energy to an associated electrical energy sink;
- a controllable switch, electrically associated with an detector, and configured to alternately toggle between a first mode of operation and a second mode of operation based on an indicator to thereby permit energy generated at a sub-threshold level to be collected and intermittently used.
- at least one energy storage component including a capacitor or a battery;
- the at least one energy storage component including a plurality of capacitors;
- an energy converter including an inverter, and an associated electrical energy sink includes an electrical grid;
- a threshold associated with a maximum input voltage rating or a minimum input voltage rating of an inverter;
- at least one DC-DC converter, and at least one rectifier configured, during a second mode of operation, to convert an AC power signal generated by an energy generator operating above a threshold level to a DC signal;
- a DC-DC converter configured to adapt a converted DC signal to another DC signal for supplying, in a second mode of operation, energy to an associated electrical grid via an inverter;
- an energy converter including a charge controller;
- an associated electrical energy sink including a battery bank;
- at least one rectifier for converting a first AC power signal generated by an energy generator operating at a sub-threshold level to a first DC power signal compatible for storing energy in at least one energy storage component;
- at least one rectifier including a three-phase rectifier;
- an indicator that is a measure of electrical output from an energy generator;
- an indicator associated with a measure of a rotational speed of a turbine of an energy generator;
- an indicator that is a measure of fluid velocity of a fluid turbine
- a fluid that is air.
- a fluid that is water.
- at least one processor configured to control a controllable switch by receiving an indicator from a detector, comparing a received indicator with a threshold, and toggling the controllable switch between a first mode and a second mode based on the comparison;
- at least one processor is configured to intermittently supply energy collected in at least one energy storage component to an associated electrical energy sink when energy in the at least one energy storage component reaches a limit;
- at least one processor configured to intermittently supply energy collected in at least one energy storage component to smooth power delivered to an associated electrical energy sink in a second mode.
- at least one processor is configured to intermittently supply energy collected in at least one energy storage component to power circuitry associated with an energy generator;
- circuitry associated with a brake;
- at least one DC-DC converter configured, during a first mode of operation, to convert energy stored in at least one energy storage component for intermittent supply of stored energy;
- at least one processor configured to detect a level of energy stored in at least one energy storage component and activate a DC-DC converter based on a detected level, thereby discharging the at least one energy storage component;
- a detector, a switch, and at least one processor integrated within an ASIC circuit;
- at least one processor configured to select between a first mode of operation and a second mode of operation based on operational parameters of an energy generator;
- A non-transitory computer readable medium containing instructions that when executed by at least one processor cause the at least one processor to perform operations for controlling an energy generator;
- receiving a sensed indicator associated with electrical energy generated by an energy generator;
- comparing a received indicator with a threshold associated with real-time supply of energy to an associated electrical energy sink;
- controlling a controllable switch based on a comparison;
- a controllable switch configured to alternately toggle between a first mode of operation and a second mode of operation;
- a first mode of operation, where energy generated by an energy generator during operation at a sub-threshold level insufficient for real-time supply of energy to an associated electrical energy sink is stored in at least one energy storage component;
- a second mode of operation, where energy generated by an energy generator during operation above a threshold level for real-time supply of energy to an associated electrical energy sink is provided to the associated energy sink via an energy converter;

alternately toggling between a first mode of operation and a second mode of operation thereby permits energy generated at a sub-threshold level to be collected and intermittently used.

A method for controlling an energy generator;

receiving a sensed indicator associated with electrical energy generated by an energy generator;

comparing a received indicator with a threshold associated with real-time supply of energy to an associated electrical energy sink;

controlling a controllable switch based on a comparison;

a controllable switch configured to alternately toggle between a first mode of operation and a second mode of operation;

a first mode of operation, where energy generated by an energy generator during operation at a sub-threshold level insufficient for real-time supply of energy to an associated electrical energy sink is stored in at least one energy storage component;

a second mode of operation, where energy generated by an energy generator during operation above a threshold level for real-time supply of energy to an associated electrical energy sink is provided to an associated energy sink via an energy converter;

alternately toggling between a first mode of operation and a second mode of operation thereby permits energy generated at a sub-threshold level to be collected and intermittently used;

an aggregated voltage controller for a cluster of fluid turbines;

at least one processor configured to receive a target voltage level for the cluster of fluid turbines;

at least one processor configured to receive via a plurality of rectifiers, each rectifier associated with a different fluid turbine in a cluster of fluid turbines, an indication of a DC voltage associated with each fluid turbine;

a DC voltage associated with at least one of a fluid turbines in the cluster being below a target voltage level;

based on received indications of DC voltage signals associated with each fluid turbine in a cluster, at least one processor configured to output a control signal to each of a plurality of DC-DC converters associated with a plurality of rectifiers;

each control signal configured to regulate each DC-DC converter to produce a DC output signal at a target voltage level such that combining each DC output signal in parallel produces an aggregated DC voltage conforming to a target voltage level;

at least one of fluid turbine in a cluster with a DC voltage below a target level including all of the fluid turbines in the cluster;

each DC-to-DC converter including at least one of a voltage booster, or a voltage regulator;

a target voltage level corresponding to a charging voltage level of an associated battery;

a target voltage level ranging between 14V and 15V.

a target output voltage level in a range that varies based on a threshold voltage of an associated inverter;

a regulated aggregate DC voltage conforming to a target voltage level by exceeding a threshold;

a regulated aggregate DC voltage conforming to the target voltage level by remaining below a threshold;

a regulated aggregate DC voltage conforming to a target voltage level by remaining within a predefined range of a target output voltage level over time;

a cluster of fluid turbines that are wind turbines;

a cluster of fluid turbines that are water turbines;

a non-transitory computer readable medium containing instructions that when executed by at least one processor cause the at least one processor to perform operations for controlling aggregated voltage for a cluster of fluid turbines;

receiving a target voltage level for a cluster of fluid turbines;

receiving via a plurality of rectifiers, each rectifier associated with a different fluid turbine in a cluster of fluid turbines, an indication of a DC voltage associated with each fluid turbine;

a DC voltage associated with at least one of the fluid turbines in a cluster that is below a target voltage level;

based on received indications of DC voltage signals associated with each fluid turbine in a cluster, outputting a control signal to each of a plurality of DC-DC converters associated with a plurality of rectifiers, each control signal configured to regulate each DC-DC converter to produce a DC output signal at a target voltage level such that combining each DC output signal in parallel produces an aggregate DC voltage conforming to the target voltage level;

each DC-DC converter including at least one of a voltage booster, or a voltage regulator;

a target voltage level corresponding to a charging voltage level of an associated battery;

a target voltage level ranging between 14V and 15V;

a target voltage level that is a range that varies based on a threshold voltage of an associated inverter;

at least one processor causing a regulated aggregate DC voltage to conform to a target voltage level by causing a regulated aggregate DC voltage to exceed a threshold;

at least one processor causing a regulated aggregate DC voltage to conform to a target voltage level by causing a regulated aggregate DC voltage to remain below a threshold;

at least one processor causing a regulated aggregate DC voltage to conform to a target voltage level by causing the regulated aggregate DC voltage to remain within a predefined range of a target output voltage level over time;

a method for controlling aggregated voltage for a cluster of fluid turbines;

receiving a target voltage level for a cluster of fluid turbines;

receiving via a plurality of rectifiers, each rectifier associated with a different fluid turbine in a cluster of fluid turbines, an indication of a DC voltage associated with each fluid turbine;

a DC voltage associated with at least one of fluid turbine in a cluster below a target voltage level;

based on received indications of DC voltage signals associated with each fluid turbine in a cluster, outputting a control signal to each of a plurality of DC-DC converters associated with a plurality of rectifiers, each control signal configured to regulate each DC-DC converter to produce a DC output signal at a target voltage level such that combining each DC output signal in parallel produces an aggregate DC voltage conforming to a target voltage level;

an inverter for communicating power from a cluster of fluid turbines to an electrical grid;

circuitry configured to receive via a rectifier associated with each fluid turbine in a cluster of fluid turbines, a DC voltage such that a plurality of DC voltages from differing fluid turbines are received and aggregated;

at least one processor configured to confirm that a connection to an electrical grid conforms with at least one predetermined operating parameter;
when conformity of an electrical grid connection with at least one predetermined operating parameter is confirmed, at least one processor configured to enable inversion of an aggregated DC voltage to an AC voltage compatible with an electrical grid and enable output of the AC voltage to an electrical grid;
when conformity of an electrical grid connection with at least one predetermined operating parameter is not confirmed, at least one processor configured to prevent output of an AC voltage to an electrical grid;
at least one processor configured to prevent output of an AC voltage to the grid by preventing conversion of an aggregate DC voltage to an AC voltage;
when conformity of a grid connection is unconfirmed, at least one processor configured to enable energy storage in an off-grid mode;
an off-grid mode involving storing energy in a battery;
at least one processor configured to regulate each fluid turbine in a cluster of fluid turbines to thereby cause conformity of a grid connection to at least one predetermined operating parameter,
at least one processor configured to regulate each fluid turbine by controlling a load on each fluid turbine;
at least one processor configured to control a load on each fluid turbine by controlling a brake associated with each fluid turbine;
each brake is electrically activated;
each brake is mechanical;
each brake includes an electrical circuit for shunting generator windings;
at least one processor configured to regulate each turbine by conforming with an MPPT protocol, thereby causing each turbine to generate power at a maximum power point;
each rectifier configured to receive a differing AC voltage from an associated fluid turbine and convert each differing AC voltage to a DC voltage, thereby producing a plurality of DC voltages;
each differing AC voltage is a three-phase AC voltage;
at least one predetermined operating parameter associated with a grid frequency;
at least one predetermined operating parameter associated with a grid phase;
at least one predetermined operating parameter associated with a grid voltage;
at least one processor configured to confirm that the connection to an electrical grid conforms with at least one predetermined operating parameter by receiving a signal from regulation circuitry;
at least one processor configured to sense a demand for power associated with a battery and prioritize transmission of an aggregated DC voltage to the battery in response;
a non-transitory computer readable medium containing instructions that when executed by at least one processor cause the at least one processor to perform operations for communicating power from a cluster of fluid turbines to an electrical grid;
confirming that a connection of a cluster of fluid turbine to an electrical grid conforms with at least one predetermined operating parameter;
when conformity of an electrical grid connection with at least one predetermined operating parameter is confirmed, enabling inversion of an aggregated DC voltage to an AC voltage compatible with an electrical grid and enabling output of an AC voltage to the electrical grid;
when conformity of an electrical grid connection with the at least one predetermined operating parameter is not confirmed, preventing output of an AC voltage to an electrical grid;
a method for communicating power from a cluster of fluid turbines to an electrical grid;
confirming that a connection of a cluster of fluid turbines to an electrical grid conforms with at least one predetermined operating parameter;
when conformity of an electrical grid connection with at least one predetermined operating parameter is confirmed, enabling inversion of an aggregated DC voltage to an AC voltage compatible with an electrical grid and enabling output of the AC voltage to the electrical grid;
when conformity of an electrical grid connection with at least one predetermined operating parameter is not confirmed, preventing output of an AC voltage to an electrical grid;
a dual-channel fluid turbine controller;
at least one processor configured to receive, via an AC channel coupled to an AC output of a fluid turbine, first signals indicating fluctuations in power generated by the fluid turbine operating beneath a grid power supply threshold;
at least one processor configured to access an MPPT protocol;
at least one processor configured to determine a correspondence between the first signals and a portion of the MPPT protocol;
at least one processor configured to apply the portion of the MPPT protocol to a generator of the fluid turbine to generate greater power than would be generated in an absence of application of the portion of the MPPT protocol, wherein the generated power is stored as energy in a capacitor associated with the generator;
at least one processor configured to receive, via a DC channel, second signals indicating a level of energy stored in the capacitor; and
at least one processor configured to use the second signals to determine when to release the stored energy.
first signals received from a voltage sensor connected to an AC channel;
a correspondence between first signals and a first portion of the MPPT protocol at least partially determined using a machine learning algorithm;
at least one processor configured to use first signals to detect at least one anomaly associated power generated by a fluid turbine;
at least one anomaly indicates sabotage;
at least one anomaly indicating a mechanical flaw;
applying a portion of the MPPT protocol to a generator by modifying a load on a fluid turbine via a DC-DC converter of the generator;
at least one processor configured to release energy stored in at least one capacitor to an electrical grid when a level of energy at least reaches a grid power supply threshold;
at least one processor is configured to subsequently release energy stored in at least one capacitor to smooth power released to an electrical grid during a subsequent operation of a fluid turbine generating power above a grid power supply threshold;
at least one processor configured to intermittently release energy stored in at least one capacitor to power circuitry internal to a fluid turbine;

a non-transitory computer readable medium containing instructions that when executed by at least one processor cause the at least one processor to perform operations for dual-channel fluid turbine control;

receiving, via an AC channel coupled to an AC output of a fluid turbine, first signals indicating fluctuations in power generated by a fluid turbine operating beneath a grid power supply threshold;

accessing an MPPT protocol;

determining a correspondence between first signals and a portion of an MPPT protocol;

applying a portion of an MPPT protocol to a generator of a fluid turbine to generate greater power than would be generated in an absence of application of the portion of the MPPT protocol;

storing generated power as energy in a capacitor associated with a generator;

receiving, via a DC channel, second signals indicating a level of energy stored in a capacitor;

using second signals to determine when to release stored energy;

first signals received from a voltage sensor connected to an AC channel;

a correspondence between first signals and a first portion of the MPPT protocol at least partially determined using a machine learning algorithm;

using first signals to detect at least one anomaly associated with power generated by a fluid turbine;

at least one anomaly indicating sabotage or a mechanical flaw;

applying a portion of an MPPT protocol to a generator by modifying a load on a fluid turbine via a DC-DC converter of a generator;

releasing energy stored in at least one capacitor to an electrical grid when a level of energy at least reaches a grid power supply threshold;

subsequently releasing energy stored in at least one capacitor to smooth power released to an electrical grid during a subsequent operation of a fluid turbine generating power above a grid power supply threshold;

intermittently releasing energy stored in at least one capacitor to power circuitry internal to a fluid turbine;

a method for dual-channel control of a fluid turbine;

receiving, via an AC channel coupled to an AC output of a fluid turbine, first signals indicating fluctuations in power generated by the fluid turbine operating beneath a grid power supply threshold;

accessing an MPPT protocol;

determining a correspondence between first signals and a portion of an MPPT protocol;

applying a portion of the MPPT protocol to a generator of a fluid turbine to generate greater power than would be generated in an absence of application of the portion of the MPPT protocol;

generated power that is stored as energy in a capacitor associated with a generator;

receiving, via a DC channel, second signals indicating a level of energy stored in a capacitor;

using second signals to determine when to release stored energy;

What is claimed is:

1. A control system for at least one energy generator, the control system comprising:
    a detector for sensing an indicator associated with at least one first AC signal generated by the at least one energy generator;
    at least one rectifier for converting the at least one first AC signal generated by the at least one energy generator to at least one first DC signal;
    at least one first DC-DC converter associated with at least one energy storage component and a first mode of operation of the at least one energy generator;
    at least one second DC-DC converter associated with an inverter and a second mode of operation of the at least one energy generator;
    a controllable switch, electrically associated with the detector, and configured to alternately toggle between the at least one first DC-DC converter associated with the first mode of operation and the at least one second DC-DC converter associated with the second mode of operation, wherein the first mode of operation prevents output to an electrical grid, and wherein the second mode of operation converts the at least one first DC signal to at least one second DC signal via the at least one second DC-DC converter and enables inversion of the at least one second DC signal to a second AC signal via the inverter for outputting the electrical grid; and
    at least one processor configured to receive signals from the detector and to:
        control the controllable switch to operate the at least one energy generator in the first mode of operation when a connection to the electrical grid fails to conform with at least one predetermined operating parameter, and
        control the controllable switch to operate the at least one energy generator in the second mode of operation when the connection to the electrical grid conforms with the at least one predetermined operating parameter.

2. The control system of claim 1, wherein the at least one energy generator includes a cluster of energy generators, each configured to generate at least one first AC signal for conversion to an associated second DC signal in the second mode of operation, wherein the control system further comprises circuitry for aggregating each associated second DC signal in parallel to produce an aggregated DC signal in conformance with the connection to the electrical grid.

3. The control system of claim 2, wherein enabling inversion of the at least one second DC signal to a second AC signal via the inverter includes enabling inversion of the aggregated DC signal to an aggregate AC signal via the inverter, and wherein preventing output to the electrical grid includes preventing conversion of the aggregate DC signal via the inverter.

4. The control system of claim 2, wherein the at least one processor is further configured to regulate each energy generator in the cluster of energy generators to thereby cause the connection to the electrical grid to conform with the at least one predetermined operating parameter.

5. The control system of claim 4, wherein regulating each energy generator in the cluster includes controlling a load on each energy generator.

6. The control system of claim 5, wherein controlling the load on each energy generator includes controlling a brake associated with each energy generator.

7. The control system of claim 6, wherein at least some of the brakes are electrically activated.

8. The control system of claim 6, wherein at least some of the brakes are mechanical.

9. The control system of claim 6, wherein each brake includes an electrical circuit for shunting generator windings.

10. The control system of claim 4, wherein the energy generators are fluid turbines, and wherein regulating each energy generator includes conforming with an MPPT protocol, thereby causing each fluid turbine to generate power at a maximum power point.

11. The control system of claim 2, wherein the at least one rectifier includes a plurality of rectifiers, each rectifier of the plurality of rectifiers associated with a different energy generator of the cluster, and wherein the at least one first AC signal includes a plurality of differing AC signals, and wherein the at least one first DC signal includes a plurality of differing DC signals.

12. The control system of claim 11, wherein each differing AC signal is a three-phase AC voltage.

13. The control system of claim 1, wherein when the connection to the electrical grid fails to conform with the at least one predetermined operating parameter, the at least one processor is further configured to enable energy storage in the at least one energy storage component in an off-grid mode.

14. The control system of claim 1, wherein the at least one predetermined operating parameter is associated with a grid frequency.

15. The control system of claim 1, wherein the at least one predetermined operating parameter is associated with a grid phase.

16. The control system of claim 1, wherein the at least one predetermined operating parameter is associated with a grid voltage.

17. The control system of claim 1, wherein the at least one processor is further configured to receiving a signal from regulation circuitry to determine when the connection to the electrical grid conforms with the at least one predetermined operating parameter.

18. The control system of claim 1, wherein the at least one processor is further configured to sense a demand for power associated with the at least one energy storage component and prioritize transmission of the at least one first DC signal to the at least one energy storage component in response.

19. A non-transitory computer readable medium containing instructions that when executed by at least one processor cause the at least one processor to perform operations for controlling at least one energy generator, the operations comprising:

receiving signals from a detector sensing an indicator associated with at least one first AC signal generated by the at least one energy generator, wherein at least one rectifier converts the at least one first AC signal generated by the at least one energy generator to at least one first DC signal, and wherein at least one controllable switch electrically associated with the detector is configured to alternately toggle between at least one first DC-DC converter associated with at least one energy storage component and a first mode of operation of the at least one energy generator, and at least one second DC-DC converter associated with an inverter and a second mode of operation of the at least one energy generator, wherein the first mode of operation prevents output to an electrical grid, and wherein the second mode of operation converts the at least one first DC signal to at least one second DC signal via the at least one second DC-DC converter and enables inversion of the at least one second DC signal to a second AC signal via the inverter for outputting to the electrical grid;

controlling the controllable switch to operate the at least one energy generator in the first mode of operation when a connection to the electrical grid fails to conform with at least one predetermined operating parameter; and controlling the controllable switch to operate the at least one energy generator in the second mode of operation when the connection to the electrical grid conforms with the at least one predetermined operating parameter.

20. A method for controlling at least one energy generator, the method comprising:

receiving signals from a detector sensing an indicator associated with at least one first AC signal generated by the at least one energy generator, wherein at least one rectifier converts the at least one first AC signal generated by the at least one energy generator to at least one first DC signal, and wherein at least one controllable switch electrically associated with the detector is configured to alternately toggle between at least one first DC-DC converter associated with at least one energy storage component and a first mode of operation of the at least one energy generator, and at least one second DC-DC converter associated with an inverter and a second mode of operation of the at least one energy generator, wherein the first mode of operation prevents output to an electrical grid, and wherein the second mode of operation converts the at least one first DC signal to at least one second DC signal via the at least one second DC-DC converter and enables inversion of the at least one second DC signal to a second AC signal via the inverter for outputting to the electrical grid;

controlling the controllable switch to operate the at least one energy generator in the first mode of operation in response to a connection to the electrical grid failing to conform with at least one predetermined operating parameter; and controlling the controllable switch to operate the at least one energy generator in the second mode of operation in response to the connection to the electrical grid conforming with the at least one predetermined operating parameter.

* * * * *